(12) United States Patent  (10) Patent No.: US 9,204,245 B2
Holman et al.  (45) Date of Patent: *Dec. 1, 2015

(54) SYSTEMS AND METHODS FOR PROVIDING GESTURE INDICATIVE DATA VIA A HEAD WEARABLE COMPUTING DEVICE

(71) Applicant: Elwha LLC, Bellevue, WA (US)

(72) Inventors: Pablos Holman, Seattle, WA (US);
Roderick A. Hyde, Redmond, WA (US);
Royce A. Levien, Lexington, MA (US);
Richard T. Lord, Tacoma, WA (US);
Robert W. Lord, Seattle, WA (US);
Mark A. Malamud, Seattle, WA (US);
Clarence T. Tegreene, Mercer Island, WA (US)

(73) Assignee: Elwha LLC, Bellevue, WA (US)

( * ) Notice: Subject to any disclaimer, the term of this patent is extended or adjusted under 35 U.S.C. 154(b) by 90 days.

This patent is subject to a terminal disclaimer.

(21) Appl. No.: 14/088,101

(22) Filed: Nov. 22, 2013

(65) Prior Publication Data

US 2015/0031300 A1  Jan. 29, 2015

Related U.S. Application Data

(63) Continuation-in-part of application No. 13/950,926, filed on Jul. 25, 2013, which is a continuation-in-part of application No. 13/962,373, filed on Aug. 8, 2013, which is a continuation of application No. 13/961,187, (Continued)

(51) Int. Cl.
*H04B 7/00* (2006.01)
*H04W 4/00* (2009.01)

(Continued)

(52) U.S. Cl.
CPC ............... *H04W 4/008* (2013.01); *H04B 1/385* (2013.01); *H04B 2001/3861* (2013.01); *H04B 2001/3866* (2013.01); *H04W 4/203* (2013.01)

(58) Field of Classification Search
CPC ......... H04B 1/385; H04B 7/26; H04W 4/008; H04W 8/005
USPC .................. 455/41.1, 41.2, 63.4, 66.1, 550.1, 455/556.1, 557, 134, 135, 334, 522
See application file for complete search history.

(56) References Cited

U.S. PATENT DOCUMENTS 6,711,414 B1  3/2004  Lightman et al.
6,771,224 B2  8/2004  Apostolos (Continued)

OTHER PUBLICATIONS

Brown, Michael, "Meet 60GHz Wi-Fi, the insanely fast future of wireless networking," PC World, Mar. 6, 2013, 4 pages, http://www.pcworld.com/article/2030041/meet-60ghz-wi-fi-the-insanely-fast-future-of-wireless-networking.html.

(Continued)

*Primary Examiner* — Tuan Pham

(57) ABSTRACT

Computationally implemented methods and systems include facilitating a head wearable computing device to receive one or more solicitations via one or more solicitation signals that solicit to provide to a limb wearable computing device gesture indicative data that is indicative of one or more user gestures, the head wearable computing device being designed to be worn on a head of a user and the limb wearable computing device being designed to be worn around a limb of a user; and directing the head wearable computing device to transmit to the limb wearable computing device the gesture indicative data via one or more low-power gesture indicative data signals, the limb wearable computing device being within communication range of the head wearable computing device. In addition to the foregoing, other aspects are described in the claims, drawings, and text.

41 Claims, 41 Drawing Sheets

Related U.S. Application Data filed on Aug. 7, 2013, now Pat. No. 9,078,089, application No. 14/088,101, which is a continuation-in-part of application No. 14/017,693, filed on Sep. 4, 2013, now Pat. No. 9,037,087, which is a continuation of application No. 14/014,882, filed on Aug. 30, 2013, application No. 14/088,101, which is a continuation-in-part of application No. 14/044,576, filed on Oct. 2, 2013, which is a continuation of application No. 14/043,395, filed on Oct. 1, 2013, application No. 14/088,101, which is a continuation-in-part of application No. 14/059,036, filed on Oct. 21, 2013, which is a continuation of application No. 14/057,082, filed on Oct. 18, 2013, application No. 14/088,101, which is a continuation-in-part of application No. 14/072,207, filed on Nov. 5, 2013, which is a continuation-in-part of application No. 14/071,116, filed on Nov. 4, 2013.

(51) Int. Cl.
*H04B 1/3827* (2015.01)
*H04W 4/20* (2009.01)

(56) References Cited

U.S. PATENT DOCUMENTS

| | | | |
|---|---|---|---|
| 6,995,723 | B1 | 2/2006 | Adams |
| 7,500,747 | B2 | 3/2009 | Howell et al. |
| 7,715,873 | B1 * | 5/2010 | Biere et al. ............ 455/557 |
| 7,929,914 | B2 | 4/2011 | Tegreene |
| 8,184,983 | B1 | 5/2012 | Ho et al. |
| 8,340,658 | B2 | 12/2012 | Tsui et al. |
| 8,430,310 | B1 | 4/2013 | Ho et al. |
| 8,442,542 | B2 | 5/2013 | Brisebois et al. |
| 8,489,546 | B2 | 7/2013 | Rappaport |
| 8,493,353 | B2 | 7/2013 | Blanchflower et al. |
| 8,493,849 | B2 | 7/2013 | Fuste Vilella et al. |
| 2002/0142734 | A1 | 10/2002 | Wickstead |
| 2012/0194399 | A1 | 8/2012 | Bily et al. |
| 2012/0195464 | A1 | 8/2012 | Ahn |
| 2012/0250615 | A1 | 10/2012 | Gupta et al. |
| 2013/0044130 | A1 * | 2/2013 | Geisner et al. ............ 345/633 |
| 2013/0080616 | A1 | 3/2013 | Tsui et al. |
| 2013/0165138 | A1 | 6/2013 | Bahl et al. |
| 2014/0241540 | A1 * | 8/2014 | Hodges et al. ............ 381/74 |
| 2015/0031286 | A1 * | 1/2015 | Holman et al. ............ 455/39 |
| 2015/0031290 | A1 * | 1/2015 | Holman et al. ............ 455/41.2 |
| 2015/0031291 | A1 * | 1/2015 | Holman et al. ............ 455/41.2 |
| 2015/0031292 | A1 * | 1/2015 | Holman et al. ............ 455/41.2 |
| 2015/0031293 | A1 * | 1/2015 | Holman et al. ............ 455/41.2 |
| 2015/0031294 | A1 * | 1/2015 | Holman et al. ............ 455/41.2 |
| 2015/0031295 | A1 * | 1/2015 | Holman et al. ............ 455/41.2 |
| 2015/0031296 | A1 * | 1/2015 | Holman et al. ............ 455/41.2 |
| 2015/0031297 | A1 * | 1/2015 | Holman et al. ............ 455/41.2 |
| 2015/0031298 | A1 * | 1/2015 | Holman et al. ............ 455/41.2 |
| 2015/0031299 | A1 * | 1/2015 | Holman et al. ............ 455/41.2 |
| 2015/0031300 | A1 | 1/2015 | Holman et al. |
| 2015/0031301 | A1 * | 1/2015 | Holman et al. ............ 455/41.2 |

OTHER PUBLICATIONS

Experton Group, "Bluetooth to Decide on 60GHZ Standard this Month," Experton Group, Apr. 19, 2010, 1 page, http://www.experton-group.com/nc/home/itnews/itnewsarticle/article/bluetooth-to-decide-on-60ghz-standard-this-month.html.

mmWAVES, "60GHz Wireless Technology Overview," 2013, 4 pages, http://www.mmwaves.com/products.cfm/product/20-194-0.htm, accessed Jul. 25, 2013.

Stevens et al., "White Paper: The Benefits of 60 GHz Unlicensed Wireless Communications," Dec. 2011, 10 pages, Sub10 Systems Limited, http://www.sub10systems.com/wp-content/uploads/2011/03/White-Paper-Benefits-of-60GHz.pdf.

University of California, Berkely, "60 GHz Short-Range Wireless Communication," Connectivity Lab, Feb. 2008, 1 page, http://connectivitylab.eecs.berkeley.edu/brochures/60ghz.pdf.

PCT International Search Report; International App. No. PCT/US2014/048167; Nov. 4, 2014; pp. 1-3.

* cited by examiner

Non-Augmented View 301

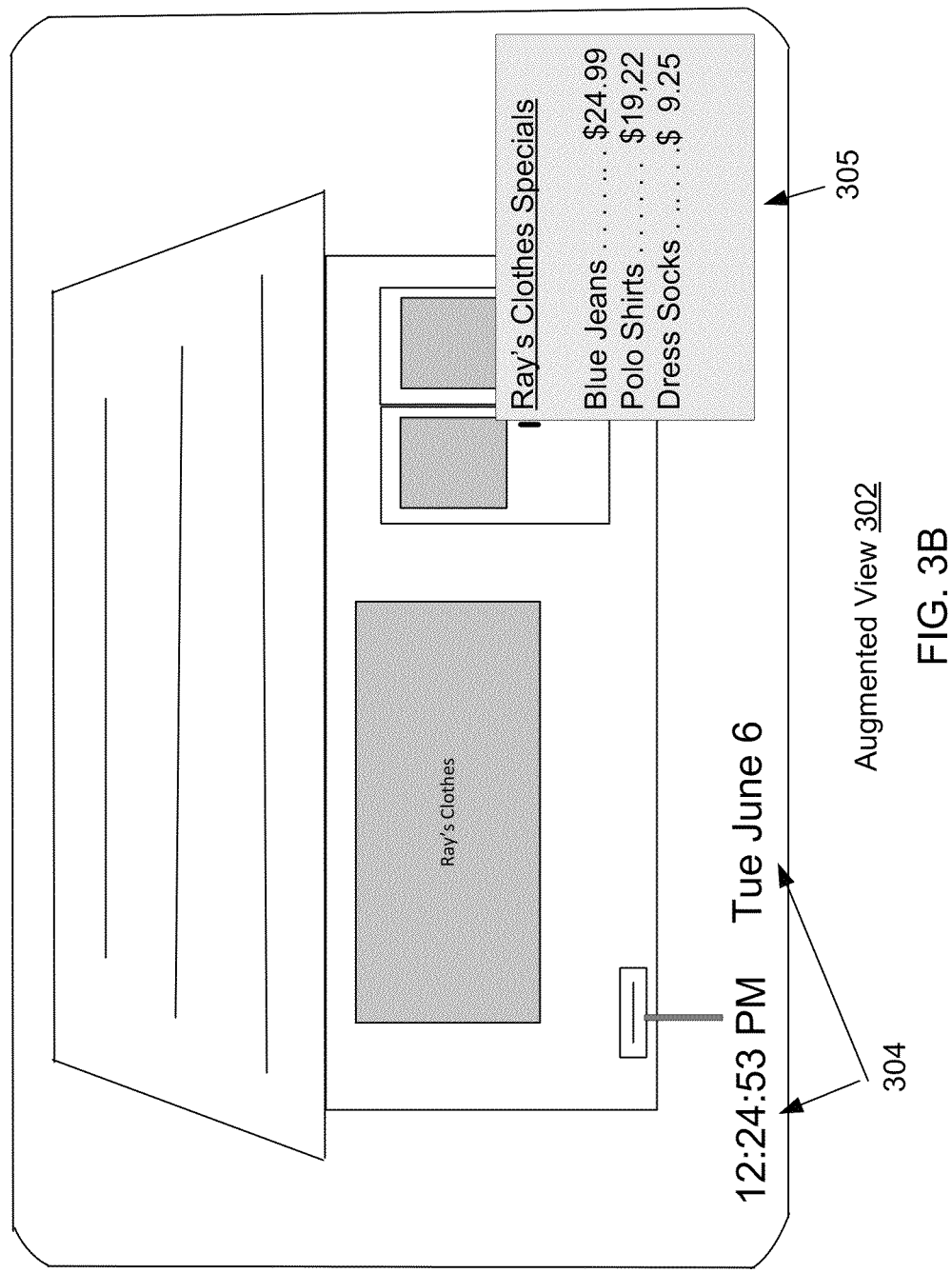

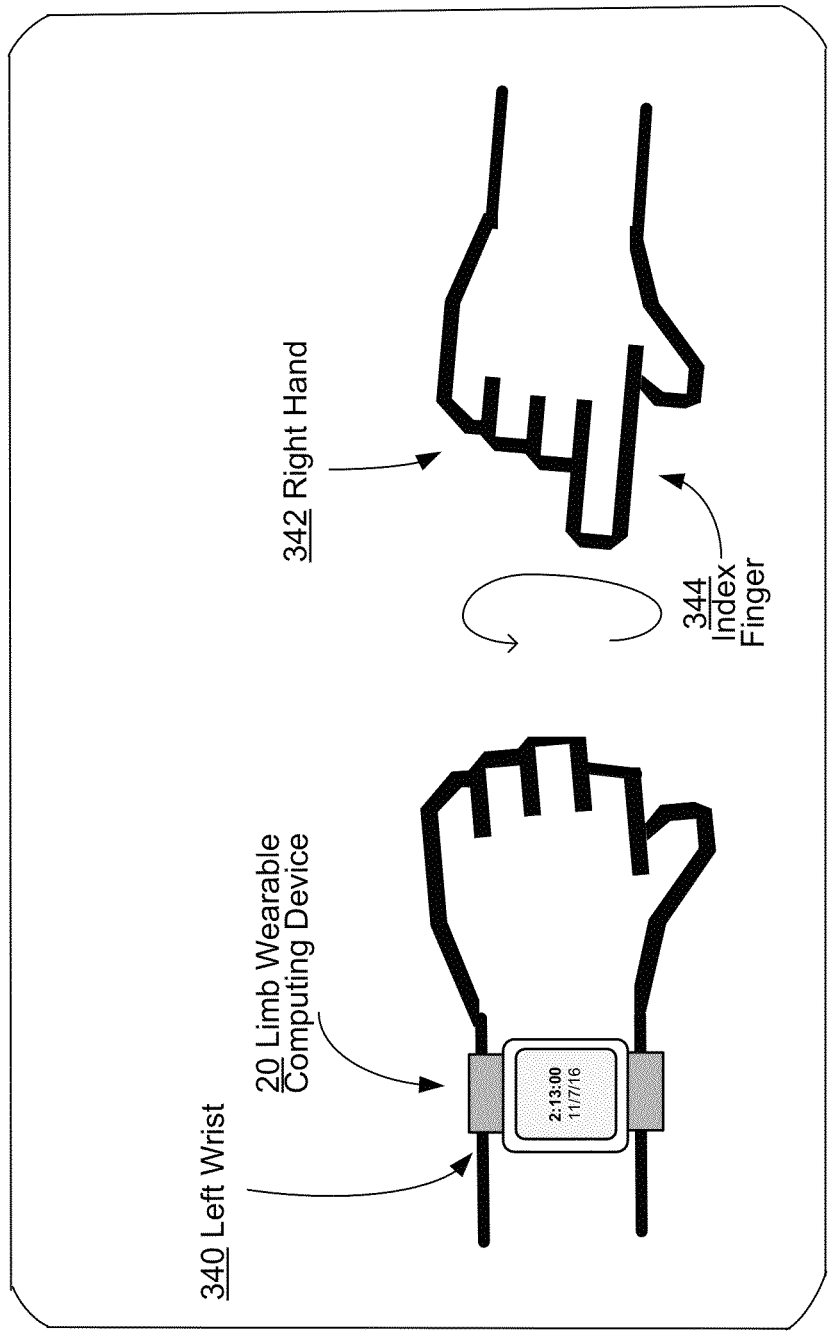

402* Solicitation Receive Facilitating Module

502 Component Receive Directing Module

504 Transceiver Receive Directing Module

508 Directional Antenna Pointing Module

510 Component Receive Configuring Module

512 Transceiver Receive Configuring Module

514 Query Receive Facilitating Module

FIG. 5A

406* User Gesture Detecting Module

536 User Gesture Detect Directing Module

538 User Gesture Visual Detecting Module

540 Image Capturing Device Activating Module

FIG. 5C

404' Gesture Indicative Data Transmit Directing Module

516 Component Transmit Directing Module

518 Transceiver Transmit Directing Module

520 Directional Antenna Pointing Module

522 Transmit Power Requirement Determining Module

524 Prompting Signal Transmit Directing Module

526 Responsive Signal Monitor Directing Module

528 Minimum Transmit Power Requirement Determining Module

530 Beacon Signal Based Transmit Power Requirement Determining Module

532 Beacon Signal Strength Determining Module

534 Reference Table Comparing Module

FIG. 5B

SYSTEMS AND METHODS FOR PROVIDING GESTURE INDICATIVE DATA VIA A HEAD WEARABLE COMPUTING DEVICE

CROSS-REFERENCE TO RELATED APPLICATIONS

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

PRIORITY APPLICATIONS

The present application constitutes a continuation-in-part of U.S. patent application Ser. No. 13/950,926, entitled SYSTEMS AND METHODS FOR PROVIDING ONE OR MORE FUNCTIONALITIES TO A WEARABLE COMPUTING DEVICE WITH SMALL FORM FACTOR, naming Pablos Holman, Roderick A. Hyde; Royce A. Levien; Richard T. Lord; Robert W. Lord; Mark A. Malamud; Clarence T. Tegreene as inventors, filed 25 Jul. 2013, which is currently co-pending or is an application of which a currently co-pending application is entitled to the benefit of the filing date.

The present application constitutes a continuation-in-part of U.S. patent application Ser. No. 13/962,373, entitled SYSTEMS AND METHODS FOR PROVIDING ONE OR MORE FUNCTIONALITIES TO A WEARABLE COMPUTING DEVICE, naming Pablos Holman, Roderick A. Hyde; Royce A. Levien; Richard T. Lord; Robert W. Lord; Mark A. Malamud; Clarence T. Tegreene as inventors, filed 8 Aug. 2013, which is currently co-pending or is an application of which a currently co-pending application is entitled to the benefit of the filing date, and which is a continuation of U.S. patent application Ser. No. 13/961,187, entitled SYSTEMS AND METHODS FOR PROVIDING ONE OR MORE FUNCTIONALITIES TO A WEARABLE COMPUTING DEVICE, naming Pablos Holman, Roderick A. Hyde; Royce A. Levien; Richard T. Lord; Robert W. Lord; Mark A. Malamud; Clarence T. Tegreene as inventors, filed 7 Aug. 2013.

The present application constitutes a continuation-in-part of U.S. patent application Ser. No. 14/017,693, entitled SYSTEMS AND METHODS FOR PROVIDING ONE OR MORE FUNCTIONALITIES TO A WEARABLE COMPUTING DEVICE WITH DIRECTIONAL ANTENNA, naming Pablos Holman, Roderick A. Hyde; Royce A. Levien; Richard T. Lord; Robert W. Lord; Mark A. Malamud; Clarence T. Tegreene as inventors, filed 4 Sep. 2013, which is currently co-pending or is an application of which a currently co-pending application is entitled to the benefit of the filing date, and which is a continuation of U.S. patent application Ser. No. 14/014,882, entitled SYSTEMS AND METHODS FOR PROVIDING ONE OR MORE FUNCTIONALITIES TO A WEARABLE COMPUTING DEVICE WITH DIRECTIONAL ANTENNA, naming Pablos Holman, Roderick A. Hyde; Royce A. Levien; Richard T. Lord; Robert W. Lord; Mark A. Malamud; Clarence T. Tegreene as inventors, filed 30 Aug. 2013.

The present application constitutes a continuation-in-part of U.S. patent application Ser. No. 14/044,576, entitled SYSTEMS AND METHODS FOR COMMUNICATING BEYOND COMMUNICATION RANGE OF A WEARABLE COMPUTING DEVICE, naming Pablos Holman, Roderick A. Hyde; Royce A. Levien; Richard T. Lord; Robert W. Lord; Mark A. Malamud; Clarence T. Tegreene as inventors, filed 2 Oct. 2013, which is currently co-pending or is an application of which a currently co-pending application is entitled to the benefit of the filing date, and which is a continuation of U.S. patent application Ser. No. 14/043,395, entitled SYSTEMS AND METHODS FOR COMMUNICATING BEYOND COMMUNICATION RANGE OF A WEARABLE COMPUTING DEVICE, naming Pablos Holman, Roderick A. Hyde; Royce A. Levien; Richard T. Lord; Robert W. Lord; Mark A. Malamud; Clarence T. Tegreene as inventors, filed 1 Oct. 2013.

The present application constitutes a continuation-in-part of U.S. patent application Ser. No. 14/059,036, entitled SYSTEMS AND METHODS FOR SELECTING FOR USAGE ONE OR MORE FUNCTIONAL DEVICES DETECTED WITHIN A COMMUNICATION RANGE OF A WEARABLE COMPUTING DEVICE, naming Pablos Holman, Roderick A. Hyde; Royce A. Levien; Richard T. Lord; Robert W. Lord; Mark A. Malamud; Clarence T. Tegreene as inventors, filed 21 Oct. 2013, which is currently co-pending or is an application of which a currently co-pending application is entitled to the benefit of the filing date, and which is a continuation of U.S. patent application Ser. No. 14/057,082, entitled SYSTEMS AND METHODS FOR SELECTING FOR USAGE ONE OR MORE FUNCTIONAL DEVICES DETECTED WITHIN A COMMUNICATION RANGE OF A WEARABLE COMPUTING DEVICE, naming Pablos Holman, Roderick A. Hyde; Royce A. Levien; Richard T. Lord; Robert W. Lord; Mark A. Malamud; Clarence T. Tegreene as inventors, filed 18 Oct. 2013.

The present application constitutes a continuation-in-part of U.S. patent application Ser. No. 14/072,207, entitled SYSTEMS AND METHODS FOR RECEIVING GESTURE INDICATIVE DATA AT A LIMB WEARABLE COMPUTING DEVICE, naming Pablos Holman, Roderick A. Hyde; Royce A. Levien; Richard T. Lord; Robert W. Lord; Mark A. Malamud; Clarence T. Tegreene as inventors, filed 5 Nov. 2013, which is currently co-pending or is an application of which a currently co-pending application is entitled to the benefit of the filing date, and which is a continuation of U.S. patent application Ser. No. 14/071,116, entitled SYSTEMS AND METHODS FOR RECEIVING GESTURE INDICATIVE DATA AT A LIMB WEARABLE COMPUTING DEVICE, naming Pablos Holman, Roderick A. Hyde; Royce A. Levien; Richard T. Lord; Robert W. Lord; Mark A. Malamud; Clarence T. Tegreene as inventors, filed 4 Nov. 2013.

RELATED APPLICATIONS

None as of the filing date.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

SUMMARY

In one or more various aspects, a method includes, but is not limited to, facilitating a head wearable computing device to receive one or more solicitations via one or more solicitation signals that solicit to provide to a limb wearable computing device gesture indicative data that is indicative of one or more user gestures, the head wearable computing device being designed to be worn on a head of a user and the limb wearable computing device being designed to be worn around a limb of a user, and directing the head wearable computing device to transmit to the limb wearable computing device the gesture indicative data via one or more low-power gesture indicative data signals, the limb wearable computing device being within communication range of the head wearable computing device, the communication range being a spatial volume that includes the head wearable computing device and being externally defined by an enveloping boundary, where the one or more low-power gesture indicative data signals transmitted by the head wearable computing device being discernible over background noise within the enveloping boundary and not discernible over background noise outside the enveloping boundary. In various implementations, at least one of the facilitating or directing is performed by a machine or article of manufacture. In addition to the foregoing, other method aspects are described in the claims, drawings, and text forming a part of the disclosure set forth herein.

In one or more various aspects, one or more related systems may be implemented in machines, compositions of matter, or manufactures of systems, limited to patentable subject matter under 35 U.S.C. 101. The one or more related systems may include, but are not limited to, circuitry and/or programming for effecting the herein-referenced method aspects. The circuitry and/or programming may be virtually any combination of hardware, software, and/or firmware configured to effect the herein-referenced method aspects depending upon the design choices of the system designer, and limited to patentable subject matter under 35 USC 101.

In one or more various aspects, a system includes, but is not limited to, means for facilitating a head wearable computing device to receive one or more solicitations via one or more solicitation signals that solicit to provide to a limb wearable computing device gesture indicative data that is indicative of one or more user gestures, the head wearable computing device being designed to be worn on a head of a user and the limb wearable computing device being designed to be worn around a limb of a user, and means for directing the head wearable computing device to transmit to the limb wearable computing device the gesture indicative data via one or more low-power gesture indicative data signals, the limb wearable computing device being within communication range of the head wearable computing device, the communication range being a spatial volume that includes the head wearable computing device and being externally defined by an enveloping boundary, where the one or more low-power gesture indicative data signals transmitted by the head wearable computing device being discernible over background noise within the enveloping boundary and not discernible over background noise outside the enveloping boundary. In addition to the foregoing, other system aspects are described in the claims, drawings, and text forming a part of the disclosure set forth herein.

In one or more various aspects, a system includes, but is not limited to, circuitry for facilitating a head wearable computing device to receive one or more solicitations via one or more solicitation signals that solicit to provide to a limb wearable computing device gesture indicative data that is indicative of one or more user gestures, the head wearable computing device being designed to be worn on a head of a user and the limb wearable computing device being designed to be worn around a limb of a user, and circuitry for directing the head wearable computing device to transmit to the limb wearable computing device the gesture indicative data via one or more low-power gesture indicative data signals, the limb wearable computing device being within communication range of the head wearable computing device, the communication range being a spatial volume that includes the head wearable computing device and being externally defined by an enveloping boundary, where the one or more low-power gesture indicative data signals transmitted by the head wearable computing device being discernible over background noise within the enveloping boundary and not discernible over background noise outside the enveloping boundary. In addition to the foregoing, other system aspects are described in the claims, drawings, and text forming a part of the disclosure set forth herein.

In one or more various aspects, a computer program product, comprising a signal bearing non-transitory storage medium, bearing one or more instructions including, but not limited to, facilitating a head wearable computing device to receive one or more solicitations via one or more solicitation signals that solicit to provide to a limb wearable computing device gesture indicative data that is indicative of one or more user gestures, the head wearable computing device being designed to be worn on a head of a user and the limb wearable computing device being designed to be worn around a limb of a user, directing the head wearable computing device to transmit to the limb wearable computing device the gesture indicative data via one or more low-power gesture indicative data signals, the limb wearable computing device being within communication range of the head wearable computing device, the communication range being a spatial volume that includes the head wearable computing device and being externally defined by an enveloping boundary, where the one or more low-power gesture indicative data signals transmitted by the head wearable computing device being discernible over background noise within the enveloping boundary and not discernible over background noise outside the enveloping boundary, and directing the head wearable computing device to transmit to the limb wearable computing device the gesture indicative data via one or more low-power gesture indicative data signals, the limb wearable computing device being within communication range of the head wearable computing device, the communication range being a spatial volume that includes the head wearable computing device and being externally defined by an enveloping boundary, where the one or more low-power gesture indicative data signals transmitted by the head wearable computing device being discernible over background noise within the enveloping boundary and not discernible over background noise outside the enveloping boundary. In addition to the foregoing, other computer program product aspects are described in the claims, drawings, and text forming a part of the disclosure set forth herein.

In one or more various aspects, a system includes, but is not limited to, a solicitation receive facilitating module configured to facilitate a head wearable computing device to receive one or more solicitations via one or more solicitation signals that solicit to provide to a limb wearable computing device gesture indicative data that is indicative of one or more user gestures, the head wearable computing device being designed to be worn on a head of a user and the limb wearable computing device being designed to be worn around a limb of a user; a user gesture detecting module configured to detect, via the head wearable computing device, the one or more user gestures in order to generate the gesture indicative data; and a gesture indicative data transmit directing module configured to direct the head wearable computing device to transmit to the limb wearable computing device the gesture indicative data via one or more low-power gesture indicative data signals, the limb wearable computing device being within communication range of the head wearable computing device, the communication range being a spatial volume that includes the head wearable computing device and being externally defined by an enveloping boundary, where the one or more low-power gesture indicative data signals transmitted by the head wearable computing device being discernible over background noise within the enveloping boundary and not discernible over background noise outside the enveloping boundary In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent by reference to the detailed description, the corresponding drawings, and/or in the teachings set forth herein.

BRIEF DESCRIPTION OF THE FIGURES

For a more complete understanding of embodiments, reference now is made to the following descriptions taken in connection with the accompanying drawings. The use of the same symbols in different drawings typically indicates similar or identical items, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 3B shows an exemplary augmented view 302 that may be presented through the head wearable computing device 10* of FIG. 1A in accordance with some embodiments.

FIG. 3E shows another exemplary non-augmented view 320 that may be presented and captured through the head wearable computing device 10* of FIG. 1A in accordance with various embodiments.

FIG. 5A shows another perspective of the solicitation receive facilitating module 402* of FIGS. 4A and 4B (e.g., the solicitation receive facilitating module 402' of FIG. 4A or the solicitation receive facilitating module 402" of FIG. 4B) in accordance with various implementations.

FIG. 5B shows another perspective of the gesture indicative data transmit directing module 404* of FIGS. 4A and 4B (e.g., the gesture indicative data transmit directing module 404' of FIG. 4A or the gesture indicative data transmit directing module 404" of FIG. 4B) in accordance with various implementations.

FIG. 5C shows another perspective of the user gesture detecting module 406* of FIGS. 4A and 4B (e.g., the user gesture detecting module 406' of FIG. 4A or the user gesture detecting module 406" of FIG. 4B) in accordance with various implementations.

DETAILED DESCRIPTION

Figure 1A:
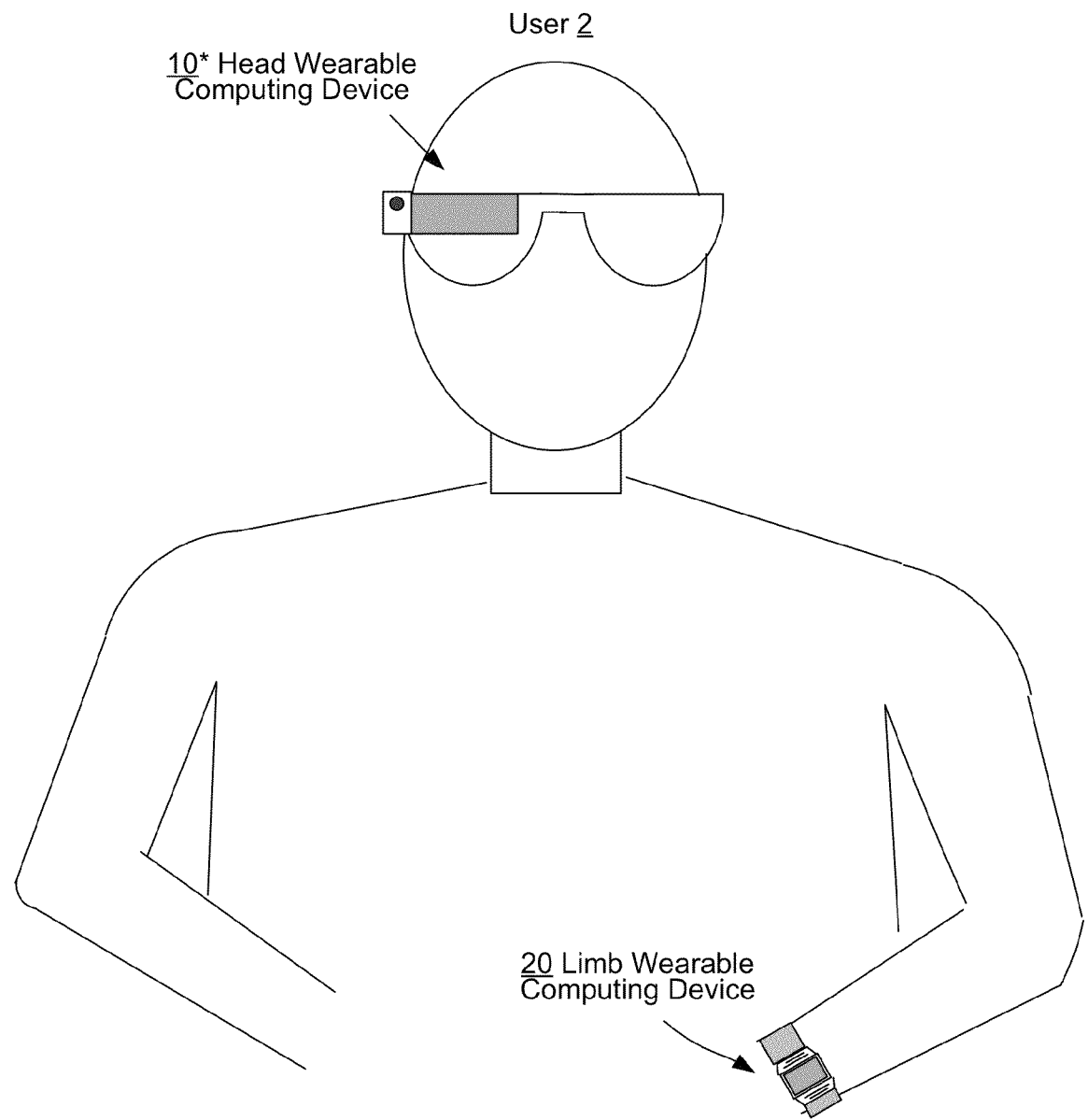
FIG. 1A illustrates an exemplary user 2 wearing head wearable computing device 10* and a limb wearable computing device 20.

In the following detailed description, reference is made to the accompanying drawings, which form a part hereof. In the drawings, similar symbols typically identify similar or identical components or items, unless context dictates otherwise. The illustrative embodiments described in the detailed description, drawings, and claims are not meant to be limiting. Other embodiments may be utilized, and other changes may be made, without departing from the spirit or scope of the subject matter presented here.

Thus, in accordance with various embodiments, computationally implemented methods, systems, circuitry, articles of manufacture, ordered chains of matter, and computer program products are designed to, among other things, provide one or more wearable computing devices for the environment illustrated in FIG. 1.

The claims, description, and drawings of this application may describe one or more of the instant technologies in operational/functional language, for example as a set of operations to be performed by a computer. Such operational/functional description in most instances would be understood by one skilled the art as specifically-configured hardware (e.g., because a general purpose computer in effect becomes a special purpose computer once it is programmed to perform particular functions pursuant to instructions from program software).

Importantly, although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to the human mind. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail in the following paragraphs, these logical operations/functions are not representations of abstract ideas, but rather representative of static or sequenced specifications of various hardware elements. Differently stated, unless context dictates otherwise, the logical operations/functions will be understood by those of skill in the art to be representative of static or sequenced specifications of various hardware elements. This is true because tools available to one of skill in the art to implement technical disclosures set forth in operational/functional formats—tools in the form of a high-level programming language (e.g., C, java, visual basic, etc.), or tools in the form of Very high speed Hardware Description Language ("VHDL," which is a language that uses text to describe logic circuits)—are generators of static or sequenced specifications of various hardware configurations. This fact is sometimes obscured by the broad term "software," but, as shown by the following explanation, those skilled in the art understand that what is termed "software" is a shorthand for a massively complex interchaining/specification of ordered-matter elements. The term "ordered-matter elements" may refer to physical components of computation, such as assemblies of electronic logic gates, molecular computing logic constituents, quantum computing mechanisms, etc.

For example, a high-level programming language is a programming language with strong abstraction, e.g., multiple levels of abstraction, from the details of the sequential organizations, states, inputs, outputs, etc., of the machines that a high-level programming language actually specifies. See, e.g., Wikipedia, High-level programming language, http://en.wikipedia.org/wiki/High-level_programming_language (as of Jun. 5, 2012, 21:00 GMT). In order to facilitate human comprehension, in many instances, high-level programming languages resemble or even share symbols with natural languages. See, e.g., Wikipedia, Natural language, http://en.wikipedia.org/wiki/Natural_language (as of Jun. 5, 2012, 21:00 GMT).

It has been argued that because high-level programming languages use strong abstraction (e.g., that they may resemble or share symbols with natural languages), they are therefore a "purely mental construct" (e.g., that "software"—a computer program or computer programming—is somehow an ineffable mental construct, because at a high level of abstraction, it can be conceived and understood in the human mind). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental" in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional external linking devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors). See, e.g., Wikipedia, Logic gates, http://en.wikipedia.org/wiki/Logic_gates (as of Jun. 5, 2012, 21:03 GMT).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output. See, e.g., Wikipedia, Computer architecture, http://en.wikipedia.org/wiki/Computer_architecture (as of Jun. 5, 2012, 21:03 GMT).

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "11110000101011110000111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configuration, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). See, e.g., Wikipedia, Instructions per second, http://en.wikipedia.org/wiki/Instruction_sper_second (as of Jun. 5, 2012, 21:04 GMT). Thus, programs written in machine language—which may be tens of millions of machine language instructions long—are incomprehensible. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that humanly useful, tangible, and concrete work is done. For example, as indicated above, such machine language—the compiled version of the higher-level language—functions as a technical specification which selects out hardware logic gates, specifies voltage levels, voltage transition timings, etc., such that the humanly useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality representative of logic(s), or (d) virtually any combination of the foregoing. Indeed, any physical object which has a stable, measurable, and changeable state may be used to construct a machine based on the above technical description. Charles Babbage, for example, constructed the first computer out of wood and powered by cranking a handle.

Thus, far from being understood as an abstract idea, those skilled in the art will recognize a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language simply cannot be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware in one or more machines, compositions of matter, and articles of manufacture, limited to patentable subject matter under 35 USC 101. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media holds or transmits device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory. Further, implementation of at least part of a system for performing a method in one territory does not preclude use of the system in another territory In a general sense, those skilled in the art will recognize that the various embodiments described herein can be implemented, individually and/or collectively, by various types of electro-mechanical systems having a wide range of electrical components such as hardware, software, firmware, and/or virtually any combination thereof, limited to patentable subject matter under 35 U.S.C. 101; and a wide range of components that may impart mechanical force or motion such as rigid bodies, spring or torsional bodies, hydraulics, electromagnetically actuated devices, and/or virtually any combination thereof. Consequently, as used herein, "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs (e.g., graphene based circuitry). Those skilled in the art will also appreciate that examples of electro-mechanical systems include, but are not limited to, a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into an image processing system. Those having skill in the art will recognize that a typical image processing system generally includes one or more of a system unit housing, a video display device, memory such as volatile or non-volatile memory, processors such as microprocessors or digital signal processors, computational entities such as operating systems, drivers, application programs, one or more interaction devices (e.g., a touch pad, a touch screen, an antenna, etc.), and/or control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and application programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Those skilled in the art will recognize that at least a portion of the devices and/or processes described herein can be integrated into a mote system. Those having skill in the art will recognize that a typical mote system generally includes one or more memories such as volatile or non-volatile memories, processors such as microprocessors or digital signal processors, computational entities such as operating systems, user interfaces, drivers, sensors, actuators, application programs, one or more interaction devices (e.g., an antenna USB ports, acoustic ports, etc.), control systems including feedback loops and control motors (e.g., feedback for sensing or estimating position and/or velocity; control motors for moving and/or adjusting components and/or quantities). A mote system may be implemented utilizing suitable components, such as those found in mote computing/communication systems. Specific examples of such components entail such as Intel Corporation's and/or Crossbow Corporation's mote components and supporting hardware, software, and/or firmware.

For the purposes of this application, "cloud" computing may be understood as described in the cloud computing literature. For example, cloud computing may be methods and/or systems for the delivery of computational capacity and/or storage capacity as a service. The "cloud" may refer to one or more hardware and/or software components that deliver or assist in the delivery of computational and/or storage capacity, including, but not limited to, one or more of a client, an application, a platform, an infrastructure, and/or a server. The cloud may refer to any of the hardware and/or software associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a hardware back-end, a software back-end, and/or a software application. A cloud may refer to a private cloud, a public cloud, a hybrid cloud, and/or a community cloud. A cloud may be a shared pool of configurable computing resources, which may be public, private, semi-private, distributable, scaleable, flexible, temporary, virtual, and/or physical. A cloud or cloud service may be delivered over one or more types of network, e.g., a mobile communication network, and the Internet.

As used in this application, a cloud or a cloud service may include one or more of infrastructure-as-a-service ("IaaS"), platform-as-a-service ("PaaS"), software-as-a-service ("SaaS"), and/or desktop-as-a-service ("DaaS"). As a non-exclusive example, IaaS may include, e.g., one or more virtual server instantiations that may start, stop, access, and/or configure virtual servers and/or storage centers (e.g., providing one or more processors, storage space, and/or network resources on-demand, e.g., EMC and Rackspace). PaaS may include, e.g., one or more software and/or development tools hosted on an infrastructure (e.g., a computing platform and/or a solution stack from which the client can create software interfaces and applications, e.g., Microsoft Azure). SaaS may include, e.g., software hosted by a service provider and accessible over a network (e.g., the software for the application and/or the data associated with that software application may be kept on the network, e.g., Google Apps, SalesForce). DaaS may include, e.g., providing desktop, applications, data, and/or services for the user over a network (e.g., providing a multi-application framework, the applications in the framework, the data associated with the applications, and/or services related to the applications and/or the data over the network, e.g., Citrix). The foregoing is intended to be exemplary of the types of systems and/or methods referred to in this application as "cloud" or "cloud computing" and should not be considered complete or exhaustive.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Specific examples of operably couplable include, but are not limited, to physically mateable and/or physically interacting components, and/or wirelessly interactable, and/or wirelessly interacting components, and/or logically interacting, and/or logically interactable components.

To the extent that formal outline headings are present in this application, it is to be understood that the outline headings are for presentation purposes, and that different types of subject matter may be discussed throughout the application (e.g., device(s)/structure(s) may be described under process (es)/operations heading(s) and/or process(es)/operations may be discussed under structure(s)/process(es) headings and/or descriptions of single topics may span two or more topic headings). Hence, any use of formal outline headings in this application is for presentation purposes, and is not intended to be in any way limiting.

Throughout this application, examples and lists are given, with parentheses, the abbreviation "e.g.," or both. Unless explicitly otherwise stated, these examples and lists are merely exemplary and are non-exhaustive. In most cases, it would be prohibitive to list every example and every combination. Thus, smaller, illustrative lists and examples are used, with focus on imparting understanding of the claim terms rather than limiting the scope of such terms.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

Although one or more users may be shown and/or described herein as a single illustrated figure, those skilled in the art will appreciate that one or more users may be representative of one or more human users, robotic users (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") generally encompass active-state components and/or inactive-state components and/or standby-state components, unless context requires otherwise.

In the following detailed description, reference is made to the accompanying drawings, which form a part hereof. In the drawings, similar symbols typically identify similar or identical components or items, unless context dictates otherwise. The illustrative embodiments described in the detailed description, drawings, and claims are not meant to be limiting. Other embodiments may be utilized, and other changes may be made, without departing from the spirit or scope of the subject matter presented here.

The rapid advancement and miniaturization of integrated circuitry and microelectronics over the last three decades have greatly facilitated those in the mobile computing industry to develop functionally powerful computing/communication devices, from the original clunky brick-sized portable telephones to today's sleek cellular telephones and Smartphones, and from yesterday's bulky laptops to today's slim tablet computers and e-readers. One recent trend in the evolution of mobile computing is the development of wearable computing devices. That is, there are currently multiple efforts by various high-tech groups to develop computing/communication devices in the form of wearable computing devices. Such devices having very small form-factors that are designed to be worn by people and that will supposedly be able to provide various functionalities beyond simple time/chronograph functionalities including, for example, at least some communication capabilities (e.g., connectivity to Wi-Fi or cellular networks) and capabilities for executing applications (e.g., software programs). Examples of such wearable computing devices include, for example, head wearable computing devices such as augmented reality (AR) devices having the form of glasses or goggles and limb wearable computing devices having the form of computerized watches (otherwise known as "Smartwatches").

Although the recent advancements in the fields of integrated circuitry and microelectronics (e.g., microprocessors) make the eventual implementation of these wearable computing devices a likely inevitability, developers of such devices still face a number of hurdles that may prevent such devices from being able to provide the same type of functionalities that larger mobile devices (e.g., Smartphones, tablet computers, and so forth) can provide. One of the problems faced by developers of wearable computing devices is to try to cram into such small form-factor devices all of the components that may be necessary in order to provide the same functionalities provided by larger mobile devices. That is, because a wearable computing device (e.g., a head wearable computing device such as an AR device or a limb wearable computing device such as a Smartwatch) is designed to be worn by a user, it is generally preferable that such devices have relatively small form-factors and be relatively lightweight. As a result, such a device may only accommodate a small and/or limited number of core components including a power storage device (e.g., battery) that is relatively small (and as a result, with limited power storage capabilities) and light, and a relatively small communication system (e.g., a communication system that employs a small and/or limited number of antennas).

Another hurdle that must be addressed with respect to limb wearable computing devices (i.e., Smartwatches) is the very small user interfaces that may be employed by such devices which may make it difficult for users to provide input into such devices. In particular, and unlike larger mobile devices such as tablet computers and Smartphones, limb wearable computing devices can only accommodate relative small displays, thus it may be impractical for such devices to employ, for example, touchscreens. That is, because of the relative size of a user's fingers relative to the size of a display of a limb wearable computing device, integrating a small touchscreen into such devices for inputting data may not make much sense. Further, adding additional buttons or a keypad onto such a device may not be practical given the extremely small exterior surface real estate available on such devices Accordingly, systems, articles of manufacture and methods are provided herein that facilitate a head wearable computing device (e.g., an augmented reality device) to provide to a limb wearable computing device (i.e., Smartwatch) user input in the form of gesture indicative data indicative of one or more user gestures (e.g., hand and/or arm gestures). In some embodiments, the received gesture indicative data may be used in order to, for example, control or direct the operations of the limb wearable computing device.

More particularly, the systems, articles of manufacture and methods may be designed to, among other things, facilitate a head wearable computing device to receive one or more solicitations via one or more solicitation signals that solicit to provide to a limb wearable computing device gesture indicative data that is indicative of one or more user gestures; and direct the head wearable computing device to transmit to the limb wearable computing device the gesture indicative data via one or more low-power gesture indicative data signals, the limb wearable computing device being within the relatively limited communication range of the head wearable computing device.

Referring now FIG. 1A, which illustrates an exemplary user 2 wearing an exemplary head wearable computing device 10*, which may be in communication with a limb wearable computing device 20. Note that in the following, "*" represents a wildcard. Thus, references in the following description to, for example, "head wearable computing device 10*" may be in reference to the example head wearable computing device 10' of FIG. 4A or to the head wearable computing device 10" of FIG. 4B, which are two different implementations of the head wearable computing device 10* of FIG. 1A. Additionally, references in the following to the "head wearable computing device 10*" may also be in reference to the wearable computing device 10a of FIG. 1B, to the wearable computing device 10b of FIG. 1C, to the wearable computing device 10c of FIG. 1D, or to the wearable computing device 10d of FIG. 1E).

Because both the head wearable computing device 10* and the limb wearable computing device 20 are being worn by the same user 2, either of the devices (e.g., the head wearable computing device 10* or the limb wearable computing device 20) may need only a minimal amount of power in order to wirelessly communicate with each other. For example, if the head wearable computing device 10* needs to wirelessly communicate with the limb wearable computing device 20, then the head wearable computing device 10* may transmit wireless signals to the limb wearable computing device 20 using less than, for example, 0.8 milliwatt of transmit power. In some cases, it may be desirable to minimize the amount of transmit power used by the head wearable computing device 10* to communicate with the limb wearable computing device 20 in order to conserve power/energy.

Figure 1B:
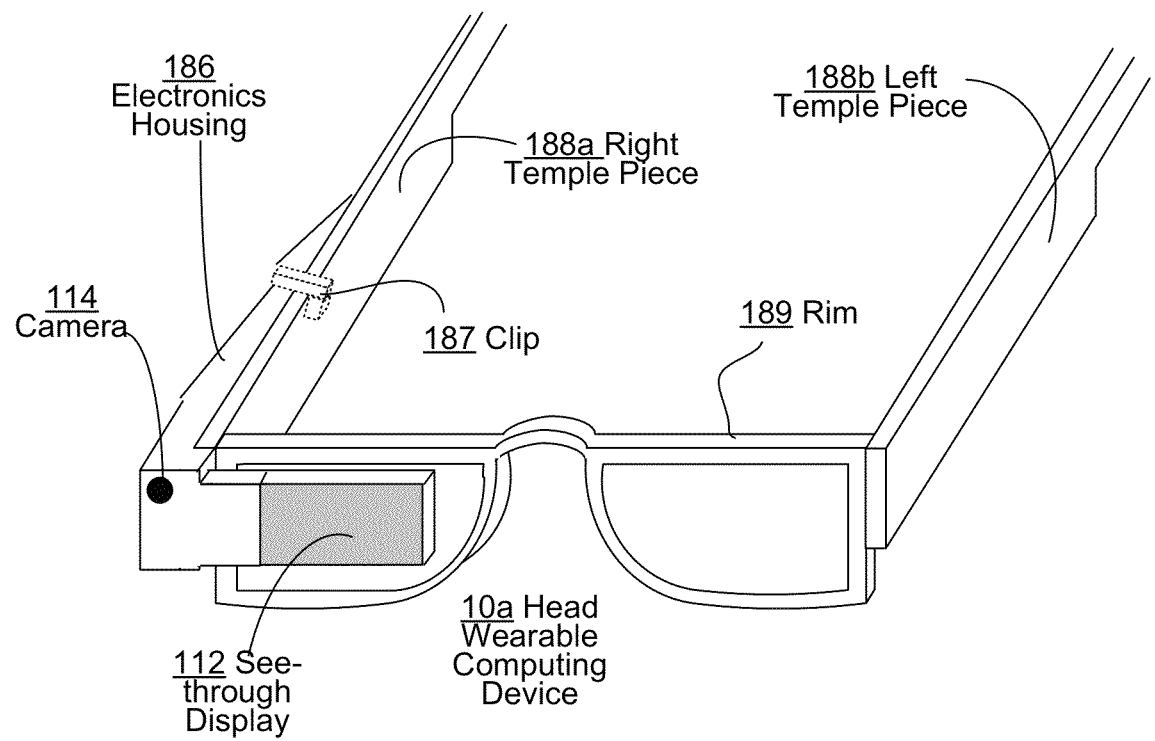
FIG. 1B shows a particular implementation of the head wearable computing device 10* of FIG. 1A.

In various embodiments, the head wearable computing device 10* of FIG. 1A, which may be an augmented reality device (AR), may come in a variety of form factors as illustrated in FIGS. 1B, 1C, 1D, and 1E. Referring particularly now to FIG. 1B, which illustrates a head wearable computing device 10a in the form of glasses with a single see-through display 112. The head wearable computing device 10a further includes at least one camera 114 for capturing images of hand and/or arm gestures (e.g., finger, hand, and/or arm movements). The camera 114 may be a variety of cameras including, for example, a digital video camera, an infrared camera such as those that employ black silicon CMOS sensors, and so forth. Note that in various embodiments, multiple cameras (e.g., visual sensors) may be employed rather than the single camera depicted in FIG. 1B. For example, in some cases, the head wearable computing device 10a may employ both a digital video camera and an infrared camera.

In addition to the see-through display 112 and the camera 114, the head wearable computing device 10a may include an electronic housing 186 (which may house the electronics), and/or a frame that comprises a right temple piece 188a, a left temple piece 188b, and a rim 189. The right temple piece 188a and the left temple piece 188b are designed to extend to and wrap around the ears of the user 2 and to couple the head wearable computing device 10a to the head of the user 2. Note that in some embodiments, the head wearable computing device 10a may comprise merely the electronic housing 186 and the electronics housed by the electronic housing 186, the see-through display 112, the camera 114, and a coupling component such as an optional clip 187 for coupling to a frame (e.g., the rim 189 and the right temple piece 188a and the left temple piece 188b). That is, the rim 189 and the right and left temple pieces 188* are optional and may not necessarily be required in various alternative embodiments.

Figure 1C:
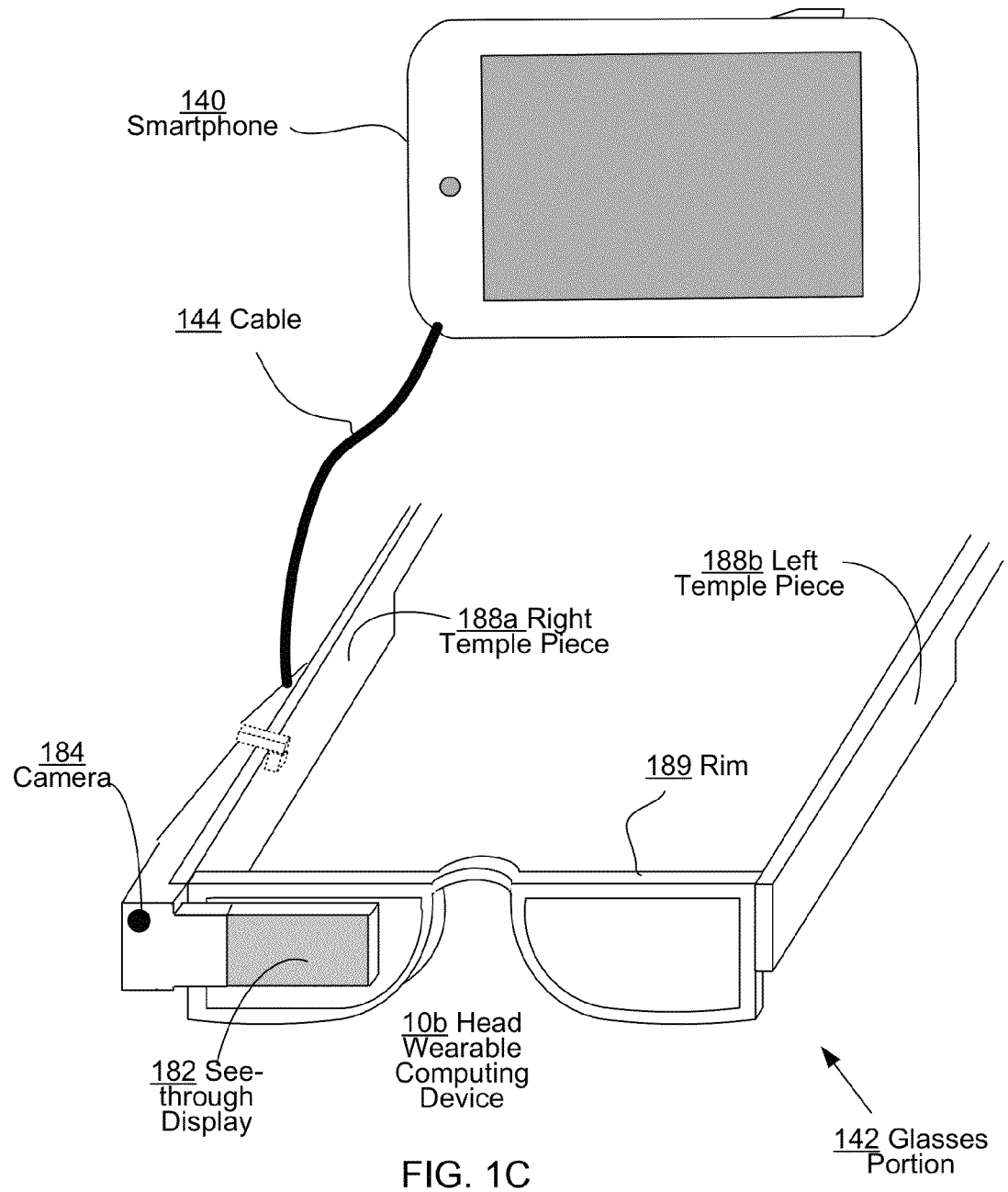
FIG. 1C shows another implementation of the head wearable computing device 10* of FIG. 1A.

Referring now to FIG. 1C, which illustrates a head wearable computing device 10b in the form of glasses, similar to the head wearable computing device 10a of FIG. 1B, but further including a Smartphone 140 coupled to glasses portion 142 via cable 144. That is, in this embodiments, the head wearable computing device 10b includes the Smartphone 140, glasses portion 142, and the cable 144. Note that the cable 144 is not drawn to scale for ease of illustration, and in reality would be much longer than as illustrated in FIG. 1C. The glasses portion 142 may include most of the components included in the head wearable computing device 10a of FIG. 1B including, for example, the see-through display 182, the camera 184, the temple pieces 188*, and so forth. In this embodiment, the Smartphone 140 may contain much of the electronics and may actually perform much of the processing operations.

Figure 1D:
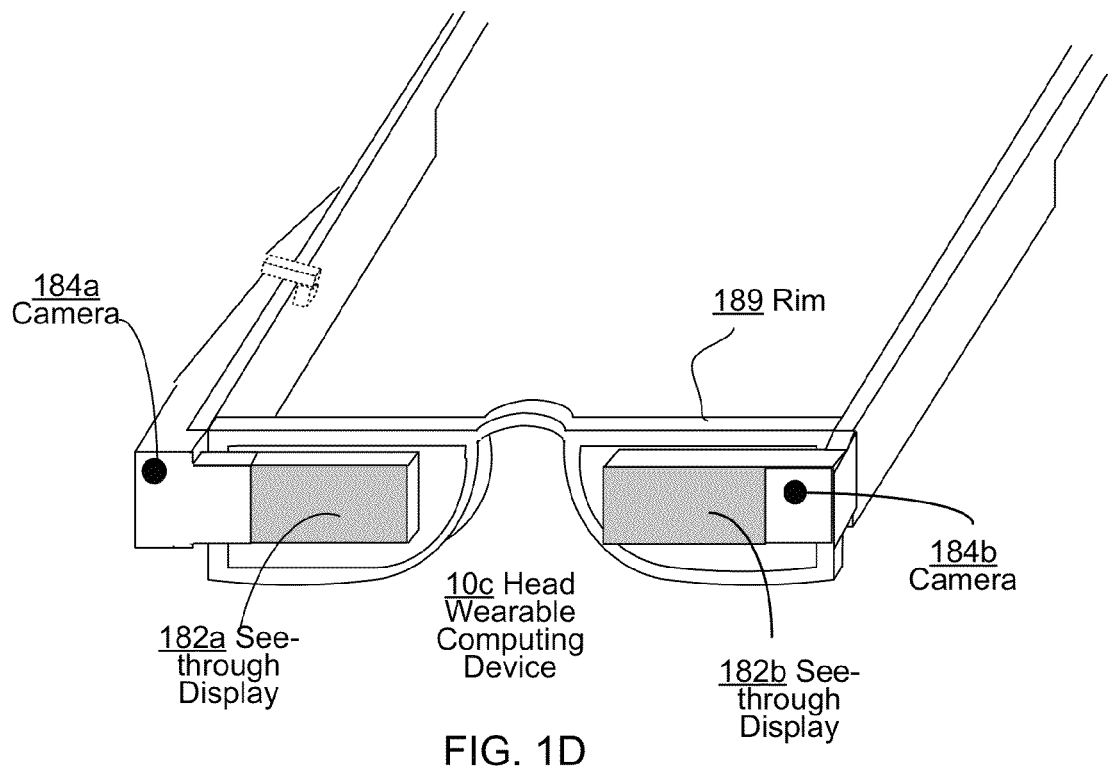
FIG. 1D shows another implementation of the head wearable computing device 10* of FIG. 1A.

Referring now to FIG. 1D, which illustrates a head wearable computing device 10c in the form of glasses, similar to the head wearable computing device 10a of FIG. 1B, but further employing a dual display/camera system. That is, the head wearable computing device 10c includes two see-through displays 182a and 182b and two cameras 184a and 184b. There are several possible benefits in using a dual or multi-camera system as illustrated, for example, in FIG. 1D. For example, by employing dual cameras 184* (or three or more cameras 184*), 3-dimensional perspectives of user gestures (e.g., hand gestures) may be obtained, which may provide more accurate views/depictions of user gestures.

Figure 1E:
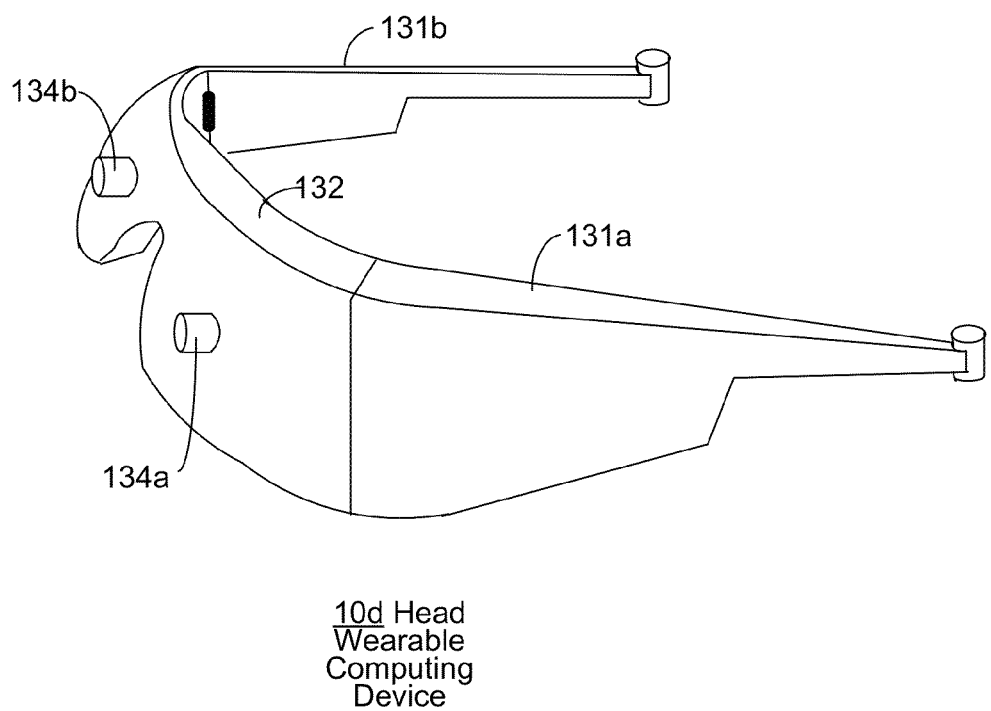
FIG. 1E shows another implementation of the head wearable computing device 10* of FIG. 1A.

Turning now to FIG. 1E, which illustrates a head wearable computing device 10d, in the form of goggles. Unlike the previous illustrated head wearable computing devices 10a, 10b, and 10c, in this case, the head wearable computing device 10d does not employ see-through displays 182*, but instead employs two cameras (two lenses 134a and 134b for the two cameras are shown in FIG. 1E) that provide images in real-time to two "regular" displays (not shown) rather than to two see-through displays. Examples of regular displays include liquid crystal displays (LCDs), light emitting diode (LED) displays, and so forth. The head wearable computing device 10d further including temple pieces 131a and 131b and rim portion 132. Note that all of the different embodiments of the limb wearable computing devices 10* illustrated in FIGS. 1B, 1C, 1D, and 1E include one or more components (e.g., temple pieces 188* or 131*, or clip 187) to facilitate at least a portion of the limb wearable computing device 10* to couple to the head of a user 2.

Figure 1F:
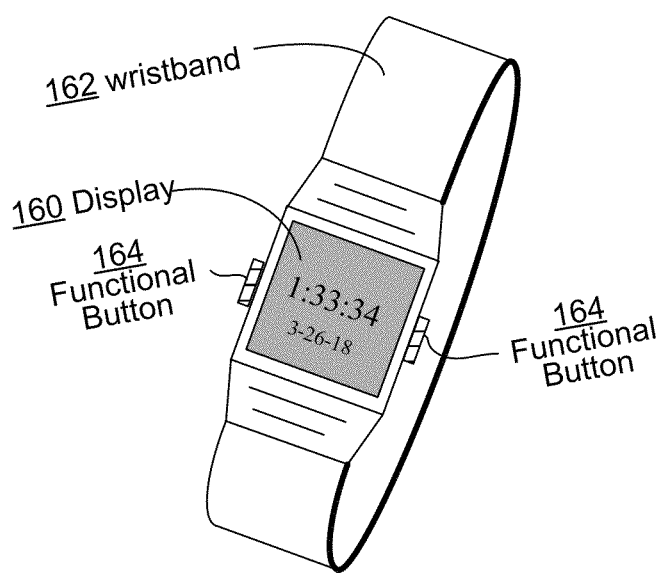
FIG. 1F shows a more detailed view of the limb wearable computing device 20 of FIG. 1A.

Turning now to FIG. 1F, which shows a more detailed view of the exemplary limb wearable computing device 20 illustrated in FIG. 1A. The limb wearable computing device 20 may be in the form of a computer wristwatch and may include a display 160 and a wristband 162 designed for wrapping around the wrist/arm of a user 2 (e.g., coupling with the limb of the user 2). The display 160 may be a variety of displays including, for example, an LED display or liquid crystal display (LCD). In various embodiments, the limb wearable computing device 20 may include one or more functional buttons 164 for activating or deactivating functionalities or for providing input. Note that because the surface real-estate of the limb wearable computing device 20 is limited, placing additional buttons onto the device may be impractical. That is, although it may be possible to add more buttons, the buttons that may be added may be extremely small, thus making it very difficult for user to use such buttons.

In various embodiments, the head wearable computing device 10* (e.g., the head wearable computing device 10a of FIG. 1B, the head wearable computing device 10b of FIG. 1C, the head wearable computing device 10c of FIG. 1D, or the head wearable computing device 10d of FIG. 1E) may wirelessly communicate with limb wearable computing device using, for example, the 2.4 GHz industrial, scientific and medical (ISM) frequency band (e.g., frequency range between 2.400 GHz and 2.4835 GHz), the 5 GHz ISM frequency band or the 5 GHz U-NII (Unlicensed National Information Infrastructure) frequency band (e.g., frequency range between 5.180 GHz and 5.825 GHz), or the 60 GHz (e.g., millimeter waveband or mmWave band with a frequency range between 57 and 64 GHz (U.S) or between 57 and 66 GHz (Japan and Europe)). Since it may be desirable in some cases to reduce or minimize the size of the communication range of the head wearable computing device 10*, the 60 GHz frequency band may be employed for communication between the head wearable computing device 10* and the one or more functional devices 20 since signals having frequencies from the 60 GHz frequency band tend to attenuate quickly in normal atmospheric conditions (e.g., attenuates quickly when passing through air and/or solid objects). The communication range of the head wearable computing device 10* may be defined as the spatial range of the head wearable computing device 10* from which another device can successfully detect signals transmitted by the head wearable computing device 10*. From another perspective, the communication range of the head wearable computing device 10* being a spatial volume that surrounds the head wearable computing device 10* and being externally defined by an enveloping boundary, where signals such as low-power signals (e.g., signals transmitted using 0.8 milliwatt or less of transmit power) transmitted by the head wearable computing device 10* being discernible over background noise within the enveloping boundary and not discernible over background noise outside the enveloping boundary.

Figure 2A:
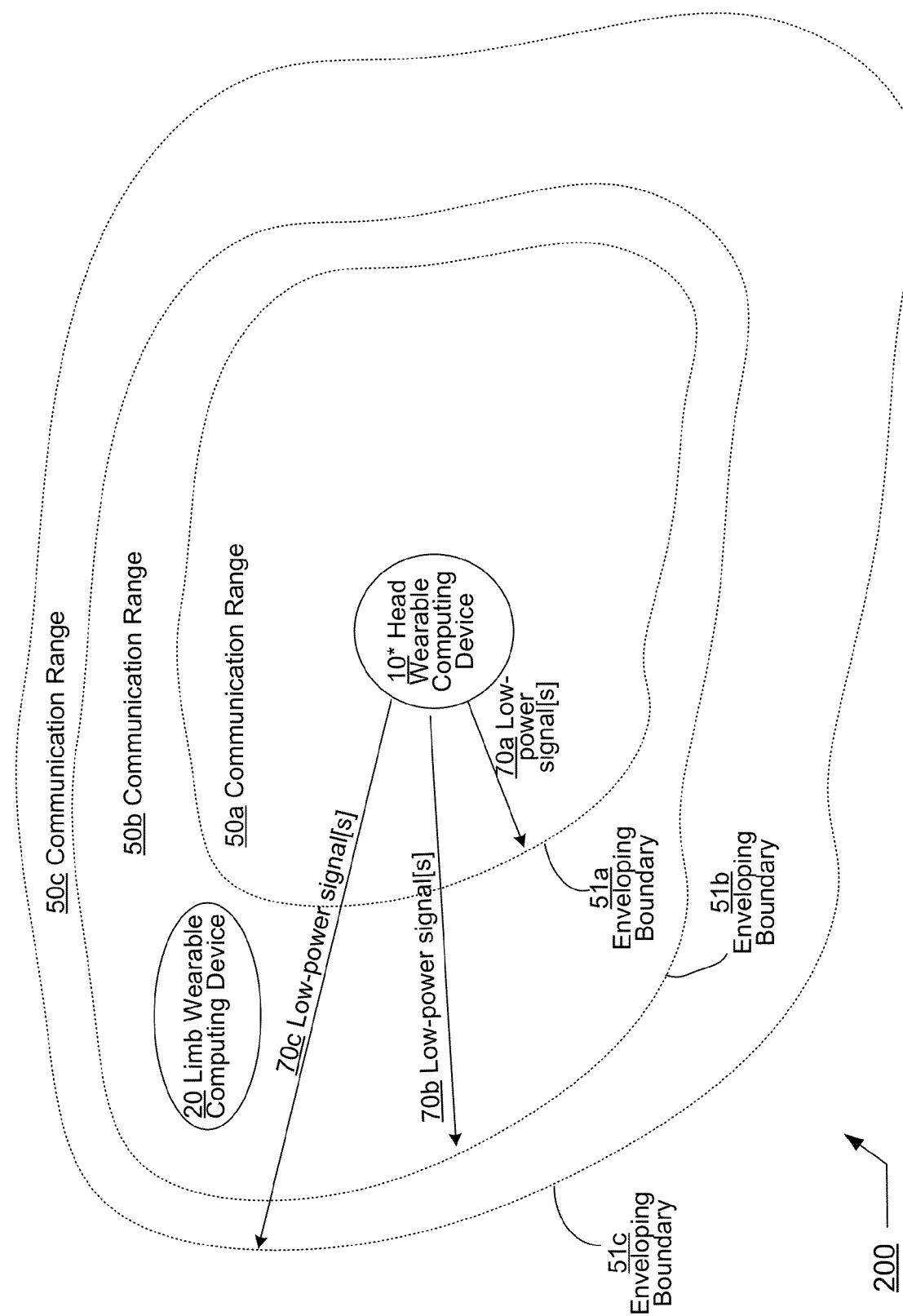
FIG. 2A is a high-level block diagram of one perspective of the head wearable computing device 10* of FIG. 1A operating in an exemplary environment 200.
Figure 2B:
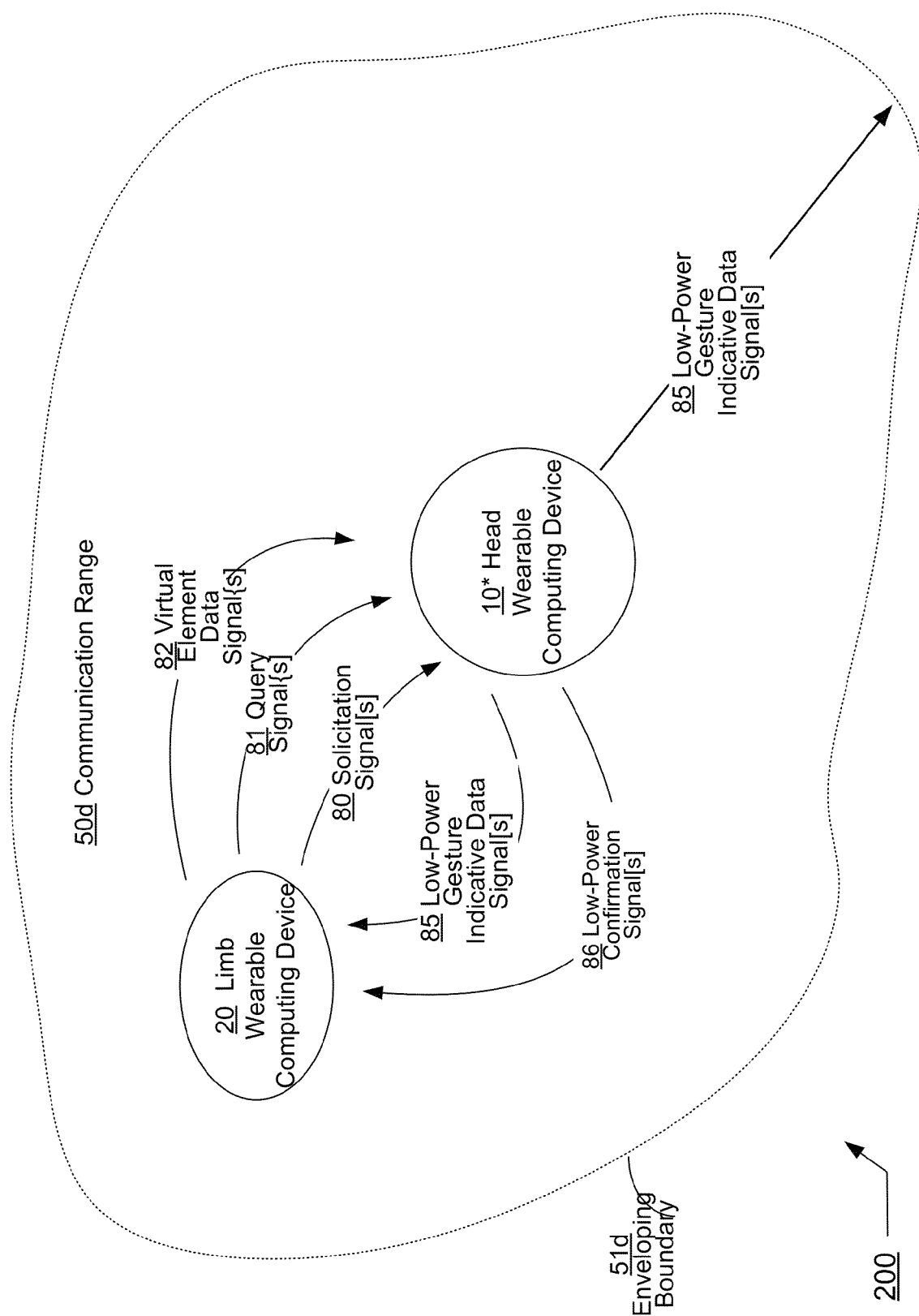
FIG. 2B is a high-level block diagram of another perspective of the example head wearable computing device 10* operating in the exemplary environment 200.
Figure 2C:
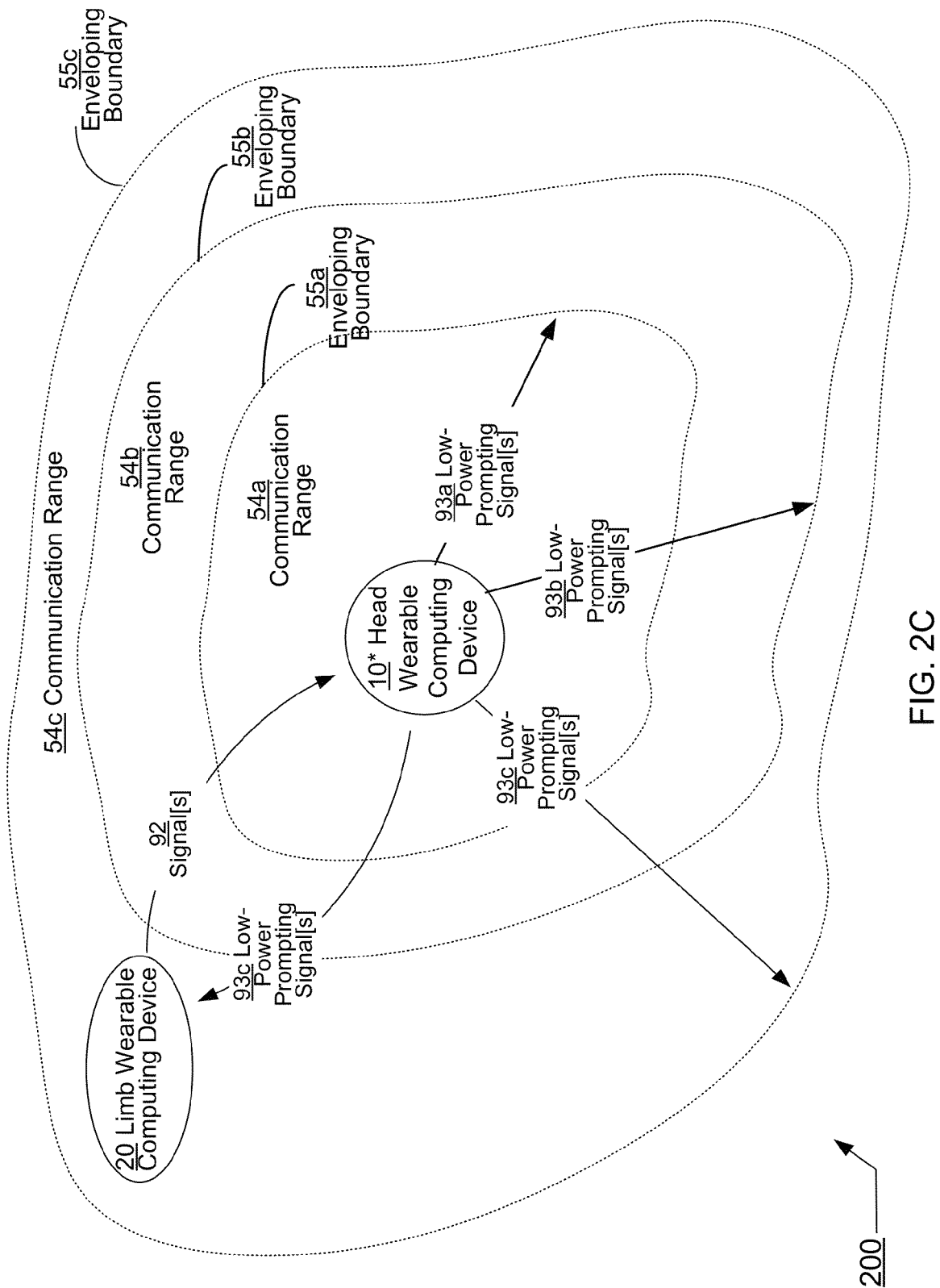
FIG. 2C is a high-level block diagram of still another perspective of the example head wearable computing device 10* operating in the exemplary environment 200.

Referring now to FIGS. 2A, 2B, and 2C which are block diagrams of the previously described head wearable computing device 10* (e.g., the head wearable computing device 10* of FIG. 1A, the head wearable computing device 10a of FIG. 1B, the head wearable computing device 10b of FIG. 1C, the head wearable computing device 10c of FIG. 1D, or the head wearable computing device 10d of FIG. 1E) operating in an exemplary environment 200 in accordance with various embodiments. More particularly, FIGS. 2A, 2B, and 2C introduce the various concepts that may be relevant for understanding the various processes and operations to be described herein. Turning particularly now to FIG. 2A, which illustrates how the head wearable computing device 10* may adjust its communication range 50* in order to successfully communicate with the limb wearable computing device 20. The communication range 50* of the head wearable computing device 10* may be expanded or shrunk by increasing or decreasing the transmit power used to transmit signals (e.g., low-power signals 70*). In order for the head wearable computing device 10* to wirelessly communicate with the limb wearable computing device 20, which is nearby, the head wearable computing device 10* may transmit low-power signals 70* to the limb wearable computing device 20 using a directional or omnidirectional antenna (note that since directional antennas can be more power efficient, in some embodiments, a directional antenna such as a metamaterial antenna may be employed by the head wearable computing device 10* rather than an omnidirectional antenna). In various embodiments, "low-power" signals are signals that may be wirelessly transmitted using less than 1 milliwatt of transmit power such as 0.8 milliwatt or less of transmit power.

Referring back to FIG. 2A, which shows three different communication ranges 50a, 50b, and 50c that may be generated when three different transmit powers are used by the head wearable computing device 10* to transmit low-power signals 70*. For example, if the head wearable computing device 10* uses a relatively low transmit power (e.g., 0.1 milliwatt) to transmit one or more low-power signals 70a, then a first communication range 50a may be generated that is externally defined by enveloping boundary 51a. Note that the first communication range 50a is not perfectly spherical or circular because in most cases, environmental conditions including the presence of objects will dictate the shape of a communication range 50*. Because the first communication range 50a is relatively small, the limb wearable computing device 20 is outside of the first communication range 50a, thus unable to detect the low-power signals 70a broadcasted by the head wearable computing device 10*.

By transmitting low-power signals 70b using a higher level of transmit power (e.g., 0.2 milliwatt), a larger communication range 50b (that is externally defined by enveloping boundary 51b) may be generated by the head wearable computing device 10\*. Because of the expanded communication range 50b, the limb wearable computing device 20 is within the communication range 50b, thus allowing the head wearable computing device 10\* to communicate with the limb wearable computing device 20. If the head wearable computing device 10\* transmits low-power signals 70c using even higher levels of transmit power (e.g., 0.3 milliwatt), an even larger communication range 50c (that is externally defined by enveloping boundary 51c) may be generated. However, having such a large communication range 50c is not necessary for communicating with the limb wearable computing device 20 since the smaller communication range 50b is sufficient to communicate with the limb wearable computing device 20. In addition, generating such a large communication range 50c is inefficient power-wise.

Referring now to FIG. 2B, which illustrates, among other things, how the head wearable computing device 10\* may transmit gesture indicative data via one or more low-power gesture indicative data signals 85 to the limb wearable computing device 20 in response to the head wearable computing device 10\* receiving one or more solicitations via one or more solicitation signals 80 from the limb wearable computing device 20 that solicits or requests for the gesture indicative data. In various embodiments, the gesture indicative data that may be provided to the limb wearable computing device 20 may be in the form of fully processed sensor data, semi-processed sensor data, or raw sensor data (e.g., camera provided image data). For example, in some embodiments, images of user gestures (e.g., hand gestures) executed by the user 2 and captured by the head wearable computing device 10\* may be processed (e.g. interpreted) in order to generate fully processed sensor data (e.g., textual data or data that indicates specific commands), which may then be provided to the limb wearable computing device 20. In alternative embodiments, raw image data of user gestures collected by the head wearable computing device 10\* may be provided to the limb wearable computing device 20. In still other embodiments, images of hand gestures captured by the head wearable computing device 10\* may be combined or merged with augmentations (e.g., virtual elements) that were presented through the head wearable computing device 10\*, and the resulting data (e.g., "semi-processed sensor data" since the user gestures were not interpreted) may be provided to the limb wearable computing device 20.

The one or more low-power gesture indicative data signals 85 that may be transmitted by the head wearable computing device 10\* to the limb wearable computing device 20 may be transmitted using 0.8 milliwatt or less of transmit power. In some cases, the one or more low-power gesture indicative data signals 85 may be transmitted using one or more frequencies from the 2.4 GHz ISM frequency band, the 5 GHz ISM or U-NII frequency band, or the 60 GHz frequency band (frequency band having a range between 57 and 66 GHz). The communication range 50d (with an enveloping boundary 51d) of the head wearable computing device 10\* in FIG. 2B is defined by the low-power gesture indicative data signals 85 broadcasted by the head wearable computing device 10\* using a directional antenna (or an omnidirectional antenna). As previously indicated, one advantage of using a directional antenna is that it is more power efficient than an omnidirectional antenna. Also, by using a directional antenna rather than, for example, an omnidirectional antenna, the amount of electromagnetic radiation that the user 2 is exposed to may be reduced by pointing the directional antenna away from the user 2.

As part of receiving the one or more solicitations via one or more solicitation signals 80, the head wearable computing device 10\* may also receive one or more queries via one or more query signals 81 from the limb wearable computing device 20. Various queries may be made through the one or more query signals 81 including, for example, when can the head wearable computing device 10\* provide the gesture indicative data, whether the head wearable computing device 10\* (or its cameras) has a view of the hand or hands of the user 2, whether the head wearable computing device 10\* can provide images of the user gestures (e.g., hand gestures), and so forth. In response to receiving the one or more query signals 81, the head wearable computing device 10\* may transmit to the limb wearable computing device 20, one or more confirmations via one or more "low-power" confirmation signals 86 (e.g., signals transmitted using 0.8 milliwatt or less of transmit power) that confirms, for example, that the head wearable computing device 10\* can indeed provide the gesture indicative data, when the gesture indicative data can be provided, and so forth.

In some embodiments, the head wearable computing device 10\* may receive from the limb wearable computing device 20 (or from another source) one or more virtual element data via one or more virtual element data signals 82. The virtual element data that may be received may be used by the head wearable computing device 10\* to generate and display one or more virtual elements such as the icons 312\* illustrated in FIG. 3C or the virtual keyboard 314 illustrated in FIG. 3D. These virtual elements displayed through the head wearable computing device 10\* may be designed to prompt the user 2 to exhibit certain user gestures (e.g., hand gestures) in order to provide user input. For example, by exhibiting the virtual keyboard 314, as illustrated in FIG. 3D, the user 2 may place her hands over the virtual keyboard 314 and "press" the various virtual keys 315 using the fingers of the user 2 in order to provide input. The wearable computing device 10\* may then capture the finger/hand movements of the user 2 relative to the virtual elements (e.g., virtual keys 315) in order to generate, for example, the gesture indicative data.

Referring now to FIG. 2C, which illustrates how the amount of transmit power needed by the head wearable computing device 10\* in order to communicate with limb wearable computing device 20 may be determined based on one or more signals 92. That is, there are at least two ways to determine, based on one or more signals 92 transmitted by the limb wearable computing device 20, the amount of transmit power (e.g., minimum amount of transmit power) needed by the head wearable computing device 10\* in order to successfully communicate with the limb wearable computing device 20. In a first embodiment, the one or more signals 92 may be one or more responsive signals that are transmitted by the limb wearable computing device 20 in response to the limb wearable computing device 20 receiving one or more low-power prompting signals 93c (e.g., signals transmitted using 0.8 milliwatt or less of transmit power and designed to prompt the receiving device, e.g., limb wearable computing device 20, to transmit responsive signals acknowledging reception of the low-power prompting signals 93c) from the head wearable computing device 10\*.

For this first embodiment, the limb wearable computing device 10\* may initially broadcast one or more low-power prompting signals 93a using an extremely low first transmit power (e.g., 0.05 milliwatt of transmit power) that results in a communication range 54a that is externally defined by enveloping boundary 55a. After transmitting the one or more low-power prompting signals 93a using the extremely low first transmit power for predefined amount of time, the limb wearable computing device 10\* may pause transmission of the one or more low-power prompting signals 93a in order to monitor for one or more responsive signals (e.g., signals 92). If no responsive signals are detected, then the head wearable computing device 10* may then transmit one or more low-power prompting signals 93b using a second transmit power (e.g., 0.10 milliwatt of transmit power) that results in a communication range 54b that is externally defined by enveloping boundary 55b. After transmitting the one or more low-power prompting signals 93b using second transmit power for predefined amount of time, the limb wearable computing device 10* may pause transmission of the one or more low-power prompting signals 93b in order to monitor for one or more responsive signals (e.g., signals 92). If no responsive signals are detected, this cycle of transmitting one or more low-power prompting signals 93c using a higher level of transmit power (e.g., 0.15 milliwatt of transmit power), and then monitoring for responsive signals (e.g., signals 92) may be repeated at least until the response signals are detected. Note that in the example illustrated in FIG. 2C, the third one or more low-power prompting signals 93c that was transmitted using a third transmit power (which results in a communication range 54c that is externally defined by enveloping boundary 55c) was transmitted using a sufficient amount of transmit power so that the limb wearable computing device 20 is able to detect the one or more low-power prompting signals 93c and transmit back to the head wearable computing device 10* one or more responsive signals (e.g., signals 92). These operations provide at least one means for determining the amount of transmit power needed by the head wearable computing device 10* in order to successfully communicate with the limb wearable computing device 20.

In a second embodiment, the one or more signals 92 may be one or more unsolicited beacon signals that may be transmitted by the limb wearable computing device 20 at regular, semi-regular, or random intervals. By measuring the signal strengths of the unsolicited beacon signals, and then checking, for example, a reference table that correlates detected signal strengths of beacon signals with required transmit powers, a determination can be made as to the amount of transmit power needed by the head wearable computing device 10* in order to successfully communicate with the limb wearable computing device 20. Generally, the stronger the signal strength of the detected beacon signals (signals 92), the lower the transmit power needed by the head wearable computing device 10* in order to successfully communicate with the limb wearable computing device 20 since an inference can be made that the limb wearable computing device 20 is close to the head wearable computing device 10* when the signal strength of the detected unsolicited beacon signal is detected as being relatively strong. A more detailed discussion related to the above described operations will be provided below in connection with the various processes to be described herein.

Figure 3A:
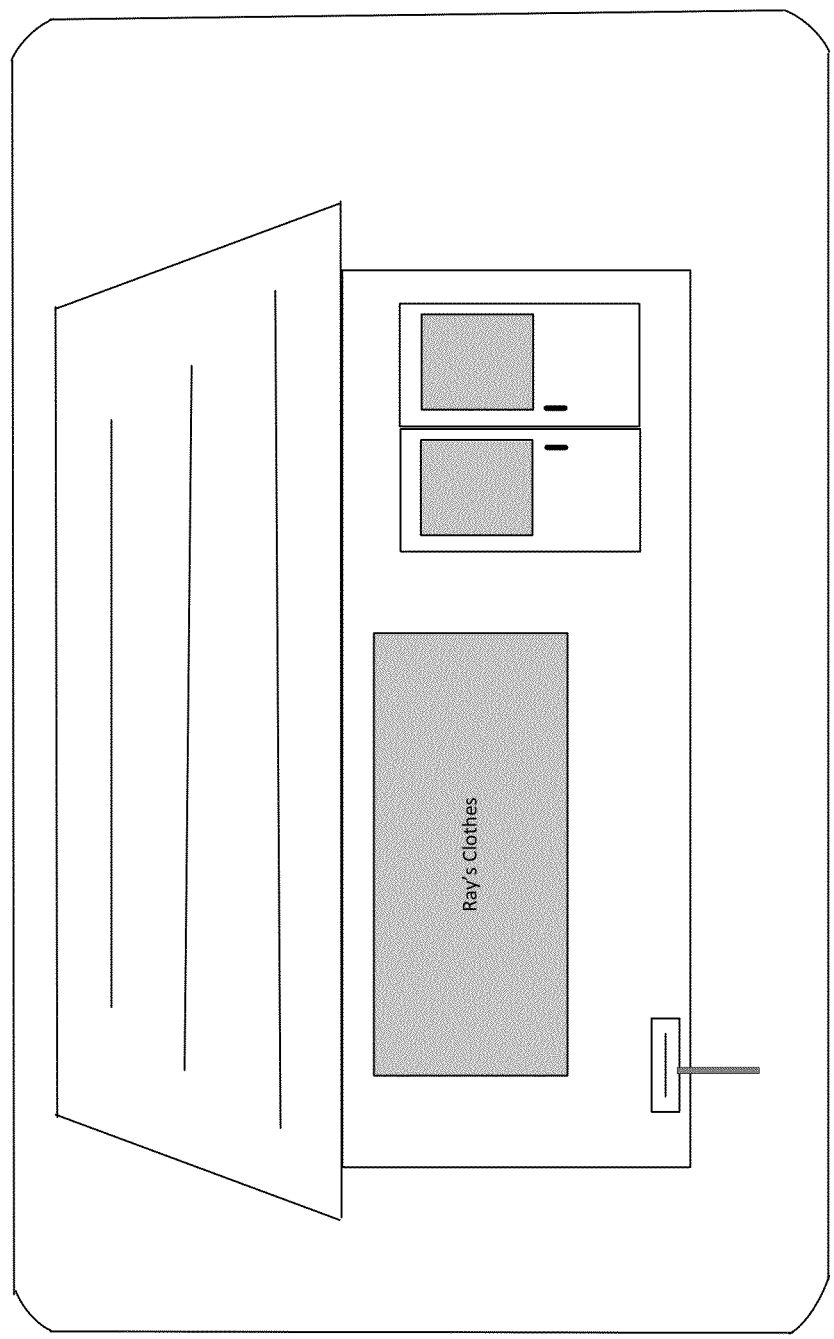
FIG. 3A shows an exemplary non-augmented view 301 of an exemplary actual scenery (e.g., a storefront) that may be displayed through the head wearable computing device 10* of FIG. 1A.

Turning now to FIG. 3A, which illustrates an example non-augmented view 301 of an actual scene of a storefront that may be displayed through head wearable computing device 10*, which may be an AR device that is designed to display actual as well as augmented views of actual scenery. Referring now to FIG. 3B, which illustrates an augmented view 302 of the actual storefront scene depicted in FIG. 3A. In particular, the augmented view 302 includes textual information 304 (e.g., general chronograph information) and textual information 305 (e.g., sales information related to the store detected in the actual scenery) that may be displayed by the head wearable computing device 10* during the course of normal operations. The augmented view 302 is actually a composite of elements from the actual scenery and virtual elements (e.g., textual elements 304 and 305).

Figure 3C:
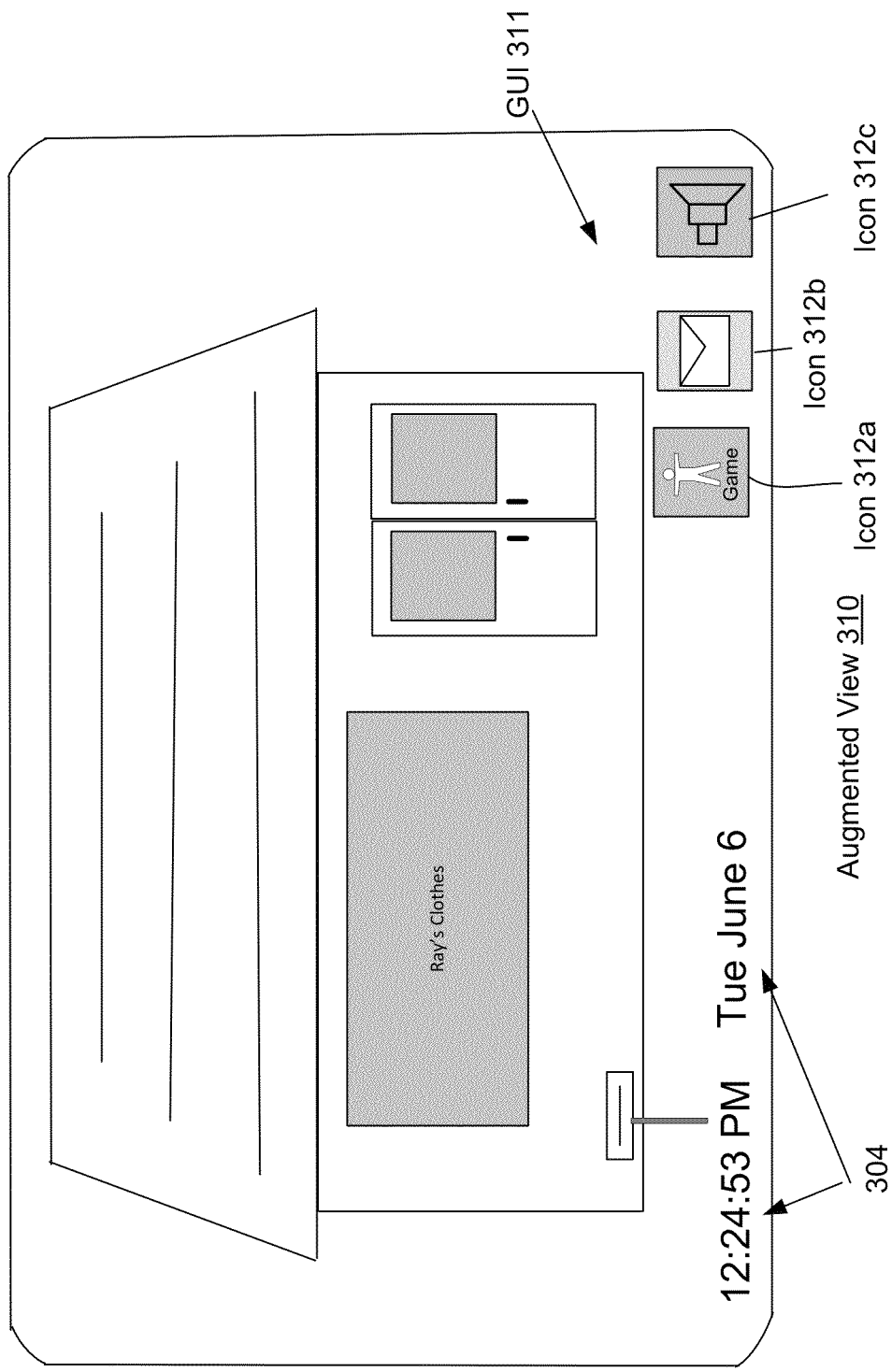
FIG. 3C shows another exemplary augmented view 310 that may be presented through the head wearable computing device 10* of FIG. 1A in accordance with some embodiments.
Figure 3D:
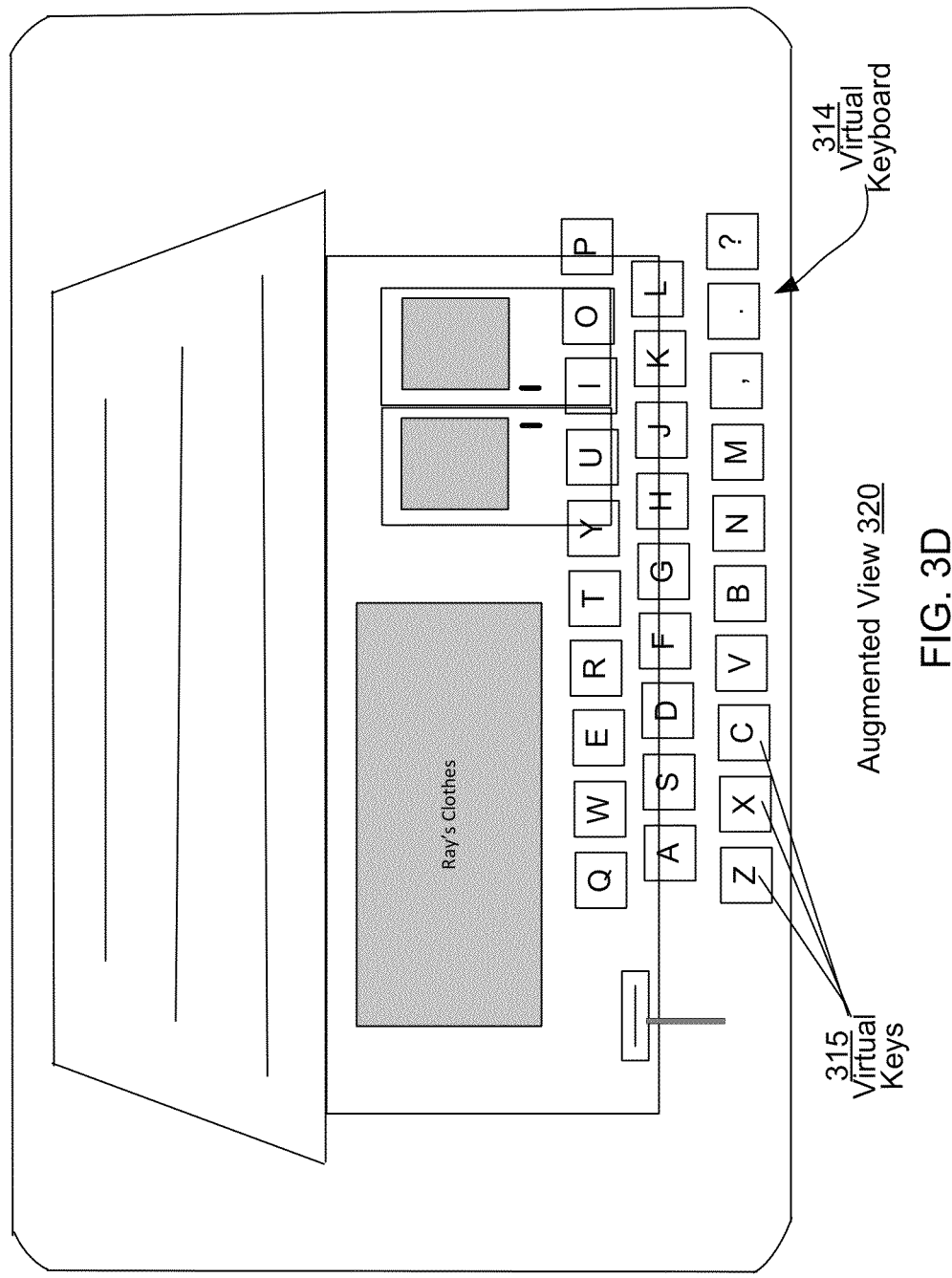
FIG. 3D shows another exemplary augmented view 320 that may be presented through the head wearable computing device 10* of FIG. 1A in accordance with some embodiments.

In contrast, FIGS. 3C and 3D illustrate exemplary augmented views 310 and 320 that may be displayed by the functional device 20b in response to head wearable computing device 10* receiving, for example, the one or more virtual element data signals 82 (see FIG. 2B) from the limb wearable computing device 20. Each of the augmented views 310 and 320 include one or more virtual elements (e.g., icons 312a, 312b, and 312c in FIG. 3C and a virtual keyboard 314 in FIG. 3D) that are generated based on the virtual element data provided through the one or more virtual element data signals 82. In some embodiments, the one or more virtual elements may be displayed to a user 2, which when viewed by the user 2 may prompt the user 2 to execute certain user gestures (e.g., hand or finger gestures) in order for the user 2 to provide user input. These user gestures may then be detected and/or recorded by the head wearable computing device 10* and provided to the limb wearable computing device 20.

Referring particularly now to FIG. 3C, which illustrates an augmented view 310 that may be displayed by the head wearable computing device 10* based on one or more virtual element data signals 82 transmitted, for example, by the limb wearable computing device 20 (note that in some alternative embodiments the one or more virtual element data signals 82 may be received from another source other than the limb wearable computing device 20). The augmented view 310 includes icon 312a, icon 312b, and icon 312c that may be selected by a user 2 for activating three different applications at the head wearable computing device 10*. For example, a user 2 may select any one of the three icons 312a, 312b, and 312c by executing one or more gestures (e.g., hand and/or arm gestures such as placing a finger over one of the icons and executing a "pushing" motion with the finger) in order to select an icon 312*. The gestures exhibited by the user 2 may be visually captured by one or more cameras of the head wearable computing device 10*, and the resulting image data or the processed version of the image data may then be transmitted to the limb wearable computing device 20, which may then process in order to, for example, activate one or more applications. In this example, icon 312a may be selected for activating a gaming application, icon 312b may be selected for activating an email application, and icon 312c may be selected for activating an audio/music application. These applications may actually be integrated in the limb wearable computing device 20 rather than at the head wearable computing device 10* so activating any one of the applications would cause the selected application to be activated at the limb wearable computing device 20.

Turning now to FIG. 3D, which illustrated another augmented view 320 that may be displayed by the head wearable computing device 10* based on one or more virtual element data signals 82 transmitted, for example, by the limb wearable computing device 20 (note that in some alternative embodiments the one or more virtual element data signals 82 may be received from another source other than the limb wearable computing device 20). The augmented view 320 includes a virtual keyboard 314 that further includes a plurality of virtual keys 315 for inputting data by a user 2. The user 2 may select any of the virtual keys 315 by making, for example, certain hand gestures relative to the virtual keys 315 (e.g., the user 2 may manipulate his hands so that his or her fingers are making pressing movements with respect to selective virtual keys 315. By executing such hand/finger gestures, the user 2 may input at least textual data. Note that although not depicted, in alternative embodiments, the virtual keys 315 may include keys for inputting numeric or other types of data rather than textual data input. The hand/finger gestures of the user 2 may be visually captured by one or more cameras of the head wearable computing device 10*, and the resulting image data or the processed version of the image data) may then be transmitted to the limb wearable computing device 20, which may then process the received data in order to, for example, control the operations of the limb wearable computing device 20.

Referring now to FIG. 3E, which illustrates an example actual view of a hand making hand gestures captured by the head wearable computing device 10*. In this example, the user 2 makes gestures using the index finger 344 of the right hand 342 by making circular movements with the index finger 344 relative to an actual visual element (e.g., the face of the limb wearable computing device 20, which is wrapped around the left wrist 340 of the user 2). The meaning of such a gesture may be randomly selected. For example, in some embodiment, the circular motion illustrated in FIG. 3E may be used to change the time displayed through the limb wearable computing device 20 (clockwise movements may advance the time while counterclockwise movement of the index finger 344 may move back the time displayed through the limb wearable computing device 20). Note that in some alternative embodiments, the head wearable computing device 10* may be designed to capture images of hand/arm gestures without reference to any virtual or actual visual items. For example, in some embodiments, the head wearable computing device 10* may capture images of "naked" hand gestures reflecting, for example, American sign language.

Figure 4A:
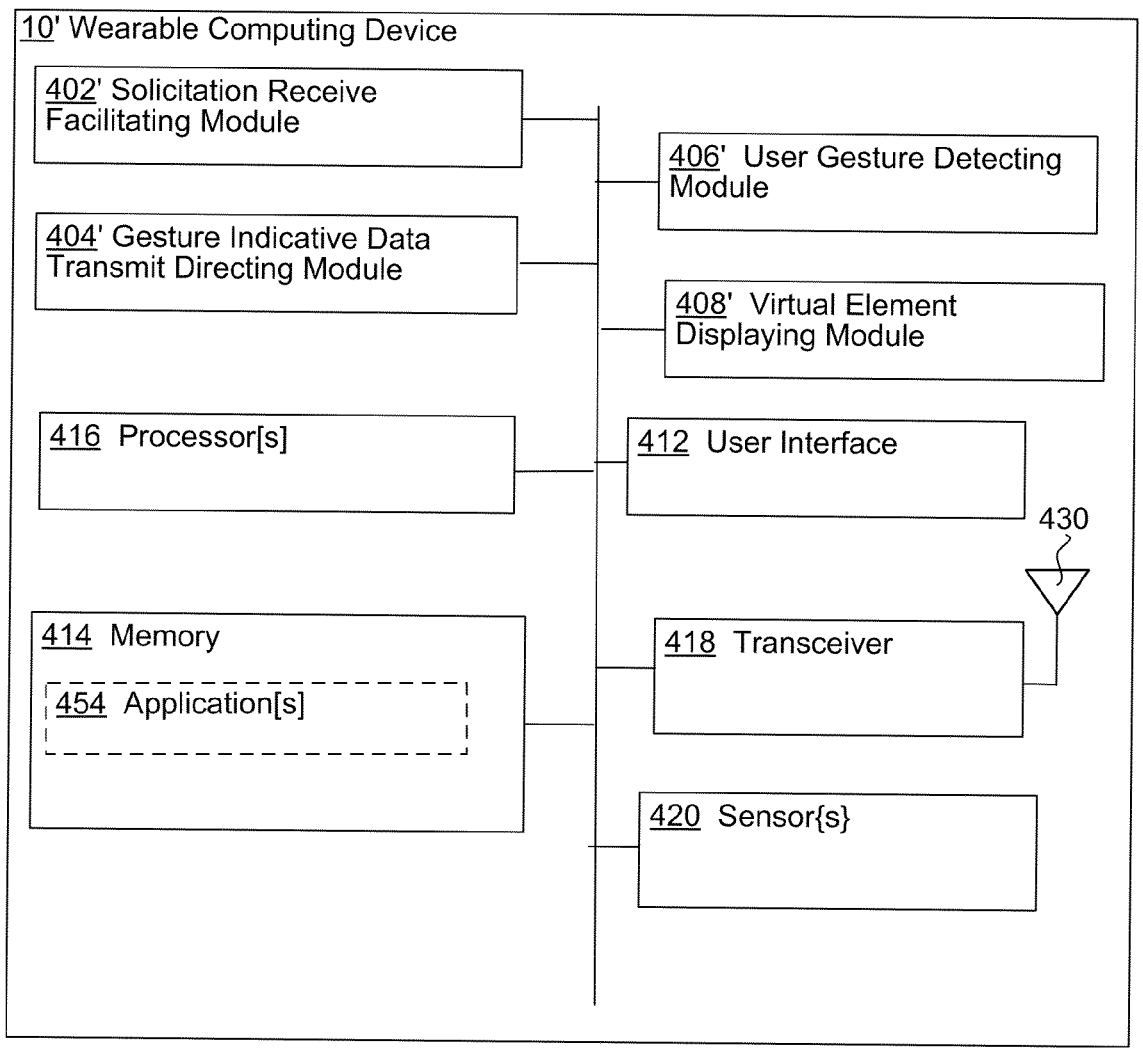
FIG. 4A shows a block diagram of particular implementation of the head wearable computing device 10* of FIGS. 1A, 2A, 2B, and 2C.
Figure 4B:
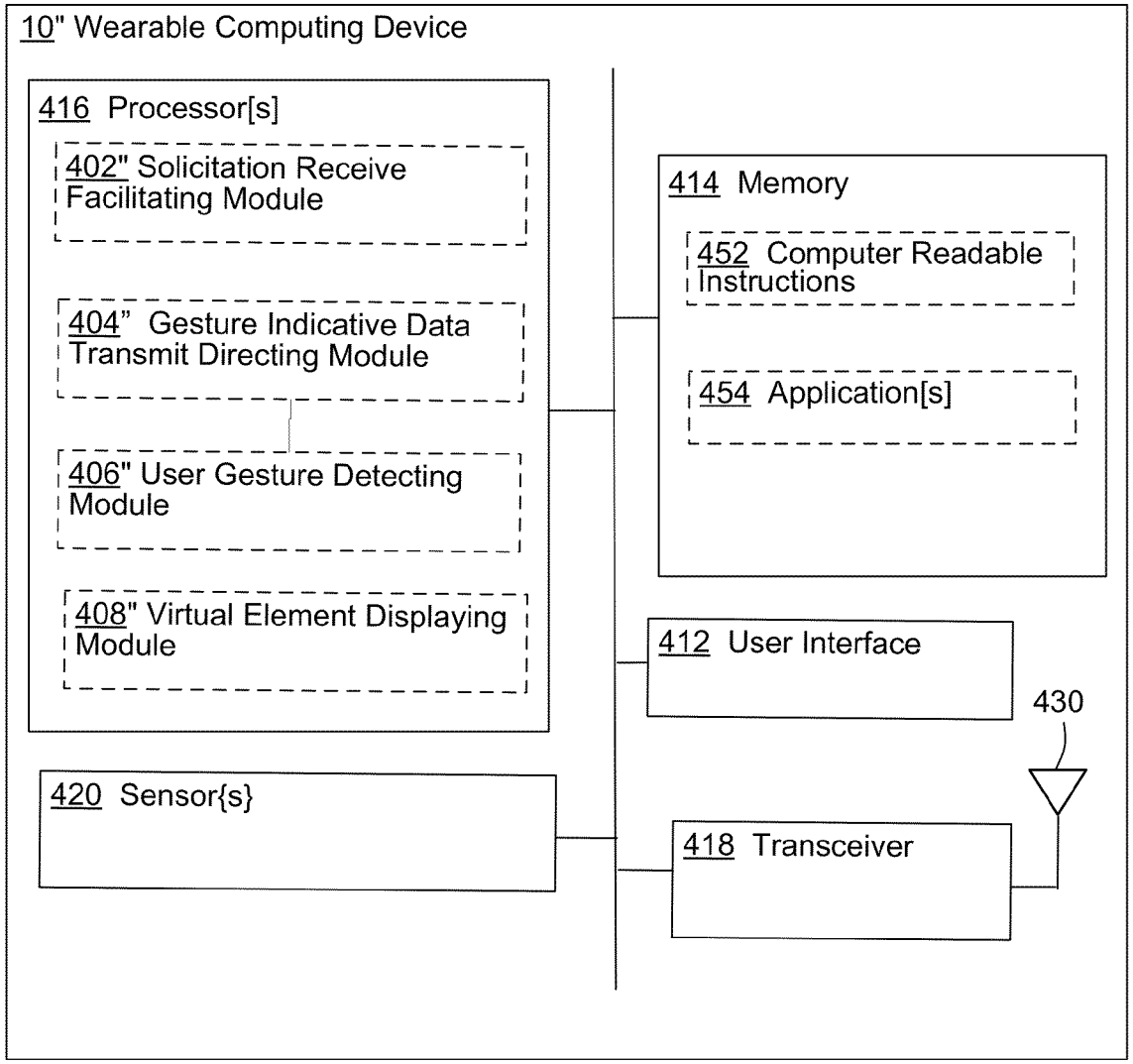
FIG. 4B shows a block diagram of another implementation of the head wearable computing device 10* of FIGS. 1A, 2A, 2B, and 2C

Referring now to FIGS. 4A and 4B, illustrating two block diagrams representing two different implementations of the head wearable computing device 10* of FIGS. 1A, 1B, 1C, 1D, 1E, 2A, 2B, and/or 2C and that are designed to execute the operations and processes to be described herein. In particular, and as will be further described herein, FIG. 4A illustrates a head wearable computing device 10' that is the "hardwired" or "hard" implementation of a small form-factor limb wearable device that can implement the operations and processes to be described herein. The head wearable computing device 10' may comprise certain logic modules including, for example, a solicitation receive facilitating module 402', a gesture indicative data transmit directing module 404', a user gesture detecting module 406', and/or a virtual element displaying module 408' that are implemented using purely hardware or circuitry components (e.g., application specific integrated circuit or "ASIC"). In contrast, FIG. 4B illustrates a head wearable computing device 10" that is the "soft" implementation of a small form-factor wearable device that can implement the operations and processes to be described herein. In various embodiments, the head wearable computing device 10" may also include certain logic modules including, for example, a solicitation receive facilitating module 402", a gesture indicative data transmit directing module 404", a user gesture detecting module 406", and/or a virtual element displaying module 408" that are implemented using electronic circuitry (e.g., one or more processors 116 including one or more microprocessors, controllers, etc.) executing one or more programming instructions (e.g., software in the form of computer readable instructions 452—see FIG. 4B).

The embodiments of the head wearable computing device 10* illustrated in FIGS. 4A and 4B are two extreme implementations of a small form-factor limb wearable system in which all of the logic modules (e.g., the solicitation receive facilitating module 402', the gesture indicative data transmit directing module 404', the user gesture detecting module 406' and the virtual element displaying module 408') are implemented using purely hardware solutions (e.g., circuitry such as ASIC) as illustrated in, for example, FIG. 4A or in which all of the logic modules (e.g., the solicitation receive facilitating module 402", the gesture indicative data transmit directing module 404", the user gesture detecting module 406", and the virtual element displaying module 408") are implemented using software solutions (e.g., programmable instructions in the form of computer readable instructions 452 being executed by hardware such as one or more processors 416) as illustrated in, for example, FIG. 4B. Since there are many ways of combining hardware, software, and/or firmware in order to implement the various logic modules (e.g., the solicitation receive facilitating module 402*, the gesture indicative data transmit directing module 404*, the user gesture detecting module 406*, and the virtual element displaying module 408*), only the two extreme implementations (e.g., the purely hardware solution as illustrated in FIG. 4A and the software solution of FIG. 4B) are illustrated here. It should be noted here that with respect to the "soft" implementation illustrated in FIG. 4B, hardware in the form of circuitry such as one or more processors 116 are still needed in order to execute the software. Further details related to the two implementations of the head wearable computing device 10* illustrated in FIGS. 4A and 4B will be provided in greater detail below.

In still other implementations, the head wearable computing device 10* may not actually include the various logic modules (e.g., the solicitation receive facilitating module 402*, the gesture indicative data transmit directing module 404*, the user gesture detecting module 406*, and the virtual element displaying module 408*) that implements the various operations/processes described herein. Instead, such logic modules may be located in a remote device such as at another device located near the head wearable computing device 10* (e.g., another computing device located within the communication range 50* of the head wearable computing device 10*). In such implementations, the other device having the various logic may direct or instruct the head wearable computing device 10* to perform at least some of the processes and operations to be described herein.

In some instances, one or more components may be referred to herein as "configured to," "configured by," "configurable to," "operable/operative to," "adapted/adaptable," "able to," "conformable/conformed to," "designed to," etc. Those skilled in the art will recognize that such terms (e.g., "configured to") generally encompass active-state components and/or inactive-state components and/or standby-state components, unless context requires otherwise.

Referring particularly now to FIG. 4A, which illustrates a block diagram of a head wearable computing device 10' that includes a solicitation receive facilitating module 402', a gesture indicative data transmit directing module 404', a user gesture detecting module 406', a virtual element displaying module 408', memory 414, user interface 412 (e.g., a display, a speaker, and so forth), one or more processors 416 (e.g., one or more microprocessors), transceiver 418, one or more sensors 420, and an antenna 430 (e.g., a directional antenna such as a metamaterial antenna, or an omnidirectional antenna). In various embodiments, the memory 414 may store one or more applications 454 (e.g., hand gesture recognition application, facial recognition application, visual object recognition application, and so forth). The one or more sensors 420 that may be included in the head wearable computing device 10' may include, for example, one or more audio sensors (e.g., microphones), one or more visual sensors (e.g., one or more cameras including one or more infrared cameras that employ, for example, black silicon sensors), and so forth.

In various embodiments, the solicitation receive facilitating module 402' of the head wearable computing device 10' of FIG. 4A is a logic module that may be designed to, among other things, facilitate the head wearable computing device 10' to receive one or more solicitations via one or more solicitation signals 80 that solicit to provide to a limb wearable computing device 20 gesture indicative data that is indicative of one or more user gestures, the head wearable computing device 10' being designed to be worn on a head of a user 2 and the limb wearable computing device 20 being designed to be worn around a limb of a user 2. In contrast, the gesture indicative data transmit directing module 404' of FIG. 4A is a logic module that may be configured to direct the head wearable computing device 10' to transmit to the limb wearable computing device 20 the gesture indicative data via one or more low-power gesture indicative data signals 85, the limb wearable computing device 20 being within communication range 50$d$ (see FIG. 2B) of the head wearable computing device 10', the communication range being a spatial volume that includes the head wearable computing device 10' and being externally defined by an enveloping boundary 51$d$, where the one or more low-power gesture indicative data signals 85 transmitted by the head wearable computing device 10' being discernible over background noise within the enveloping boundary 51$d$ and not discernible over background noise outside the enveloping boundary 51$d$. The user gesture detecting module 406' of FIG. 4A, on the other hand, is a logic module that may be configured to detect, via the head wearable computing device 10', the one or more user gestures in order to generate the gesture indicative data. Meanwhile, the virtual element displaying module 408' of FIG. 4A is a logic module that may be configure to display, via the head wearable computing device 10', one or more virtual elements in order to prompt a user 2 to exhibit the one or more user gestures with respect to the one or more virtual elements (e.g., icons 312* of FIG. 3C or virtual keyboard 314 of FIG. 3D)

Turning now to FIG. 4B, which illustrates a block diagram of another head wearable computing device 10" that can implement the operations and processes to be described herein. As indicated earlier, the head wearable computing device 10" in FIG. 4B is merely the "soft" version of the head wearable computing device 10' of FIG. 4A because the various logic modules: the solicitation receive facilitating module 402", the gesture indicative data transmit directing module 404", the user gesture detecting module 406", and the virtual element displaying module 408" are implemented using one or more processors 416 (e.g., one or more microprocessors or controllers) executing software (e.g., computer readable instructions 452) rather than being implemented using purely hardware (e.g., ASIC) solutions as was the case in the head wearable computing device 10' of FIG. 4A. Thus, the solicitation receive facilitating module 402", the gesture indicative data transmit directing module 404", the user gesture detecting module 406", and the virtual element displaying module 408" of FIG. 4B may be designed to execute the same functions as the solicitation receive facilitating module 402', the gesture indicative data transmit directing module 404', the user gesture detecting module 406', and the virtual element displaying module 408" of FIG. 4A. The head wearable computing device 10", as illustrated in FIG. 4B, may include other components (e.g., the user interface 412, the transceiver 418, antenna 430, memory 414 that stores one or more applications 454 as well as the computer readable instructions 452, and so forth) that are the same or similar to the other components that may be included in the head wearable computing device 10' of FIG. 4A. Note that in the embodiment of the head wearable computing device 10" illustrated in FIG. 4B, the various logic modules (e.g., the solicitation receive facilitating module 402", the gesture indicative data transmit directing module 404", the user gesture detecting module 406", and the virtual element displaying module 408") may be implemented by the one or more processors 416 (or other types of circuitry such as field programmable gate arrays or FPGAs) executing one or more computer readable instructions 452 stored in memory 414.

In various embodiments, the memory 414 of the head wearable computing device 10' of FIG. 4A and the head wearable computing device 10" of FIG. 4B may comprise one or more of mass storage device, read-only memory (ROM), programmable read-only memory (PROM), erasable programmable read-only memory (EPROM), cache memory such as random access memory (RAM), flash memory, synchronous random access memory (SRAM), dynamic random access memory (DRAM), and/or other types of memory devices.

Turning now to FIG. 5A illustrating a particular implementation of the solicitation receive facilitating module 402* (e.g., the solicitation receive facilitating module 402' or the solicitation receive facilitating module 402") of FIGS. 4A and 4B. As illustrated, the solicitation receive facilitating module 402* may include one or more sub-logic modules in various alternative implementations. For example, in various embodiments, the solicitation receive facilitating module 402* may include a component receive directing module 502 (which may further include a transceiver receive directing module 504 and/or a directional antenna pointing module 508), a component receive configuring module 510 (which may further include a transceiver receive configuring module 512), and/or a query receive facilitating module 514. Specific details related to the solicitation receive facilitating module 402* as well as the above-described sub-modules of the solicitation receive facilitating module 402* will be provided below with respect to the operations and processes to be described herein.

Turning now to FIG. 5B illustrating a particular implementation of the gesture indicative data transmit directing module 404* (e.g., the gesture indicative data transmit directing module 404' or the gesture indicative data transmit directing module 404") of FIGS. 4A and 4B. As illustrated, the gesture indicative data transmit directing module 404* may include one or more sub-logic modules in various alternative implementations. For example, in various embodiments, the gesture indicative data transmit directing module 404* may include a component transmit directing module 516 that may further include a transceiver transmit directing module 518 and/or a directional antenna pointing module 520, and/or a transmit power requirement determining module 522 that may further include a prompting signal transmit directing module 524, a responsive signal monitor directing module 526, a minimum transmit power requirement determining module 528, and/or a beacon signal based transmit power requirement determining module 530 (which may further include a beacon signal strength determining module 532 that may further include a reference table comparing module 534). Specific details related to the gesture indicative data transmit directing module 404* as well as the above-described sub-modules of the gesture indicative data transmit directing module 404* will be provided below with respect to the operations and processes to be described herein.

FIG. 5C illustrates a particular implementation of the user gesture detecting module 406* (e.g., the user gesture detecting module 406' or the user gesture detecting module 406") of FIG. 4A or 4B. As illustrated, the user gesture detecting module 406* may include one or more sub-logic modules in various alternative embodiments. For example, in various embodiments, the user gesture detecting module 406* may include a user gesture detect directing module 536 and/or a user gesture visual detecting module 538 (which may further include an image capturing device activating module 540. Specific details related to the user gesture detecting module 406\*, as well as the above-described sub-modules of the user gesture detecting module 406\*, will be provided below with respect to the operations and processes to be described herein.

Figure 6:
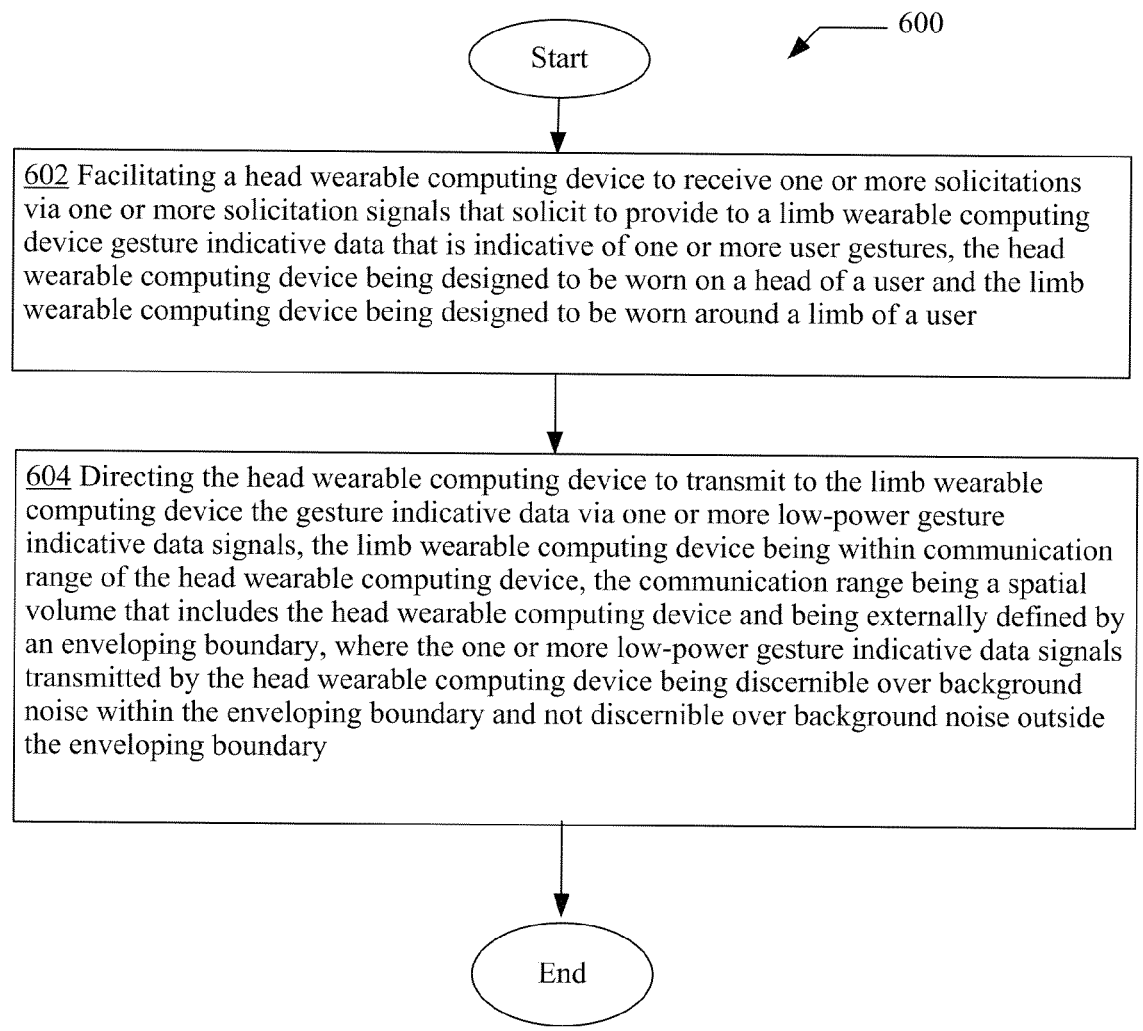
FIG. 6 is a high-level logic flowchart of a process, e.g., operational flow 600, according to some embodiments.

In the following, various operations associated with the above described head wearable computing device 10\* (e.g., the head wearable computing device 10' of FIG. 4A or the head wearable computing device 10" of FIG. 4B) will be presented in accordance with various alternative embodiments. FIG. 6, for example, illustrates an operational flow 600 representing example computationally-implemented operations that may be implemented for, among other things, facilitating a head wearable computing device 10\* to receive one or more solicitations via one or more solicitation signals 80 (see FIG. 2B) that solicit to provide to a limb wearable computing device 20 gesture indicative data that is or are indicative of one or more user gestures; and directing the head wearable computing device 10\* to transmit to the limb wearable computing device 20 the gesture indicative data via one or more low-power gesture indicative data signals 85 (see FIG. 2B). In some implementations, at least some portions of these operations may be implemented through the head wearable computing device 10\* of, for example, FIG. 4A or 4B.

In FIG. 6 and in the following figures that include various examples of operational flows, discussions and explanations will be provided with respect to the head wearable computing device 10\* described above and as illustrated in FIGS. 4A, 4B, 5A, 5B, 5C, and/or with respect to other examples (e.g., as provided in FIGS. 1A, 1B, 1C, 1D, 1E, 1F, 2A, 2B, 2C, 3A, 3B, 3C, 3D, and 3E) and contexts. However, it should be understood that the operational flows may be executed in a number of other environments and contexts, and/or in modified versions of FIGS. 1A, 1B, 1C, 1D, 1E, 1F 1G, 2A, 2B, 2C, 3A, 3B, 3C, 3D, 3E, 4A, 4B, 5A, 5B, and/or 5C. Also, although the various operational flows are presented in the sequence(s) illustrated, it should be understood that the various operations may be performed in orders other than those which are illustrated, or may be performed concurrently.

Further, in FIG. 6 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently. Still further, these operations illustrated in FIG. 6, as well as the other operations to be described herein, are performed by at least one of a machine, an article of manufacture, or a composition of matter unless indicated otherwise.

For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

In any event, after a start operation, the operational flow 600 of FIG. 6 may move to a solicitation receive facilitating operation 602 for facilitating a head wearable computing device to receive one or more solicitations via one or more solicitation signals that solicit to provide to a limb wearable computing device gesture indicative data that is indicative of one or more user gestures, the head wearable computing device being designed to be worn on a head of a user and the limb wearable computing device being designed to be worn around a limb of a user. For instance, and as illustration, the solicitation receive facilitating module 402\* of the head wearable computing device 10\* of FIG. 4A or 4B (e.g., the solicitation receive facilitating module 402' of FIG. 4A or the solicitation receive facilitating module 402" of FIG. 4B) facilitating a head wearable computing device 10\* (e.g., configuring or directing one or more components of the head wearable computing device 10\*) to receive one or more solicitations via one or more solicitation signals 80 (see, for example, FIG. 2B) that solicit to provide to a limb wearable computing device 20 gesture indicative data that is indicative of one or more user gestures (e.g., hand and/or arm gestures), the head wearable computing device 10\* being designed to be worn on the head of a user 2 and the limb wearable computing device 20 being designed to be worn around a limb (e.g., an arm) of a user 2.

Operational flow 600 may also include a gesture indicative data transmit directing operation 604 for directing the head wearable computing device to transmit to the limb wearable computing device the gesture indicative data via one or more low-power gesture indicative data signals, the limb wearable computing device being within communication range of the head wearable computing device, the communication range being a spatial volume that includes the head wearable computing device and being externally defined by an enveloping boundary, where the one or more low-power gesture indicative data signals transmitted by the head wearable computing device being discernible over background noise within the enveloping boundary and not discernible over background noise outside the enveloping boundary. For instance, the gesture indicative data transmit directing module 404\* (e.g., the gesture indicative data transmit directing module 404' of FIG. 4A or the gesture indicative data transmit directing module 404" of FIG. 4B) of the head wearable computing device 10\* of FIG. 4A or 4B directing the head wearable computing device 10\* to transmit to the limb wearable computing device 20 the gesture indicative data via one or more low-power gesture indicative data signals 85 (see, for example, FIG. 2B), the limb wearable computing device 20 being within communication range 50*d* (see, for example, FIG. 2B) of the head wearable computing device 10\*, the communication range 50*d* being a spatial volume that includes the head wearable computing device 10\* and being externally defined by an enveloping boundary 51*d* (see, for example, FIG. 2B), where the one or more low-power gesture indicative data signals 85 transmitted by the head wearable computing device 10\* being discernible over background noise within the enveloping boundary 51*d* and not discernible over background noise outside the enveloping boundary 51*d*.

Figure 7A:
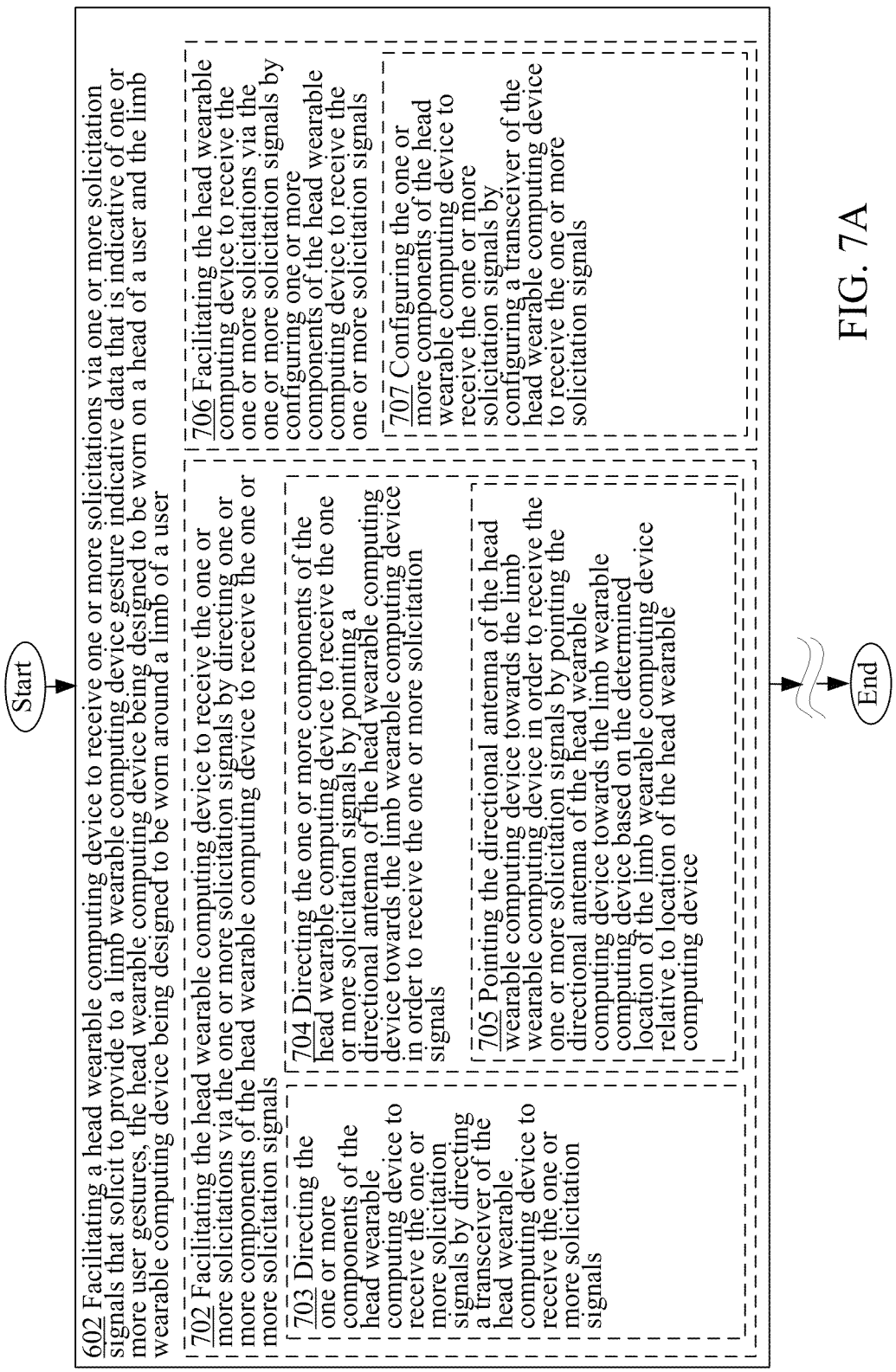
FIG. 7A is a high-level logic flowchart of a process depicting alternate implementations of the solicitation receive facilitating operation 602 of FIG. 6.

As will be described below, the solicitation receive facilitating operation 602 and the gesture indicative data transmit directing operation 604 may be executed in a variety of different ways in various alternative implementations. FIGS. 7A, 7B, 7C, 7D, 7E, and 7F, for example, illustrate at least some of the alternative ways that the solicitation receive facilitating operation 602 of FIG. 6 may be executed in various alternative implementations. In some cases, for example, the solicitation receive facilitating operation 602 may include an operation 702 for facilitating the head wearable computing device to receive the one or more solicitations via the one or more solicitation signals by directing one or more components of the head wearable computing device to receive the one or more solicitation signals as illustrated in FIG. 7A. For instance, the solicitation receive facilitating module 402* including the component receive directing module 502 (see FIG. 5A) of the head wearable computing device 10* (e.g., the head wearable computing device 10' of FIG. 4A or the head wearable computing device 10" of FIG. 4B) facilitating the head wearable computing device 10* to receive the one or more solicitations via the one or more solicitation signals 80 by having the component receive directing module 502 directing (e.g., instructing or controlling) one or more components of the head wearable computing device 10* to receive the one or more solicitation signals 80.

In various implementations, operation 702 may further include one or more additional operations including, in some cases, an operation 703 for directing the one or more components of the head wearable computing device to receive the one or more solicitation signals by directing a transceiver of the head wearable computing device to receive the one or more solicitation signals. For instance, the component receive directing module 502 including the transceiver receive directing module 504 (see FIG. 5A) of the head wearable computing device 10* of FIG. 4A or 4B directing the one or more components of the head wearable computing device 10* to receive the one or more solicitation signals 80 by having the transceiver receive directing module 504 direct a transceiver 418 of the head wearable computing device 10* to receive the one or more solicitation signals 80.

In the same or alternative implementations, operation 702 may alternatively or additionally include or involve an operation 704 for directing the one or more components of the head wearable computing device to receive the one or more solicitation signals by pointing a directional antenna of the head wearable computing device towards the limb wearable computing device in order to receive the one or more solicitation signals. For instance, the component receive directing module 502 including the directional antenna pointing module 508 (see FIG. 5A) of the head wearable computing device 10* of FIG. 4A or 4B directing the one or more components of the head wearable computing device 10* to receive the one or more solicitation signals 80 by having the directional antenna pointing module 508 point a directional antenna (e.g., antenna 430 of FIG. 4A or 4B) of the head wearable computing device 10* towards the limb wearable computing device 20 in order to receive the one or more solicitation signals 80.

When the head wearable computing device 10* employs a directional antenna, such as a metamaterial antenna, then the head wearable computing device 10* may communicate with the limb wearable computing device 20 by pointing the directional antenna to different portions of the surrounding environment at least until communication is established with the limb wearable computing device 20. In particular, the head wearable computing device 10* may establish communication with the limb wearable computing device 20 by moving the field of regard/beam of the directional antenna of the head wearable computing device 10* to scan the surrounding environment.

By convention, "field of regard" is sometimes used herein when describing an example wherein a directional antenna is likely to receive a signal while a "beam" is used herein when describing an example wherein a directional antenna is likely to transmit a signal. That is, when a directional antenna is in a transmit mode for transmitting signals (e.g., transmitting electromagnetic radiation), the directional antenna will transmit the signals primarily towards one direction thus having greater gain than, for example, multi-directional antennas such as omnidirectional antennas or isotropic radiators (note that a gain is a measure of how much of the power is radiated in a given direction relative to other directions). The narrower the beamwidth of the emitted radiation, the greater the gain. When the same directional antenna is in a receive mode for receiving signals, it may be able to receive signals from the same direction that the directional antenna primarily radiates signals to. Thus, references in the following to "pointing the directional antenna" or similar such phrases may be in reference to steering or directing the field of regard/beam of the directional antenna to different portions of the surrounding environment in order to receive or transmit signals towards those portions. A more detailed discussion related to the "field of regard" and "beam" is provided in U.S. Pat. No. 7,929,914, which is hereby incorporated by reference in its entirety.

In some cases, operation 704 may further include or involve an operation 705 for pointing the directional antenna of the head wearable computing device towards the limb wearable computing device in order to receive the one or more solicitation signals by pointing the directional antenna of the head wearable computing device towards the limb wearable computing device based on the determined location of the limb wearable computing device relative to location of the head wearable computing device. For instance, the directional antenna pointing module 508 of the head wearable computing device 10* of FIG. 4A or 4B pointing the directional antenna (e.g., antenna 430 of FIG. 4A or 4B) of the head wearable computing device 10* towards the limb wearable computing device 20 in order to receive the one or more solicitation signals 80 by pointing the directional antenna of the head wearable computing device 10* towards the limb wearable computing device 20 based on the previously determined location of the limb wearable computing device 20 relative to location of the head wearable computing device 10*.

In some implementations, the solicitation receive facilitating operation 602 may include or involve an operation 706 for facilitating the head wearable computing device to receive the one or more solicitations via the one or more solicitation signals by configuring one or more components of the head wearable computing device to receive the one or more solicitation signals. For instance, the solicitation receive facilitating module 402* including the component receive configuring module 510 (see FIG. 5A) of the head wearable computing device 10* facilitating the head wearable computing device 10* to receive the one or more solicitations via the one or more solicitation signals 80 by having the component receive configuring module 510 configure one or more components of the head wearable computing device 10* to receive the one or more solicitation signals 80.

As further illustrated in FIG. 7A, in some implementations, operation 706 may further include or involve an operation 707 for configuring the one or more components of the head wearable computing device to receive the one or more solicitation signals by configuring a transceiver of the head wearable computing device to receive the one or more solicitation signals. For instance, the component receive configuring module 510 including the transceiver receive configuring module 512 (see FIG. 5A) of the head wearable computing device 10* of FIG. 4A or 4B configuring the one or more components of the head wearable computing device 10* to receive the one or more solicitation signals 80 by having the transceiver receive configuring module 512 configure a transceiver 418 of the head wearable computing device 10* to receive the one or more solicitation signals 80.

Figure 7B:
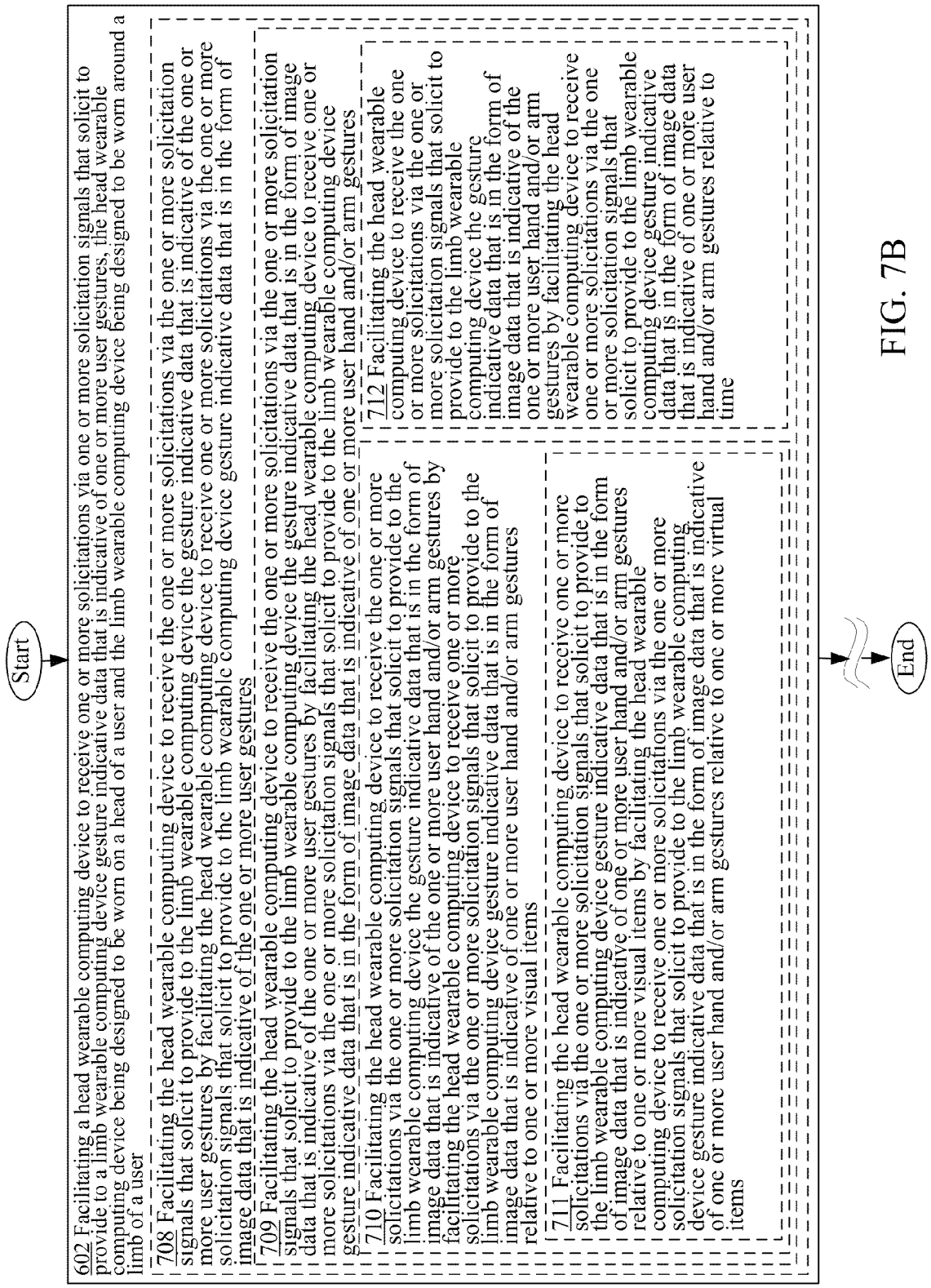
FIG. 7B is a high-level logic flowchart of a process depicting alternate implementations of the solicitation receive facilitating operation 602 of FIG. 6.

Referring now to FIG. 7B, in various implementations, the solicitation receive facilitating operation 602 may include or involve an operation 708 for facilitating the head wearable computing device to receive the one or more solicitations via the one or more solicitation signals that solicit to provide to the limb wearable computing device the gesture indicative data that is indicative of the one or more user gestures by facilitating the head wearable computing device to receive one or more solicitations via the one or more solicitation signals that solicit to provide to the limb wearable computing device gesture indicative data that is in the form of image data that is indicative of the one or more user gestures. For instance, the solicitation receive facilitating module 402* of the head wearable computing device 10* of FIG. 4A or 4B facilitating the head wearable computing device 10* to receive the one or more solicitations via the one or more solicitation signals 80 that solicit (e.g., request) to provide to the limb wearable computing device 20 the gesture indicative data that is indicative of the one or more user gestures by facilitating (e.g., configuring, instructing, or directing) the head wearable computing device 10* to receive one or more solicitations via the one or more solicitation signals 80 that solicit or request to provide to the limb wearable computing device 20 gesture indicative data (e.g., via, for example, one or more low-power gesture indicative data signals 85) that is in the form of image data (e.g., still image data, video image data, infrared image data, and so forth) that is indicative of the one or more user gestures (e.g., hand and/or arm gestures).

As further illustrated in FIG. 7B, operation 708 may further include one or more additional operations including, in some cases, an operation 709 for facilitating the head wearable computing device to receive the one or more solicitations via the one or more solicitation signals that solicit to provide to the limb wearable computing device the gesture indicative data that is in the form of image data that is indicative of the one or more user gestures by facilitating the head wearable computing device to receive one or more solicitations via the one or more solicitation signals that solicit to provide to the limb wearable computing device gesture indicative data that is in the form of image data that is indicative of one or more user hand and/or arm gestures. For instance, the solicitation receive facilitating module 402* of the head wearable computing device 10* of FIG. 4A or 4B facilitating the head wearable computing device 10* to receive the one or more solicitations via the one or more solicitation signals 80 that solicit to provide to the limb wearable computing device 20 the gesture indicative data that is in the form of image data that is indicative of the one or more user gestures by facilitating the head wearable computing device 10* to receive one or more solicitations via the one or more solicitation signals 80 that solicit or request to provide to the limb wearable computing device 20 gesture indicative data (e.g., via one or more low-power gesture indicative data signals 85) that is in the form of image data that is indicative of one or more user hand and/or arm gestures. Note that references to "user hand and/or arm gestures" may be in reference to finger gestures, hand gestures, and/or arm gestures.

In some cases, operation 709 may further include or involve an operation 710 for facilitating the head wearable computing device to receive the one or more solicitations via the one or more solicitation signals that solicit to provide to the limb wearable computing device the gesture indicative data that is in the form of image data that is indicative of the one or more user hand and/or arm gestures by facilitating the head wearable computing device to receive one or more solicitations via the one or more solicitation signals that solicit to provide to the limb wearable computing device gesture indicative data that is in the form of image data that is indicative of one or more user hand and/or arm gestures relative to one or more visual items. For instance, the solicitation receive facilitating module 402* of the head wearable computing device 10* of FIG. 4A or 4B facilitating the head wearable computing device 10* to receive the one or more solicitations via the one or more solicitation signals 80 that solicit to provide to the limb wearable computing device 20 the gesture indicative data that is in the form of image data that is indicative of the one or more user hand and/or arm gestures by facilitating the head wearable computing device 10* to receive one or more solicitations via the one or more solicitation signals 80 that solicit or request to provide to the limb wearable computing device 20 gesture indicative data (e.g., via one or more low-power gesture indicative data signals 85) that is in the form of image data that is indicative of one or more user hand and/or arm gestures relative to one or more visual items (e.g., actual items such as the limb wearable computing device 20 itself or virtual items that are displayed through the head wearable computing device 10*). For example, providing image data of hand movements (e.g., hand gestures) relative to the limb wearable computing device 20 as illustrated, for example, in FIG. 3E.

In some implementations, operation 710 may, in turn, further include an operation 711 for facilitating the head wearable computing device to receive one or more solicitations via the one or more solicitation signals that solicit to provide to the limb wearable computing device gesture indicative data that is in the form of image data that is indicative of one or more user hand and/or arm gestures relative to one or more visual items by facilitating the head wearable computing device to receive one or more solicitations via the one or more solicitation signals that solicit to provide to the limb wearable computing device gesture indicative data that is in the form of image data that is indicative of one or more user hand and/or arm gestures relative to one or more virtual items. For instance, the solicitation receive facilitating module 402* of the head wearable computing device 10* of FIG. 4A or 4B facilitating the head wearable computing device 10* to receive one or more solicitations via the one or more solicitation signals 80 that solicit to provide to the limb wearable computing device 20 gesture indicative data that is in the form of image data that is indicative of one or more user hand and/or arm gestures relative to one or more visual items by facilitating the head wearable computing device 10* to receive one or more solicitations via the one or more solicitation signals 80 that solicit or request to provide to the limb wearable computing device 20 gesture indicative data (e.g., via one or more low-power gesture indicative data signals 85) that is in the form of image data that is indicative of one or more user hand and/or arm gestures relative to one or more virtual items. For example, providing image data of hand movements (e.g., hand gestures) relative to FIG. 3C or 3D.

In various implementations, operation 709 may additionally or alternatively include or involve an operation 712 for facilitating the head wearable computing device to receive the one or more solicitations via the one or more solicitation signals that solicit to provide to the limb wearable computing device the gesture indicative data that is in the form of image data that is indicative of the one or more user hand and/or arm gestures by facilitating the head wearable computing device to receive one or more solicitations via the one or more solicitation signals that solicit to provide to the limb wearable computing device gesture indicative data that is in the form of image data that is indicative of one or more user hand and/or arm gestures relative to time. For instance, the solicitation receive facilitating module 402* of the head wearable computing device 10* of FIG. 4A or 4B facilitating the head wearable computing device 10* facilitating the head wearable computing device 10* to receive the one or more solicitations via the one or more solicitation signals 80 that solicit to provide to the limb wearable computing device 20 the gesture indicative data that is in the form of image data that is indicative of the one or more user hand and/or arm gestures by facilitating the head wearable computing device 10* to receive one or more solicitations via the one or more solicitation signals 80 that solicit or request to provide to the limb wearable computing device 20 gesture indicative data (e.g., via one or more low-power gesture indicative data signals 85) that is in the form of image data (e.g., video image data) that is indicative of one or more user hand and/or arm gestures relative to time. For example, a user 2 may make certain hand gestures when different items (e.g., virtual items) are displayed through the head wearable computing device 10* over course of time. For example, the head wearable computing device 10*, which may be an augmented reality device, may display several different virtual items over time, and a user 2 may select any one of the different items by making certain gestures at particular points in time.

Figure 7C:
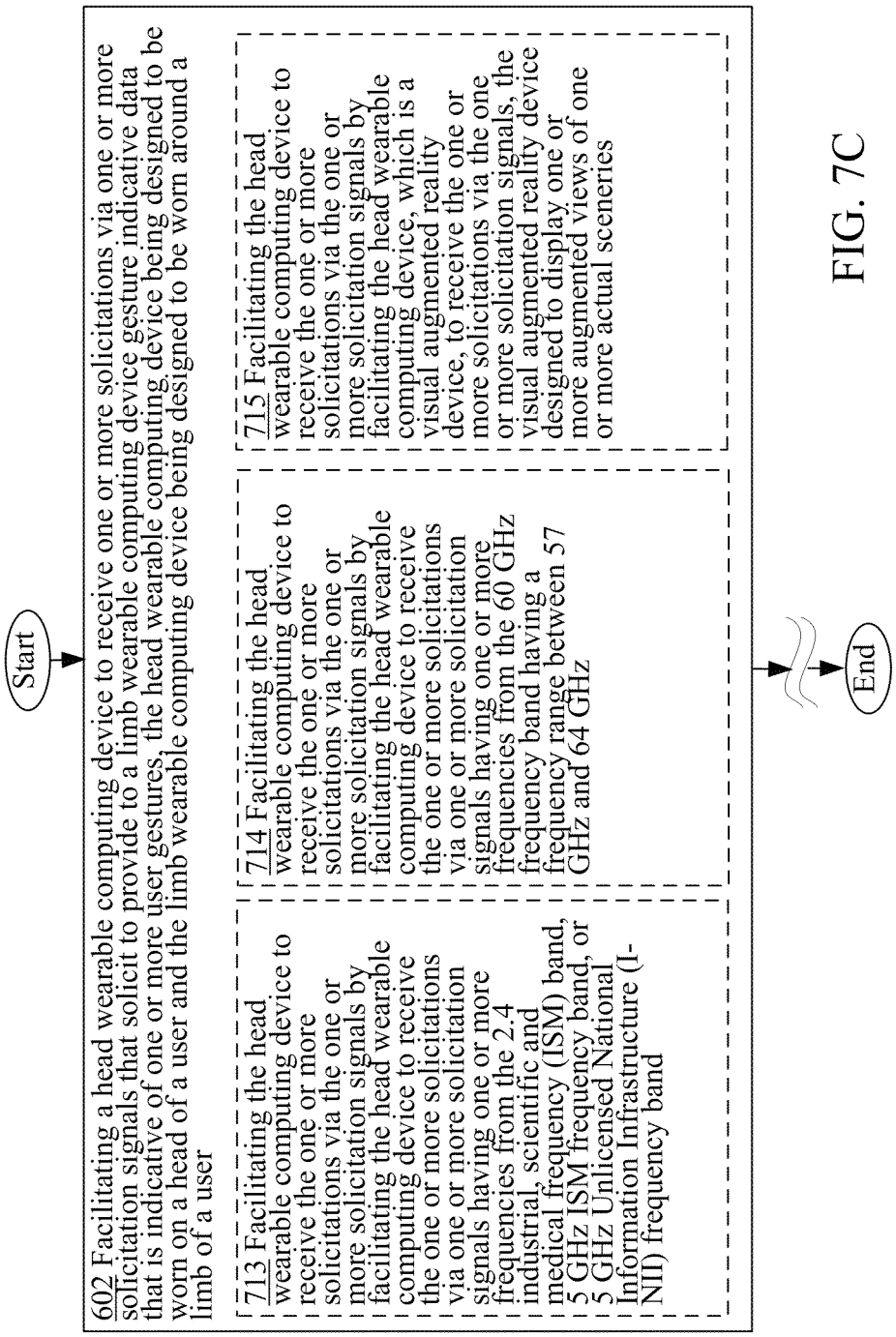
FIG. 7C is a high-level logic flowchart of a process depicting alternate implementations of the solicitation receive facilitating operation 602 of FIG. 6.

Turning to FIG. 7C, in some implementations, the solicitation receive facilitating operation 602 may include an operation 713 for facilitating the head wearable computing device to receive the one or more solicitations via the one or more solicitation signals by facilitating the head wearable computing device to receive the one or more solicitations via one or more solicitation signals having one or more frequencies from the 2.4 industrial, scientific and medical frequency (ISM) band, 5 GHz ISM frequency band, or 5 GHz Unlicensed National Information Infrastructure (I-NII) frequency band. For instance, the solicitation receive facilitating module 402* of the head wearable computing device 10* of FIG. 4A or 4B facilitating the head wearable computing device 10* to receive the one or more solicitations via the one or more solicitation signals 80 by facilitating (e.g., configuring, instructing, or directing) the head wearable computing device 10* to receive the one or more solicitations via one or more solicitation signals 80 having one or more frequencies from the 2.4 industrial, scientific and medical frequency (ISM) band (e.g., frequency band having the frequency range between 2.4 GHz and 2.4835 GHz), 5 GHz ISM frequency band, or 5 GHz Unlicensed National Information Infrastructure (I-NII) frequency band (e.g., frequency band having the frequency range between 5.180 GHz and 5.825 GHz).

In some implementations, the solicitation receive facilitating operation 602 may include an operation 714 for facilitating the head wearable computing device to receive the one or more solicitations via the one or more solicitation signals by facilitating the head wearable computing device to receive the one or more solicitations via one or more solicitation signals having one or more frequencies from the 60 GHz frequency band having a frequency range between 57 GHz and 64 GHz. For instance, the solicitation receive facilitating module 402* of the head wearable computing device 10* of FIG. 4A or 4B facilitating the head wearable computing device to receive the one or more solicitations via the one or more solicitation signals 80 by facilitating (e.g., configuring, instructing, or directing) the head wearable computing device 10* to receive the one or more solicitations via one or more solicitation signals 80 having one or more frequencies from the 60 GHz frequency band having a frequency range between 57 GHz and 64 GHz.

In some implementations, the solicitation receive facilitating operation 602 may include an operation 715 for facilitating the head wearable computing device to receive the one or more solicitations via the one or more solicitation signals by facilitating the head wearable computing device, which is a visual augmented reality device, to receive the one or more solicitations via the one or more solicitation signals, the visual augmented reality device designed to display one or more augmented views of one or more actual sceneries. For instance, the solicitation receive facilitating module 402* of the head wearable computing device 10* of FIG. 4A or 4B facilitating the head wearable computing device 10* to receive the one or more solicitations via the one or more solicitation signals 80 by facilitating the head wearable computing device, which is a visual augmented reality device (e.g., the head wearable computing device 10* as illustrated, for example, in FIG. 1B, 1C, 1D, 1E, or 1F), to receive the one or more solicitations via the one or more solicitation signals 80, the visual augmented reality device designed to display one or more augmented views (e.g., augmented views 302, 310, or 320 of FIG. 3B, 3C, or 3D) of one or more actual sceneries.

Figure 7D:
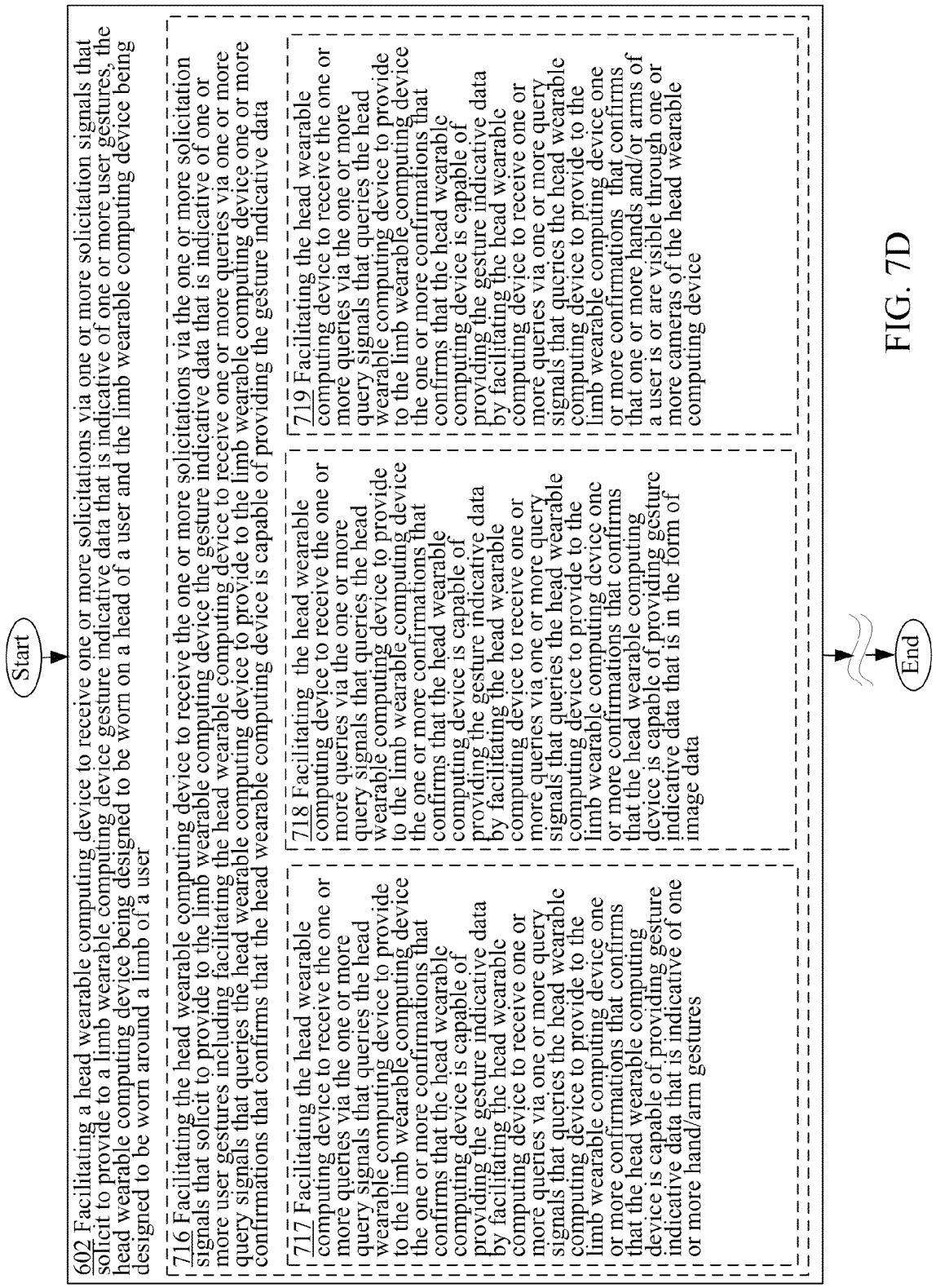
FIG. 7D is a high-level logic flowchart of a process depicting alternate implementations of the solicitation receive facilitating operation 602 of FIG. 6.

Turning now to FIG. 7D, in various implementations, the solicitation receive facilitating operation 602 of FIG. 6 may include an operation 716 for facilitating the head wearable computing device to receive the one or more solicitations via the one or more solicitation signals that solicit to provide to the limb wearable computing device the gesture indicative data that is indicative of one or more user gestures including facilitating the head wearable computing device to receive one or more queries via one or more query signals that queries the head wearable computing device to provide to the limb wearable computing device one or more confirmations that confirms that the head wearable computing device is capable of providing the gesture indicative data. For instance, the solicitation receive facilitating module 402* including the query receive facilitating module 514 (see FIG. 5A) of the head wearable computing device 10* of FIG. 4A or 4B facilitating the head wearable computing device 10* to receive the one or more solicitations via the one or more solicitation signals 80 that solicit (e.g., request) to provide to the limb wearable computing device 20 the gesture indicative data that is indicative of one or more user gestures including having the query receive facilitating module 514 facilitate (e.g., direct, instruct, or configure) the head wearable computing device 10* to receive one or more queries via one or more query signals 81 that queries or requests the head wearable computing device 10* to provide to the limb wearable computing device 20 one or more confirmations (e.g., via one or more low-power confirmation signals 86) that confirms that the head wearable computing device 10* is capable of providing the gesture indicative data (e.g., image data of one or more hand gestures).

As further illustrated in FIG. 7D, operation 716 may include one or more additional operations including, in some cases, an operation 717 for facilitating the head wearable computing device to receive the one or more queries via the one or more query signals that queries the head wearable computing device to provide to the limb wearable computing device the one or more confirmations that confirms that the head wearable computing device is capable of providing the gesture indicative data by facilitating the head wearable computing device to receive one or more queries via one or more query signals that queries the head wearable computing device to provide to the limb wearable computing device one or more confirmations that confirms that the head wearable computing device is capable of providing gesture indicative data that is indicative of one or more hand/arm gestures. For instance, the query receive facilitating module 514 of the head wearable computing device 10* of FIG. 4A or 4B facilitating the head wearable computing device 10* to receive the one or more queries via the one or more query signals 81 that queries the head wearable computing device 10* to provide to the limb wearable computing device 20 the one or more confirmations that confirms that the head wearable computing device 10* is capable of providing the gesture indicative data by facilitating (e.g., directing, instructing, or configuring) the head wearable computing device 10* to receive one or more queries via one or more query signals 81 that queries or requests the head wearable computing device 10* to provide to the limb wearable computing device 20 one or more confirmations (e.g., via one or more low-power confirmation signals 86) that confirms that the head wearable computing device 10* is capable of providing gesture indicative data that is indicative of one or more hand/arm gestures. For example, if one or more cameras of the head wearable computing device 10* has a view of one or more hands of the user 2, then the head wearable computing device 10* may provide confirmation that the head wearable computing device 10* can provide gesture indicative data.

In the same or alternative implementations, operation 716 may additionally or alternatively include an operation 718 for facilitating the head wearable computing device to receive the one or more queries via the one or more query signals that queries the head wearable computing device to provide to the limb wearable computing device the one or more confirmations that confirms that the head wearable computing device is capable of providing the gesture indicative data by facilitating the head wearable computing device to receive one or more queries via one or more query signals that queries the head wearable computing device to provide to the limb wearable computing device one or more confirmations that confirms that the head wearable computing device is capable of providing gesture indicative data that is in the form of image data. For instance, the query receive facilitating module 514 of the head wearable computing device 10* of FIG. 4A or 4B facilitating the head wearable computing device 10* to receive the one or more queries via the one or more query signals 81 that queries the head wearable computing device 10* to provide to the limb wearable computing device 20 the one or more confirmations that confirms that the head wearable computing device 10* is capable of providing the gesture indicative data by facilitating (e.g., directing, instructing, or configuring) the head wearable computing device 10* to receive one or more queries via one or more query signals 81 that queries or requests the head wearable computing device 10* to provide to the limb wearable computing device 20 one or more confirmations (e.g., via one or more low-power confirmation signals 86) that confirms that the head wearable computing device 10* is capable of providing gesture indicative data that is in the form of image data (e.g., still image data, video image data, infrared image data, and so forth).

In the same or alternative implementations, operation 716 may additionally or alternatively include an operation 719 for facilitating the head wearable computing device to receive the one or more queries via the one or more query signals that queries the head wearable computing device to provide to the limb wearable computing device the one or more confirmations that confirms that the head wearable computing device is capable of providing the gesture indicative data by facilitating the head wearable computing device to receive one or more queries via one or more query signals that queries the head wearable computing device to provide to the limb wearable computing device one or more confirmations that confirms that one or more hands and/or arms of a user is or are visible through one or more cameras of the head wearable computing device. For instance, the query receive facilitating module 514 of the head wearable computing device 10* of FIG. 4A or 4B facilitating the head wearable computing device 10* to receive the one or more queries via the one or more query signals 81 that queries the head wearable computing device 10* to provide to the limb wearable computing device 20 the one or more confirmations that confirms that the head wearable computing device 10* is capable of providing the gesture indicative data by facilitating (e.g., directing, instructing, or configuring) the head wearable computing device 10* to receive one or more queries via one or more query signals 81 that queries or requests the head wearable computing device 10* to provide to the limb wearable computing device 20 one or more confirmations (e.g., via one or more low-power confirmation signals 86) that confirms that one or more hands and/or arms of a user 2 is or are visible through one or more cameras of the head wearable computing device 10*. In some cases, in order to implement such an operation, the head wearable computing device 10* may be endowed with logic that is able to visually recognize hands and/or arms of a user 2.

Figure 7E:
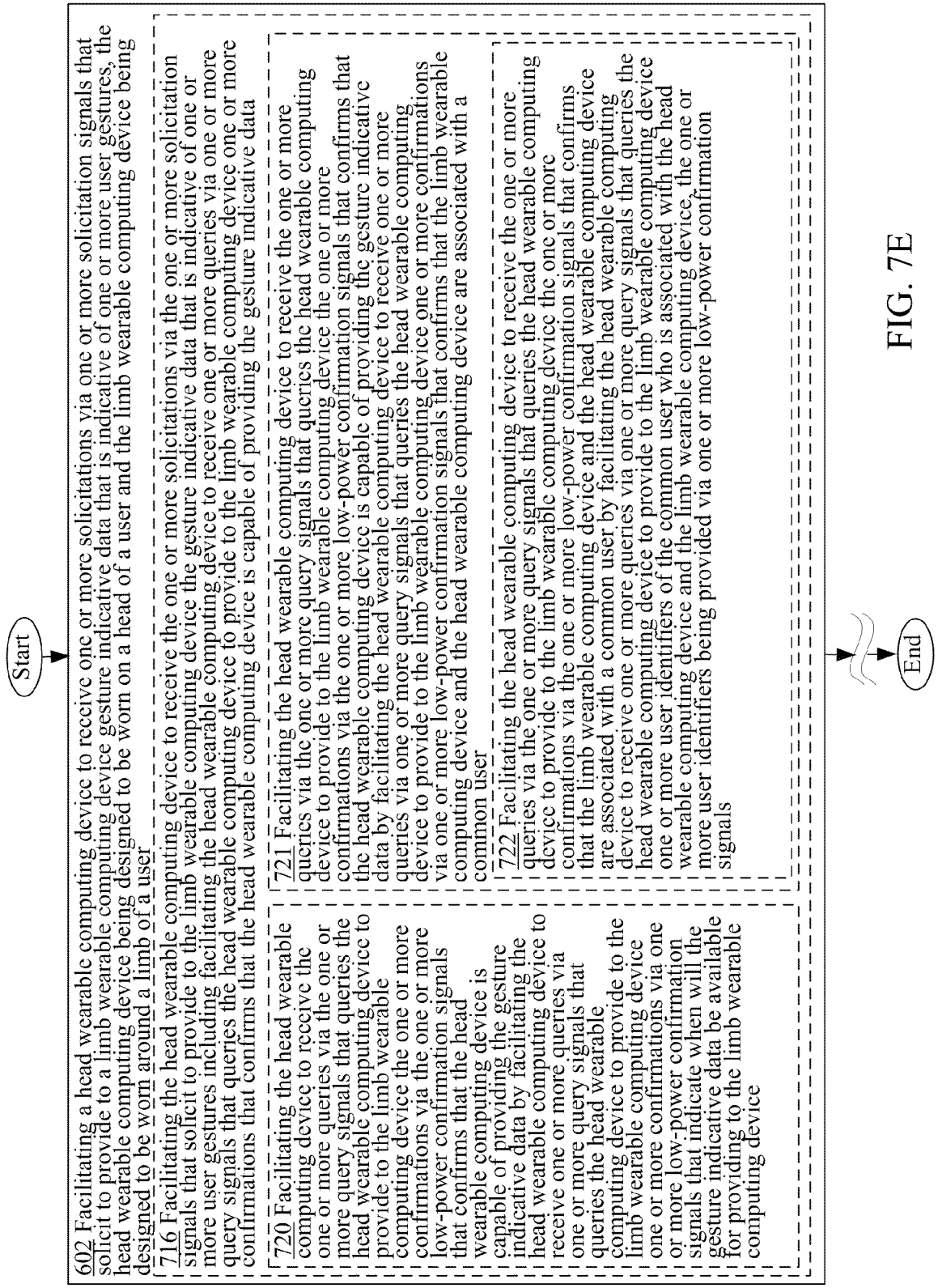
FIG. 7E is a high-level logic flowchart of a process depicting alternate implementations of the solicitation receive facilitating operation 602 of FIG. 6.

In the same or alternative implementations, operation 716 may additionally or alternatively include an operation 720 for facilitating the head wearable computing device to receive the one or more queries via the one or more query signals that queries the head wearable computing device to provide to the limb wearable computing device the one or more confirmations via the one or more low-power confirmation signals that confirms that the head wearable computing device is capable of providing the gesture indicative data by facilitating the head wearable computing device to receive one or more queries via one or more query signals that queries the head wearable computing device to provide to the limb wearable computing device one or more confirmations via one or more low-power confirmation signals that indicate when will the gesture indicative data be available for providing to the limb wearable computing device as illustrated in FIG. 7E. For instance, the query receive facilitating module 514 of the head wearable computing device 10* of FIG. 4A or 4B facilitating the head wearable computing device 10* to receive the one or more queries via the one or more query signals 81 that queries the head wearable computing device 10* to provide to the limb wearable computing device 20 the one or more confirmations via the one or more low-power confirmation signals 86 that confirms that the head wearable computing device 10* is capable of providing the gesture indicative data by facilitating (e.g., directing, instructing, or configuring) the head wearable computing device 10* to receive one or more queries via one or more query signals 81 that queries or requests the head wearable computing device 10* to provide to the limb wearable computing device 20 one or more confirmations via one or more low-power confirmation signals 86 (e.g., confirmation signals that were transmitted using less than 0.8 milliwatt of transmit power) that indicate when will the gesture indicative data be available for providing to the limb wearable computing device 20.

In the same or alternative implementations, operation 716 may additionally or alternatively include an operation 721 for facilitating the head wearable computing device to receive the one or more queries via the one or more query signals that queries the head wearable computing device to provide to the limb wearable computing device the one or more confirmations via the one or more low-power confirmation signals that confirms that the head wearable computing device is capable of providing the gesture indicative data by facilitating the head wearable computing device to receive one or more queries via one or more query signals that queries the head wearable computing device to provide to the limb wearable computing device one or more confirmations via one or more low-power confirmation signals that confirms that the limb wearable computing device and the head wearable computing device are associated with a common user. For instance, the query receive facilitating module 514 of the head wearable computing device 10* of FIG. 4A or 4B facilitating the head wearable computing device 10* to receive the one or more queries via the one or more query signals 81 that queries the head wearable computing device 10* to provide to the limb wearable computing device 20 the one or more confirmations via the one or more low-power confirmation signals 86 that confirms that the head wearable computing device 10* is capable of providing the gesture indicative data by facilitating (e.g., directing, instructing, or configuring) the head wearable computing device 10* to receive one or more queries via one or more query signals 81 that queries or requests the head wearable computing device 10* to provide to the limb wearable computing device 20 one or more confirmations via one or more low-power confirmation signals 86 that confirms that the limb wearable computing device 20 and the head wearable computing device 10* are associated with a common user 2.

As further illustrated in FIG. 7E, operation 721 may further include an operation 722 for facilitating the head wearable computing device to receive the one or more queries via the one or more query signals that queries the head wearable computing device to provide to the limb wearable computing device the one or more confirmations via the one or more low-power confirmation signals that confirms that the limb wearable computing device and the head wearable computing device are associated with a common user by facilitating the head wearable computing device to receive one or more queries via one or more query signals that queries the head wearable computing device to provide to the limb wearable computing device one or more user identifiers of the common user who is associated with the head wearable computing device and the limb wearable computing device, the one or more user identifiers being provided via one or more low-power confirmation signals. For instance, the query receive facilitating module 514 of the head wearable computing device 10* of FIG. 4A or 4B facilitating the head wearable computing device 10* to receive the one or more queries via the one or more query signals 81 that queries the head wearable computing device 10* to provide to the limb wearable computing device 20 the one or more confirmations via the one or more low-power confirmation signals 86 that confirms that the limb wearable computing device 20 and the head wearable computing device 10* are associated with a common user 2 by facilitating (e.g., directing, instructing, or configuring) the head wearable computing device 10* to receive one or more queries via one or more query signals 81 that queries or requests the head wearable computing device 10* to provide to the limb wearable computing device 20 one or more user identifiers of the common user 2 who is associated with the head wearable computing device 10* and the limb wearable computing device 20, the one or more user identifiers being provided via one or more low-power confirmation signals 86 (e.g., confirmation signals that were wirelessly transmitted using less than 0.8 milliwatt of transmit power).

Figure 7F:
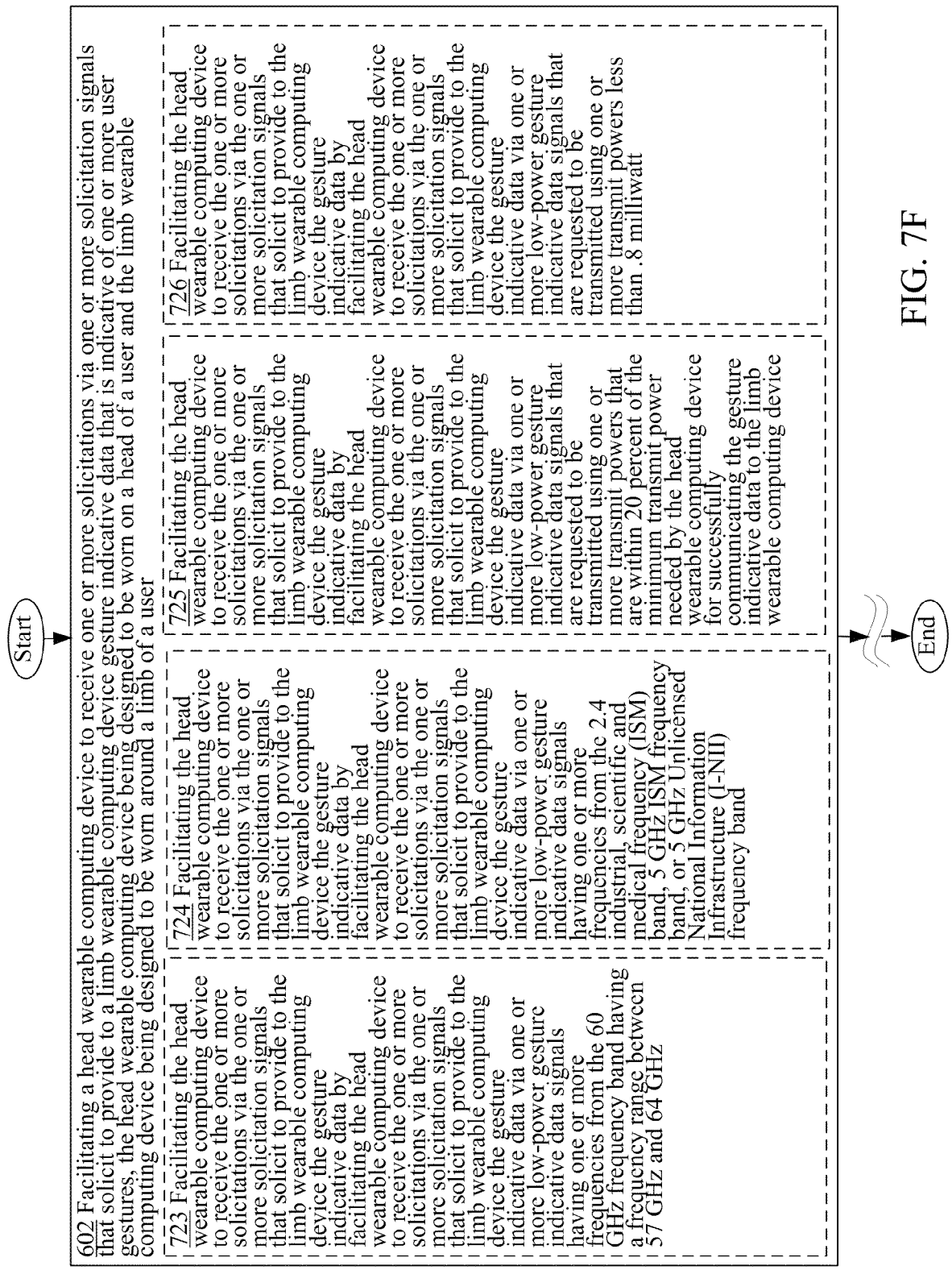
FIG. 7F is a high-level logic flowchart of a process depicting alternate implementations of the solicitation receive facilitating operation 602 of FIG. 6.

Turning now to FIG. 7F, in various implementations, the solicitation receive facilitating operation 602 of FIG. 6 may include an operation 723 for facilitating the head wearable computing device to receive the one or more solicitations via the one or more solicitation signals that solicit to provide to the limb wearable computing device the gesture indicative data by facilitating the head wearable computing device to receive the one or more solicitations via the one or more solicitation signals that solicit to provide to the limb wearable computing device the gesture indicative data via one or more low-power gesture indicative data signals having one or more frequencies from the 60 GHz frequency band having a frequency range between 57 GHz and 64 GHz. For instance, the solicitation receive facilitating module 402* of the head wearable computing device 10* of FIG. 4A or 4B facilitating the head wearable computing device 10* to receive the one or more solicitations via the one or more solicitation signals 80 that solicit to provide to the limb wearable computing device 20 the gesture indicative data by facilitating (e.g., directing, instructing, or configuring) the head wearable computing device 10* to receive the one or more solicitations via the one or more solicitation signals 80 that solicit or request to provide to the limb wearable computing device 20 the gesture indicative data via one or more low-power gesture indicative data signals 85 (e.g., data signals transmitted using 0.8 or less of transmit power) having one or more frequencies from the 60 GHz frequency band having a frequency range between 57 GHz and 64 GHz.

In some implementations, the solicitation receive facilitating operation 602 of FIG. 6 may include an operation 724 for facilitating the head wearable computing device to receive the one or more solicitations via the one or more solicitation signals that solicit to provide to the limb wearable computing device the gesture indicative data by facilitating the head wearable computing device to receive the one or more solicitations via the one or more solicitation signals that solicit to provide to the limb wearable computing device the gesture indicative data via one or more low-power gesture indicative data signals having one or more frequencies from the 2.4 industrial, scientific and medical frequency (ISM) band, 5 GHz ISM frequency band, or 5 GHz Unlicensed National Information Infrastructure (I-NII) frequency band. For instance, the solicitation receive facilitating module 402* of the head wearable computing device 10* of FIG. 4A or 4B facilitating the head wearable computing device 10* to receive the one or more solicitations via the one or more solicitation signals 80 that solicit to provide to the limb wearable computing device 20 the gesture indicative data by facilitating (e.g., directing, instructing, or configuring) the head wearable computing device 10* to receive the one or more solicitations via the one or more solicitation signals 80 that solicit or request to provide to the limb wearable computing device 20 the gesture indicative data via one or more low-power gesture indicative data signals 85 having one or more frequencies from the 2.4 industrial, scientific and medical frequency (ISM) band, 5 GHz ISM frequency band, or 5 GHz Unlicensed National Information Infrastructure (I-NII) frequency band.

In some implementations, the solicitation receive facilitating operation 602 of FIG. 6 may include an operation 725 for facilitating the head wearable computing device to receive the one or more solicitations via the one or more solicitation signals that solicit to provide to the limb wearable computing device the gesture indicative data by facilitating the head wearable computing device to receive the one or more solicitations via the one or more solicitation signals that solicit to provide to the limb wearable computing device the gesture indicative data via one or more low-power gesture indicative data signals that are requested to be transmitted using one or more transmit powers that are within 20 percent of the minimum transmit power needed by the head wearable computing device for successfully communicating the gesture indicative data to the limb wearable computing device. For instance, the solicitation receive facilitating module 402\* of the head wearable computing device 10\* of FIG. 4A or 4B facilitating the head wearable computing device 10\* to receive the one or more solicitations via the one or more solicitation signals 80 that solicit to provide to the limb wearable computing device 20 the gesture indicative data by facilitating (e.g., directing, instructing, or configuring) the head wearable computing device 10\* to receive the one or more solicitations via the one or more solicitation signals 80 that solicit or request to provide to the limb wearable computing device 20 the gesture indicative data via one or more low-power gesture indicative data signals 85 that are requested to be transmitted using one or more transmit powers that are within 20 percent of the minimum transmit power needed by the head wearable computing device 10\* for successfully communicating the gesture indicative data to the limb wearable computing device 20.

There are a number ways to determine the minimum transmit power needed by the head wearable computing device 10\* for successfully communicating with the limb wearable computing device 20. For example, one way to make such a determination is for the head wearable computing device 10\* to broadcast prompting signals 93\* (that are designed to, upon being detected by the limb wearable computing device 20, cause the limb wearable computing device 20 to transmit responsive signals) at incrementally higher levels of transmit power and determining whether the limb wearable computing device 20 responds to (e.g., responding by transmitting responsive signals) any of the transmissions of the prompting signals 93\* (see FIG. 2C) at the different levels of transmit power.

In some implementations, the solicitation receive facilitating operation 602 of FIG. 6 may include an operation 726 for facilitating the head wearable computing device to receive the one or more solicitations via the one or more solicitation signals that solicit to provide to the limb wearable computing device the gesture indicative data by facilitating the head wearable computing device to receive the one or more solicitations via the one or more solicitation signals that solicit to provide to the limb wearable computing device the gesture indicative data via one or more low-power gesture indicative data signals that are requested to be transmitted using one or more transmit powers less than 0.8 milliwatt. For instance, the solicitation receive facilitating module 402\* of the head wearable computing device 10\* of FIG. 4A or 4B facilitating the head wearable computing device 10\* to receive the one or more solicitations via the one or more solicitation signals 80 that solicit to provide to the limb wearable computing device 20 the gesture indicative data by facilitating (e.g., directing, instructing, or configuring) the head wearable computing device 10\* to receive the one or more solicitations via the one or more solicitation signals 80 that solicit or request to provide to the limb wearable computing device 20 the gesture indicative data via one or more low-power gesture indicative data signals 85 that are requested to be transmitted using one or more transmit powers less than 0.8 milliwatt.

Figure 8A:
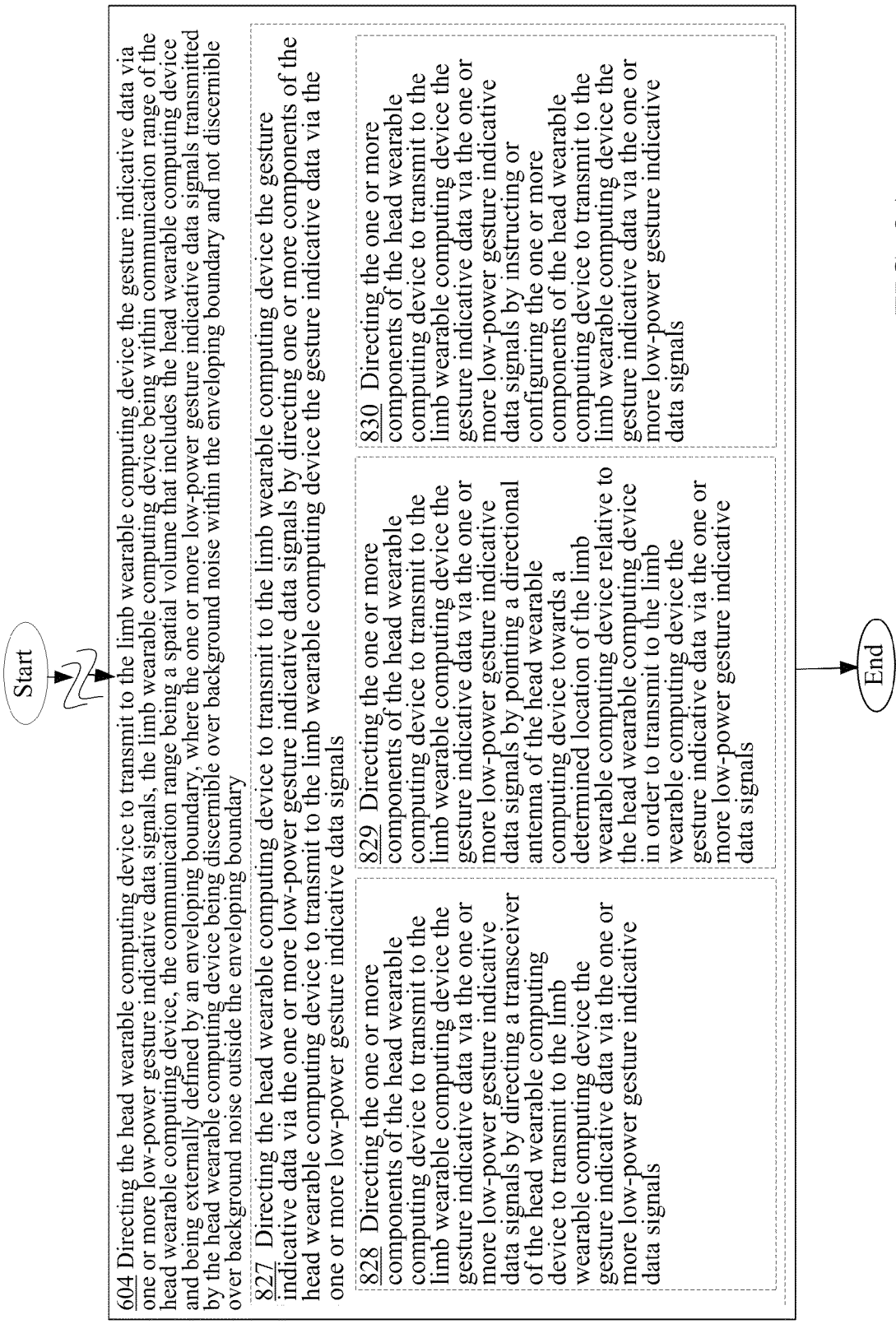
FIG. 8A is a high-level logic flowchart of a process depicting alternate implementations of the gesture indicative data transmit directing operation 604 of FIG. 6.

Referring back to the gesture indicative data transmit directing operation 604 of FIG. 6, the gesture indicative data transmit directing operation 604 similar to the solicitation receive facilitating operation 602 of FIG. 6 may be executed in a number of different ways in various alternative embodiments as illustrated, for example, in FIGS. 8A, 8B, 8C, 8D, 8E, 8F, 8G, 8H, 8J, 8K, and 8L. In some cases, for example, the gesture indicative data transmit directing operation 604 may actually include or involve an operation 827 for directing the head wearable computing device to transmit to the limb wearable computing device the gesture indicative data via the one or more low-power gesture indicative data signals by directing one or more components of the head wearable computing device to transmit to the limb wearable computing device the gesture indicative data via the one or more low-power gesture indicative data signals as illustrated in FIG. 8A. For instance, the gesture indicative data transmit directing module 404 including the component transmit directing module 516 (see FIG. 5B) of the head wearable computing device 10\* of FIG. 4A or 4B directing the head wearable computing device 10\* to transmit to the limb wearable computing device 20 the gesture indicative data via the one or more low-power gesture indicative data signals 85 by having the component transmit directing module 516 direct (e.g., instruct and/or configure) one or more components of the head wearable computing device 10\* to transmit to the limb wearable computing device the gesture indicative data via the one or more low-power gesture indicative data signals 85 (e.g., data signals transmitted using a directional antenna such as a metamaterial antenna and using 0.8 milliwatt or less of transmit power).

As further illustrated in FIG. 8A, operation 827 may actually include or involve one or more additional operations including, in some cases, an operation 828 for directing the one or more components of the head wearable computing device to transmit to the limb wearable computing device the gesture indicative data via the one or more low-power gesture indicative data signals by directing a transceiver of the head wearable computing device to transmit to the limb wearable computing device the gesture indicative data via the one or more low-power gesture indicative data signals. For instance, the component transmit directing module 516 including the transceiver transmit directing module 518 (see FIG. 5B) of the head wearable computing device 10\* of FIG. 4A or 4B directing the one or more components of the head wearable computing device 10\* to transmit to the limb wearable computing device 20 the gesture indicative data via the one or more low-power gesture indicative data signals 85 by having the transceiver transmit directing module 518 direct a transceiver 418 of the head wearable computing device 10\* to transmit to the limb wearable computing device 20 the gesture indicative data via the one or more low-power gesture indicative data signals 85.

IN the same or alternative implementations, operation 827 may further include an operation 829 for directing the one or more components of the head wearable computing device to transmit to the limb wearable computing device the gesture indicative data via the one or more low-power gesture indicative data signals by pointing a directional antenna of the head wearable computing device towards a determined location of the limb wearable computing device relative to the head wearable computing device in order to transmit to the limb wearable computing device the gesture indicative data via the one or more low-power gesture indicative data signals. For instance, the component transmit directing module 516 including the directional antenna pointing module 520 (see FIG. 5B) of the head wearable computing device 10\* of FIG. 4A or 4B directing the one or more components of the head wearable computing device 10\* to transmit to the limb wearable computing device 20 the gesture indicative data via the one or more low-power gesture indicative data signals 85 by having the directional antenna pointing module 520 point a directional antenna (e.g., antenna 430 of FIG. 4A or 4B) of the head wearable computing device 10\* towards a determined location of the limb wearable computing device 20 relative to the head wearable computing device 10\* in order to transmit to the limb wearable computing device 20 the gesture indicative data via the one or more low-power gesture indicative data signals 85.

Various alternative means may be employed in order to determine the location of the limb wearable computing device 20 relative to the location of the head wearable computing device 10* in various alternative embodiments. For example, in some embodiments, the head wearable computing device 10* may use a directional antenna to transmit low-power prompting signals 93* (see FIG. 2C) towards a particular direction away from the head wearable computing device 10*, and then following the transmission of the low-power prompting signals 93* (see FIG. 2C) towards the particular direction monitor for responsive signals (e.g., signals 92 of FIG. 2C) from the limb wearable computing device 20 that were generated by the limb wearable computing device 20 in response to the limb wearable computing device 20 detecting the low-power prompting signals 93*. If no responsive signals are detected, then the above operations of transmitting low-power prompting signals 93* and monitoring for responsive signals may be repeated by incrementally steering the directional antenna away from the original direction and towards a new direction. These operations of transmitting low-power prompting signals 93* and monitoring for responsive signals may be repeated over and over again at least until the responsive signals are detected.

In the same or alternative implementations, operation 827 may additionally or alternatively include e an operation 830 for directing the one or more components of the head wearable computing device to transmit to the limb wearable computing device the gesture indicative data via the one or more low-power gesture indicative data signals by instructing or configuring the one or more components of the head wearable computing device to transmit to the limb wearable computing device the gesture indicative data via the one or more low-power gesture indicative data signals. For instance, the component transmit directing module 516 of the head wearable computing device 10* of FIG. 4A or 4B directing the one or more components of the head wearable computing device 10* to transmit to the limb wearable computing device 20 the gesture indicative data via the one or more low-power gesture indicative data signals 85 by instructing or configuring the one or more components (e.g., transceiver 418 and/or antenna 430) of the head wearable computing device 10* to transmit to the limb wearable computing device 20 the gesture indicative data via the one or more low-power gesture indicative data signals 85. Note that in some embodiments, the logic needed for executing the various operations described herein may not be located at the head wearable computing device 10*, but instead, may be located, for example, at a nearby computing device (e.g., a mobile computing device that is within the relative small communication range 50* of the head wearable computing device 10*) that is in communication with the head wearable computing device 10*.

Figure 8B:
FIG. 8B is a high-level logic flowchart of a process depicting alternate implementations of the gesture indicative data transmit directing operation 604 of FIG. 6.

Turning to FIG. 8B, in some implementations, the gesture indicative data transmit directing operation 604 of FIG. 6 may actually include an operation 831 for directing the head wearable computing device to transmit to the limb wearable computing device the gesture indicative data via the one or more low-power gesture indicative data signals by directing the head wearable computing device to transmit to the limb wearable computing device gesture indicative data that was collected using one or more sensors that were used to sense the one or more user gestures. For instance, the gesture indicative data transmit directing module 404 of the head wearable computing device 10* of FIG. 4A or 4B directing the head wearable computing device 10* to transmit to the limb wearable computing device 20 the gesture indicative data via the one or more low-power gesture indicative data signals 85 by directing (e.g., instructing or controlling) the head wearable computing device 10* to transmit to the limb wearable computing device 20 gesture indicative data that was collected using one or more sensors 420 (e.g., video camera, infrared camera, and so forth) that were used to sense the one or more user gestures (e.g., hand gestures, which generally includes finger gestures).

In some cases, operation 831 may further include an operation 832 for directing the head wearable computing device to transmit to the limb wearable computing device the gesture indicative data that was collected using one or more sensors that were used to sense the one or more user gestures by directing the head wearable computing device to transmit to the limb wearable computing device the gesture indicative data in real time, where the gesture indicative data is transmitted to the limb wearable computing device within 0.2 seconds from when the one or more user gestures are exhibited by a user. For instance, the gesture indicative data transmit directing module 404 of the head wearable computing device 10* of FIG. 4A or 4B directing the head wearable computing device 10* to transmit to the limb wearable computing device 20 the gesture indicative data that was collected using one or more sensors 420 that were used to sense the one or more user gestures by directing the head wearable computing device 10* to transmit to the limb wearable computing device 20 the gesture indicative data in real time, where the gesture indicative data is transmitted to the limb wearable computing device 20 within 0.2 seconds from when the one or more user gestures (e.g., user gestures in the form of hand and/or arm movements) are exhibited by a user 2. For example, transmitting the gesture indicative data via one or more low-power gesture indicative data signals 85 within 0.01 seconds after the user 2 exhibited the user gestures that the gesture indicative data is based on.

In the same or alternative implementations, the gesture indicative data transmit directing operation 604 of FIG. 6 may include an operation 833 for directing the head wearable computing device to transmit to the limb wearable computing device the gesture indicative data via the one or more low-power gesture indicative data signals by directing the head wearable computing device to transmit to the limb wearable computing device gesture indicative data in the form of image data. For instance, the gesture indicative data transmit directing module 404 of the head wearable computing device 10* of FIG. 4A or 4B directing the head wearable computing device 10* to transmit to the limb wearable computing device 20 the gesture indicative data via the one or more low-power gesture indicative data signals 85 by directing (e.g., instructing or configuring) the head wearable computing device 10* to transmit to the limb wearable computing device 20 gesture indicative data (e.g., via one or more low-power gesture indicative data signals 85) in the form of image data.

As further illustrated in FIG. 8B, in various implementations, operation 833 may further include one or more additional operations including, in some cases, an operation 834 for directing the head wearable computing device to transmit to the limb wearable computing device gesture indicative data in the form of image data by directing the head wearable computing device to transmit to the limb wearable computing device image data that provides one or more images showing one or more hand and/or arm gestures. For instance, the gesture indicative data transmit directing module 404 of the head wearable computing device 10* of FIG. 4A or 4B directing the head wearable computing device 10* to transmit to the limb wearable computing device 20 gesture indicative data in the form of image data by directing the head wearable computing device 10* to transmit to the limb wearable computing device 20 image data that provides one or more images (e.g., still images, video or motion images, infrared images, and so forth) showing one or more hand and/or arm gestures which may include finger gestures.

In some cases, operation 834 may, in turn, further include an operation 835 for directing the head wearable computing device to transmit to the limb wearable computing device the image data that provides the one or more images showing the one or more hand and/or arm gestures by directing the head wearable computing device to transmit to the limb wearable computing device image data that provides one or more images showing one or more hand and/or arm gestures relative to one or more visual elements. For instance, the gesture indicative data transmit directing module 404 of the head wearable computing device 10* of FIG. 4A or 4B directing the head wearable computing device 10* to transmit to the limb wearable computing device 20 the image data that provides the one or more images showing the one or more hand and/or arm gestures by directing (e.g., instructing or configuring) the head wearable computing device 10* to transmit to the limb wearable computing device 20 image data that provides one or more images showing one or more hand and/or arm gestures relative to one or more visual elements. The one or more visual elements may be actual or virtual elements that may be displayed through the head wearable computing device 10*. For example, the image data that may be transmitted to the limb wearable computing device 20 may indicate or show the user 2 making certain hand gestures relative to the face of the limb wearable computing device 20, which is an actual visual element as illustrated, for example, in FIG. 3E.

In some cases, operation 835 may, in turn, further include an operation 836 for directing the head wearable computing device to transmit to the limb wearable computing device image data that provides the one or more images showing the one or more hand and/or arm gestures relative to the one or more visual elements by directing the head wearable computing device to transmit to the limb wearable computing device image data providing one or more images showing one or more hand and/or arm gestures relative to one or more virtual elements that were displayed through the head wearable computing device. For instance, the gesture indicative data transmit directing module 404 of the head wearable computing device 10* of FIG. 4A or 4B directing the head wearable computing device 10* to transmit to the limb wearable computing device 20 image data that provides the one or more images showing the one or more hand and/or arm gestures relative to the one or more visual elements by directing (e.g., instructing, controlling, or configuring) the head wearable computing device 10* to transmit to the limb wearable computing device 20 image data providing one or more images showing one or more hand and/or arm gestures relative to one or more virtual elements (e.g., icons 312* of FIG. 3C or virtual keys 315 of FIG. 3D) that were displayed through the head wearable computing device 10*.

Figure 8C:
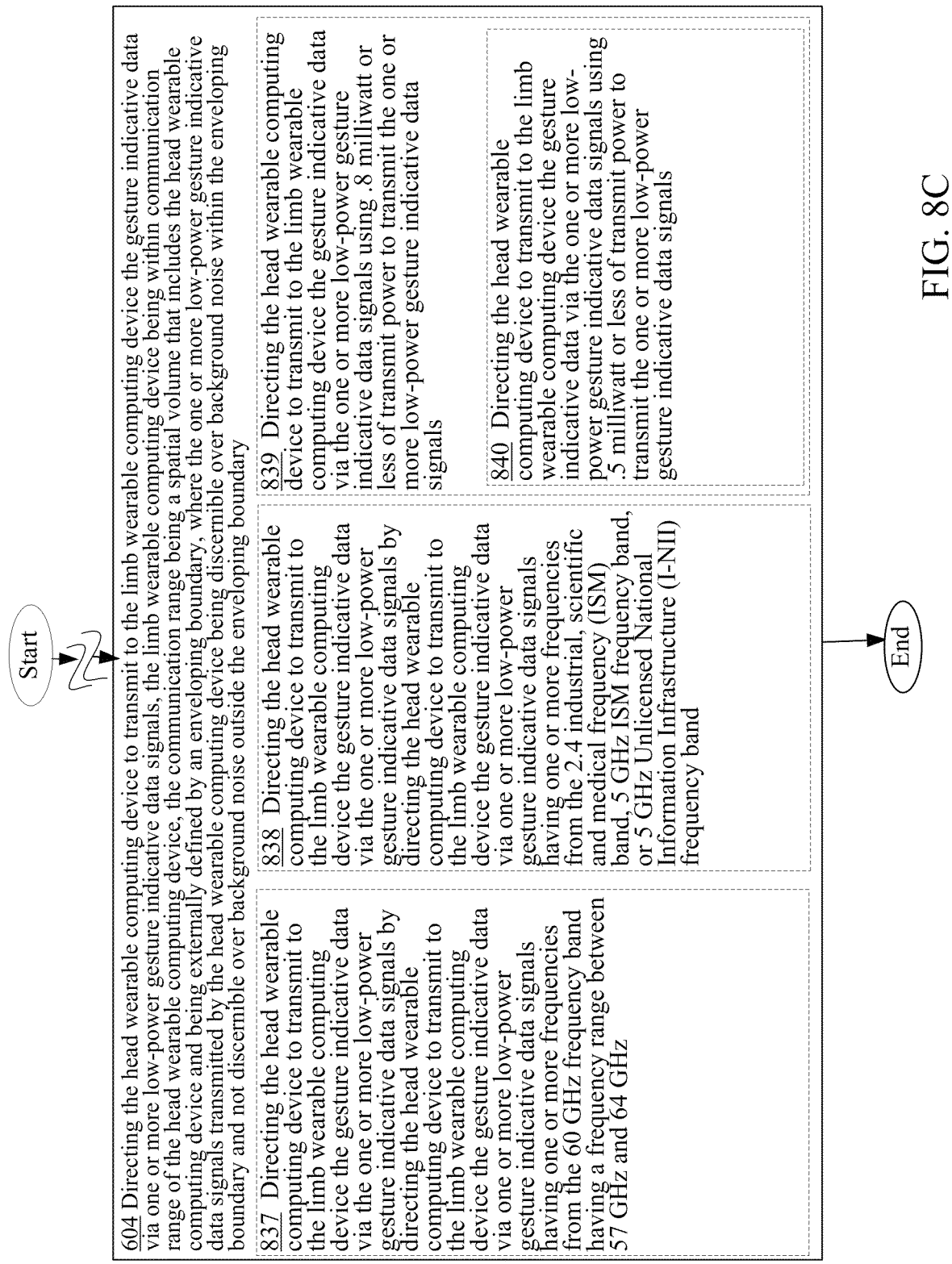
FIG. 8C is a high-level logic flowchart of a process depicting alternate implementations of the gesture indicative data transmit directing operation 604 of FIG. 6.

Turning to FIG. 8C, in the same or alternative implementations, the gesture indicative data transmit directing operation 604 of FIG. 6 may include an operation 837 for directing the head wearable computing device to transmit to the limb wearable computing device the gesture indicative data via the one or more low-power gesture indicative data signals by directing the head wearable computing device to transmit to the limb wearable computing device the gesture indicative data via one or more low-power gesture indicative data signals having one or more frequencies from the 60 GHz frequency band having a frequency range between 57 GHz and 64 GHz. For instance, the gesture indicative data transmit directing module 404 of the head wearable computing device 10* of FIG. 4A or 4B directing the head wearable computing device 10* to transmit to the limb wearable computing device 20 the gesture indicative data via the one or more low-power gesture indicative data signals 85 by directing (e.g., instructing, controlling, or configuring) the head wearable computing device 10* to transmit to the limb wearable computing device 20 the gesture indicative data via one or more low-power gesture indicative data signals 85 having one or more frequencies from the 60 GHz frequency band having a frequency range between 57 GHz and 64 GHz.

In some implementations, the gesture indicative data transmit directing operation 604 of FIG. 6 may include an operation 838 for directing the head wearable computing device to transmit to the limb wearable computing device the gesture indicative data via the one or more low-power gesture indicative data signals by directing the head wearable computing device to transmit to the limb wearable computing device the gesture indicative data via one or more low-power gesture indicative data signals having one or more frequencies from the 2.4 industrial, scientific and medical frequency (ISM) band, 5 GHz ISM frequency band, or 5 GHz Unlicensed National Information Infrastructure (I-NII) frequency band. For instance, the gesture indicative data transmit directing module 404 of the head wearable computing device 10* of FIG. 4A or 4B directing the head wearable computing device 10* to transmit to the limb wearable computing device 20 the gesture indicative data via the one or more low-power gesture indicative data signals 85 by directing (e.g., instructing, controlling, or configuring) the head wearable computing device 10* to transmit to the limb wearable computing device 20 the gesture indicative data via one or more low-power gesture indicative data signals 85 having one or more frequencies from the 2.4 industrial, scientific and medical frequency (ISM) band, 5 GHz ISM frequency band, or 5 GHz Unlicensed National Information Infrastructure (I-NII) frequency band.

In some implementations, the gesture indicative data transmit directing operation 604 of FIG. 6 may include an operation 839 for directing the head wearable computing device to transmit to the limb wearable computing device the gesture indicative data via the one or more low-power gesture indicative data signals using 0.8 milliwatt or less of transmit power to transmit the one or more low-power gesture indicative data signals. For instance, the gesture indicative data transmit directing module 404 of the head wearable computing device 10* of FIG. 4A or 4B directing the head wearable computing device 10* to transmit to the limb wearable computing device 20 the gesture indicative data via the one or more low-power gesture indicative data signals 85 using 0.8 milliwatt or less of transmit power to transmit the one or more low-power gesture indicative data signals 85.

In some implementations, operation 839 may further include an operation 840 for directing the head wearable computing device to transmit to the limb wearable computing device the gesture indicative data via the one or more low-power gesture indicative data signals using 0.5 milliwatt or less of transmit power to transmit the one or more low-power gesture indicative data signals. For instance, the gesture indicative data transmit directing module 404 of the head wearable computing device 10* of FIG. 4A or 4B directing the head wearable computing device 10* to transmit to the limb wearable computing device 20 the gesture indicative data via the one or more low-power gesture indicative data signals 85 using 0.5 milliwatt or less of transmit power to transmit the one or more low-power gesture indicative data signals 85.

Figure 8D:
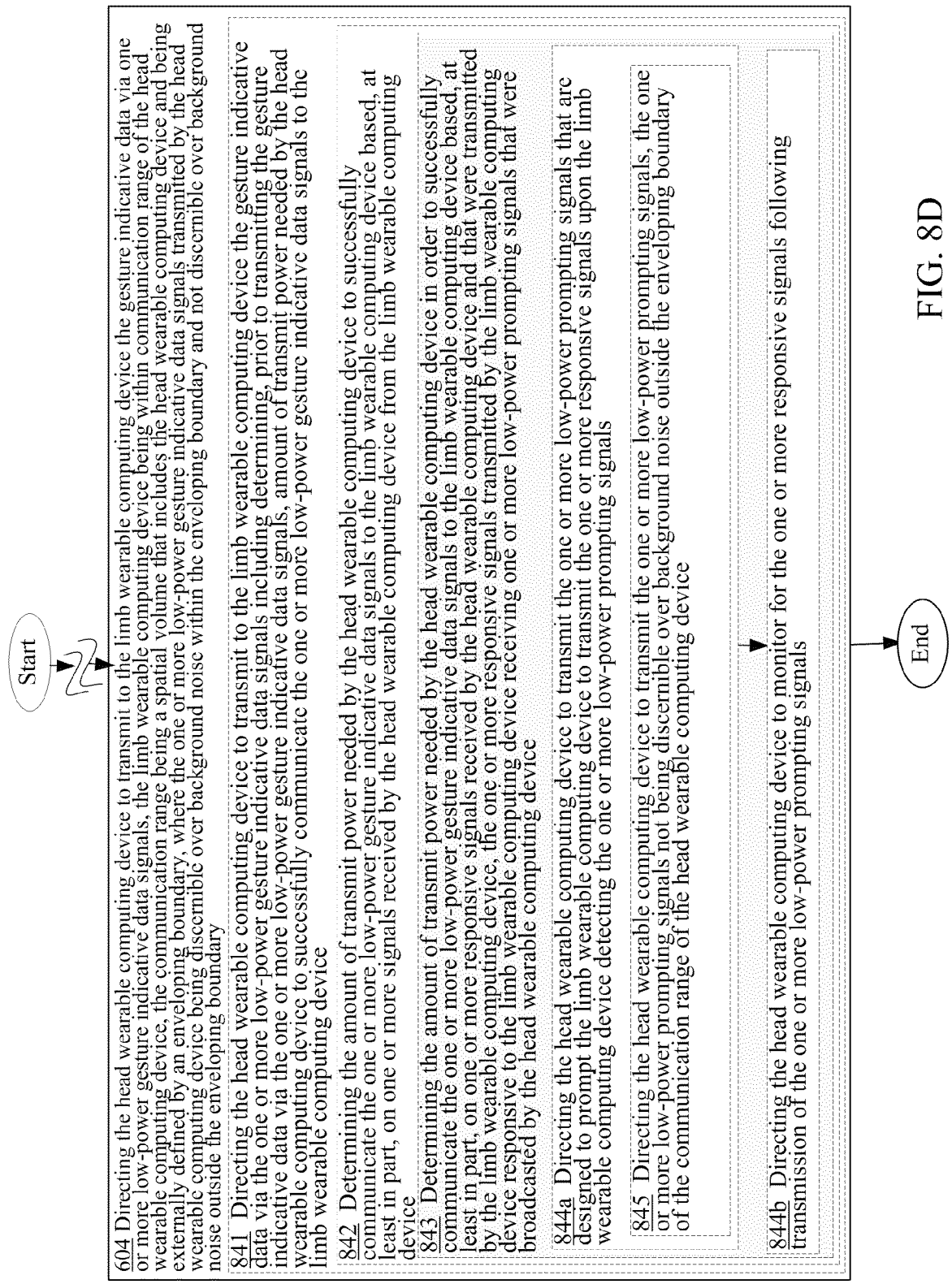
FIG. 8D is a high-level logic flowchart of a process depicting alternate implementations of the gesture indicative data transmit directing operation 604 of FIG. 6.

Referring now to FIG. 8D, in various embodiments, the gesture indicative data transmit directing operation 604 of FIG. 6 may actually include an operation 841 for directing the head wearable computing device to transmit to the limb wearable computing device the gesture indicative data via the one or more low-power gesture indicative data signals including determining, prior to transmitting the gesture indicative data via the one or more low-power gesture indicative data signals, amount of transmit power needed by the head wearable computing device to successfully communicate the one or more low-power gesture indicative data signals to the limb wearable computing device. For instance, the gesture indicative data transmit directing module 404 including the transmit power requirement determining module 522 (see FIG. 5B) of the head wearable computing device 10* of FIG. 4A or 4B directing the head wearable computing device 10* to transmit to the limb wearable computing device 20 the gesture indicative data via the one or more low-power gesture indicative data signals 85 including determining by the transmit power requirement determining module 522, prior to transmitting the gesture indicative data via the one or more low-power gesture indicative data signals 85, the amount of transmit power needed or required by the head wearable computing device 10* in order to successfully communicate the one or more low-power gesture indicative data signals 85 to the limb wearable computing device 20.

As further illustrated in FIG. 8D, as well as in FIGS. 8E, 8F, 8G, 8H, 8J, 8K and 8L, in various implementations, operation 841 may further include an operation 842 for determining the amount of transmit power needed by the head wearable computing device to successfully communicate the one or more low-power gesture indicative data signals to the limb wearable computing device based, at least in part, on one or more signals received by the head wearable computing device from the limb wearable computing device. For instance, the transmit power requirement determining module 522 of the head wearable computing device 10* of FIG. 4A or 4B determining the amount of transmit power needed by the head wearable computing device 10* to successfully communicate the one or more low-power gesture indicative data signals 85 to the limb wearable computing device 20 based, at least in part, on one or more signals 92 (see FIG. 2C) received by the head wearable computing device 10* from the limb wearable computing device 20.

In some cases, operation 842 may, in turn, further include an operation 843 for determining the amount of transmit power needed by the head wearable computing device in order to successfully communicate the one or more low-power gesture indicative data signals to the limb wearable computing device based, at least in part, on one or more responsive signals received by the head wearable computing device and that were transmitted by the limb wearable computing device, the one or more responsive signals transmitted by the limb wearable computing device responsive to the limb wearable computing device receiving one or more low-power prompting signals that were broadcasted by the head wearable computing device. For instance, the transmit power requirement determining module 522 of the head wearable computing device 10* of FIG. 4A or 4B determining the amount of transmit power needed by the head wearable computing device 10* in order to successfully communicate the one or more low-power gesture indicative data signals 85 to the limb wearable computing device 20 based, at least in part, on one or more responsive signals (e.g., signals 92 of FIG. 2C) received by the head wearable computing device 10* and that were transmitted by the limb wearable computing device 20, the one or more responsive signals (e.g., signals 92) transmitted by the limb wearable computing device 20 responsive to the limb wearable computing device 20 receiving one or more low-power prompting signals 93*c* (see FIG. 2C) that were broadcasted (e.g., transmitted) by the head wearable computing device 10*.

As further illustrated in FIGS. 8D, 8E, 8F, 8G, 8H, and 8J, operation 843 may include both an operation 844*a* for directing the head wearable computing device to transmit the one or more low-power prompting signals that are designed to prompt the limb wearable computing device to transmit the one or more responsive signals upon the limb wearable computing device detecting the one or more low-power prompting signals and an operation 844*b* for directing the head wearable computing device to monitor for the one or more responsive signals following transmission of the one or more low-power prompting signals. For instance, the prompting signal transmit directing module 524 (see FIG. 5B) of the head wearable computing device 10* of FIG. 4A or 4B directing (e.g., controlling, instructing, or configuring) the head wearable computing device 10* to transmit the one or more low-power prompting signals 93*c* that are designed to prompt the limb wearable computing device 20 to transmit the one or more responsive signals (e.g., signals 92) upon the limb wearable computing device 20 detecting the one or more low-power prompting signals 93*c*; and the responsive signal monitor directing module 526 (see FIG. 5B) of the head wearable computing device 10* of FIG. 4A or 4B directing (e.g., controlling, instructing, or configuring) the head wearable computing device 10* to monitor for the one or more responsive signals following transmission of the one or more low-power prompting signals 93*c*.

In some implementations, operation 844*a* may actually include an operation 845 for directing the head wearable computing device to transmit the one or more low-power prompting signals, the one or more low-power prompting signals not being discernible over background noise outside the enveloping boundary of the communication range of the head wearable computing device as illustrated in FIG. 8D. For instance, the prompting signal transmit directing module 524 of the head wearable computing device 10* of FIG. 4A or 4B directing the head wearable computing device 10* to transmit (e.g., transmitted using one or more frequencies from the 60 GHz frequency band, 2.4 GHz frequency band, or 5 GHz frequency band) the one or more low-power prompting signals 93*c*, the one or more low-power prompting signals 93*c* not being discernible over background noise outside the enveloping boundary 55*c* of the communication range 54*c* of the head wearable computing device 10*.

Figure 8E:
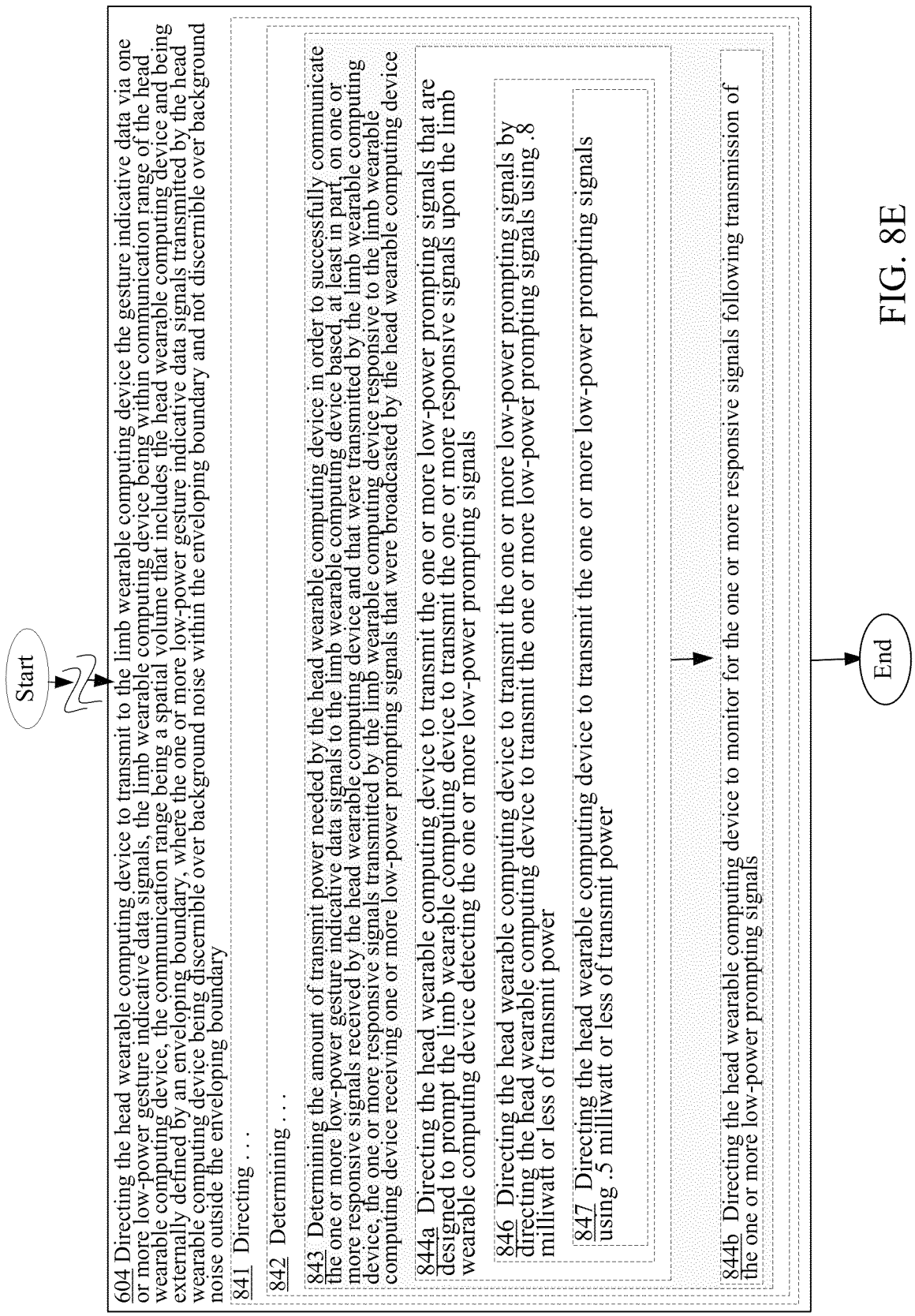
FIG. 8E is a high-level logic flowchart of a process depicting alternate implementations of the gesture indicative data transmit directing operation 604 of FIG. 6.

Turning to FIG. 8E, in some implementations, operation 844*a* may include an operation 846 for directing the head wearable computing device to transmit the one or more low-power prompting signals by directing the head wearable computing device to transmit the one or more low-power prompting signals using 0.8 milliwatt or less of transmit power. For instance, the prompting signal transmit directing module 524 of the head wearable computing device 10* of FIG. 4A or 4B directing the head wearable computing device 10* to transmit the one or more low-power prompting signals 93*c* by directing the head wearable computing device 10* to transmit the one or more low-power prompting signals 93*c* using 0.8 milliwatt or less of transmit power. Note that for ease of illustration, and to reduce redundancy, the text included in the blocks associated with operation 841 and operation 842 have been removed in FIG. 8E (as well as in FIGS. 8F, 8G, 8H, and 8J).

In some cases, operation 846 may actually include an operation 847 for directing the head wearable computing device to transmit the one or more low-power prompting signals using 0.5 milliwatt or less of transmit power. For instance, the prompting signal transmit directing module 524 of the head wearable computing device 10* of FIG. 4A or 4B directing the head wearable computing device 10* to transmit the one or more low-power prompting signals 93c using 0.5 milliwatt or less of transmit power.

Figure 8F:
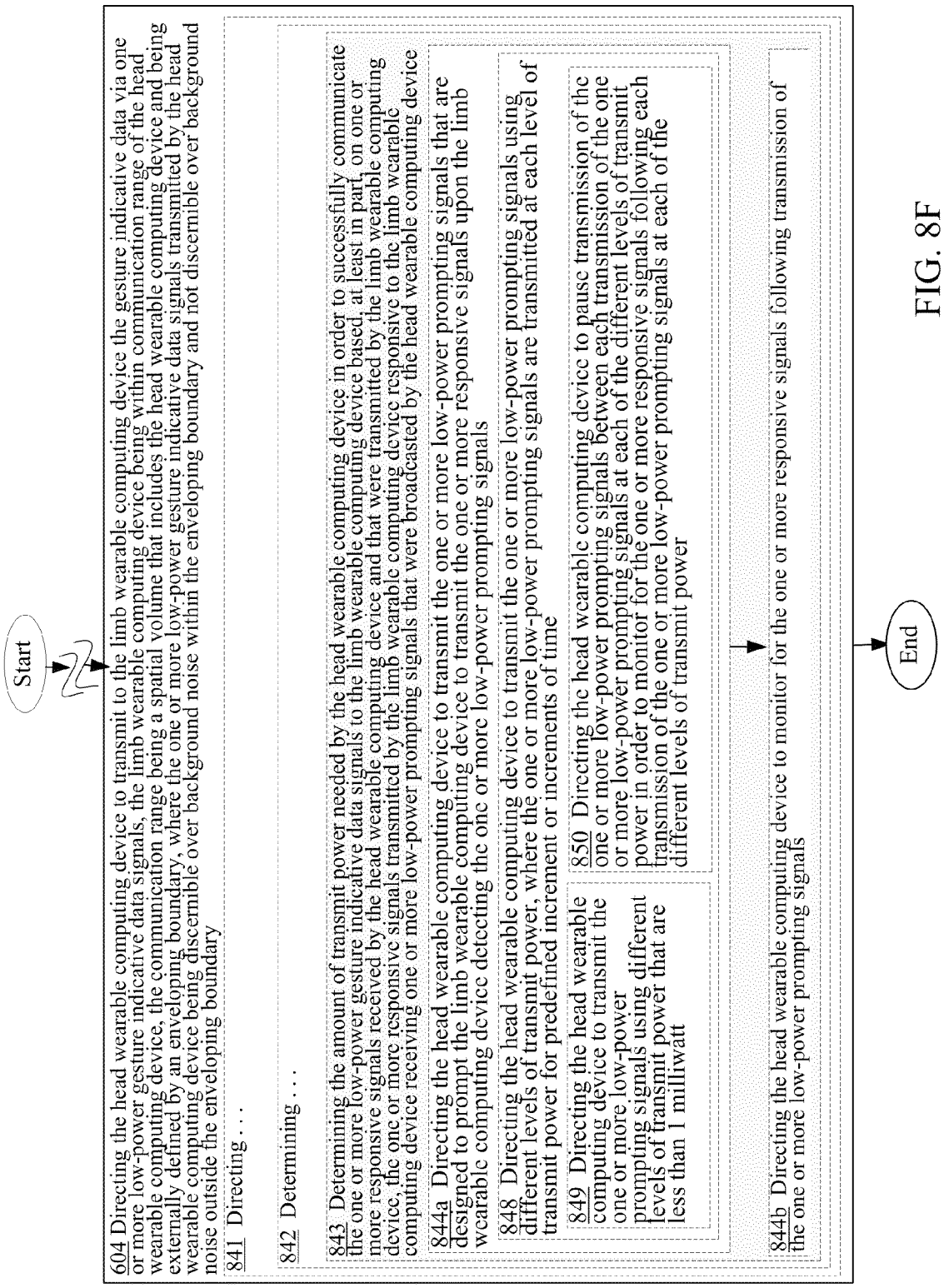
FIG. 8F is a high-level logic flowchart of a process depicting alternate implementations of the gesture indicative data transmit directing operation 604 of FIG. 6.

In the same or alternative implementations, operation 844a may additionally or alternatively include an operation 848 for directing the head wearable computing device to transmit the one or more low-power prompting signals using different levels of transmit power, where the one or more low-power prompting signals are transmitted at each level of transmit power for predefined increment or increments of time as illustrated in FIG. 8F. For instance, the prompting signal transmit directing module 524 of the head wearable computing device 10* of FIG. 4A or 4B directing (e.g., controlling, instructing, or configuring) the head wearable computing device 10* to transmit (e.g., via a directional or omnidirectional antenna) the one or more low-power prompting signals 93* using different levels of transmit power, where the one or more low-power prompting signals 93* are transmitted at each level of transmit power for predefined increment or increments of time (e.g., 1 millisecond) as illustrated, for example, in FIG. 2C.

In some implementations, operation 848 may include an operation 849 for directing the head wearable computing device to transmit the one or more low-power prompting signals using different levels of transmit power that are less than 1 milliwatt. For instance, the prompting signal transmit directing module 524 of the head wearable computing device 10* of FIG. 4A or 4B directing the head wearable computing device 10* to transmit the one or more low-power prompting signals 93* using different levels (e.g., 0.1 milliwatt, 0.2 milliwatt, etc.) of transmit power that are less than 1 milliwatt.

In the same or alternative implementations, operation 848 may additionally or alternatively include an operation 850 for directing the head wearable computing device to pause transmission of the one or more low-power prompting signals between each transmission of the one or more low-power prompting signals at each of the different levels of transmit power in order to monitor for the one or more responsive signals following each transmission of the one or more low-power prompting signals at each of the different levels of transmit power. For instance, the prompting signal transmit directing module 524 of the head wearable computing device 10* of FIG. 4A or 4B directing the head wearable computing device 10* to pause transmission (e.g., stop transmission) of the one or more low-power prompting signals 93* between each transmission of the one or more low-power prompting signals 93* at each of the different levels of transmit power in order to monitor for the one or more responsive signals (e.g., signals 92) following each transmission of the one or more low-power prompting signals 93* at each of the different levels of transmit power. For example, initially transmitting the one or more low-power prompting signals 93a using 0.1 milliwatt of transmit power for 0.1 millisecond, then pausing transmission of the one or more low-power prompting signals 93a for 0.1 milliseconds in order to monitor for responsive signals transmitted by the limb wearable computing device 20 in response to detecting the one or more low-power prompting signals 93a, then transmitting the one or more low-power prompting signals 93b using 0.2 milliwatt of transmit power for 0.1 milliseconds, then pausing transmission of the one or more low-power prompting signals 93b for 0.1 milliseconds in order to monitor for responsive signals transmitted by the limb wearable computing device 20 in response to detecting the one or more low-power prompting signals 93b, and repeating this process over and over again until the responsive signals are detected.

Figure 8G:
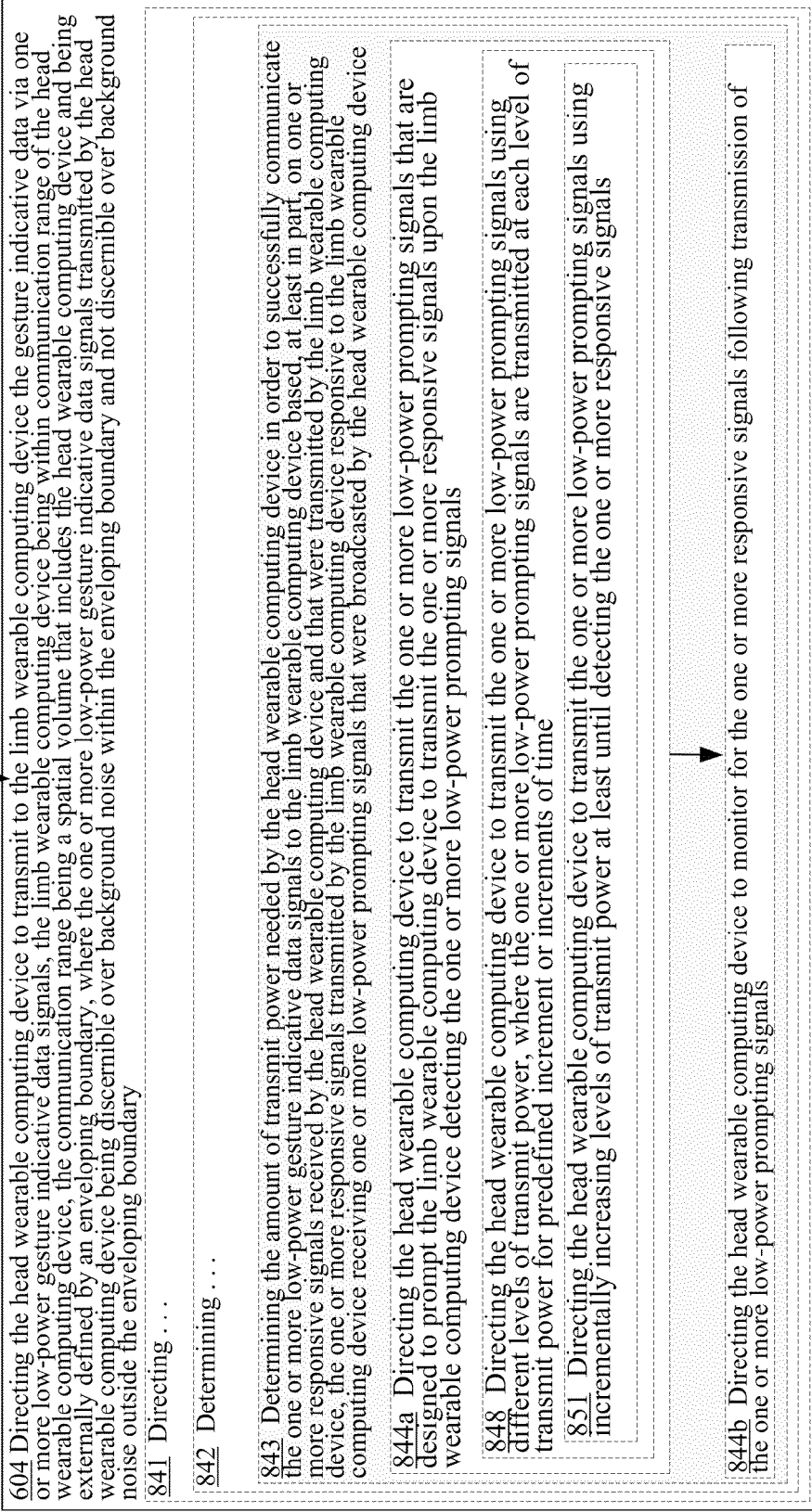
FIG. 8G is a high-level logic flowchart of a process depicting alternate implementations of the gesture indicative data transmit directing operation 604 of FIG. 6.

In the same or alternative implementations, operation 848 may additionally or alternatively include an operation 851 for directing the head wearable computing device to transmit the one or more low-power prompting signals using incrementally increasing levels of transmit power at least until detecting the one or more responsive signals as illustrated in FIG. 8G. For instance, the prompting signal transmit directing module 524 of the head wearable computing device 10* of FIG. 4A or 4B directing the head wearable computing device 10* to transmit the one or more low-power prompting signals 93* using incrementally increasing levels of transmit power at least until detecting the one or more responsive signals (e.g., signals 92 of FIG. 2C).

Figure 8H:
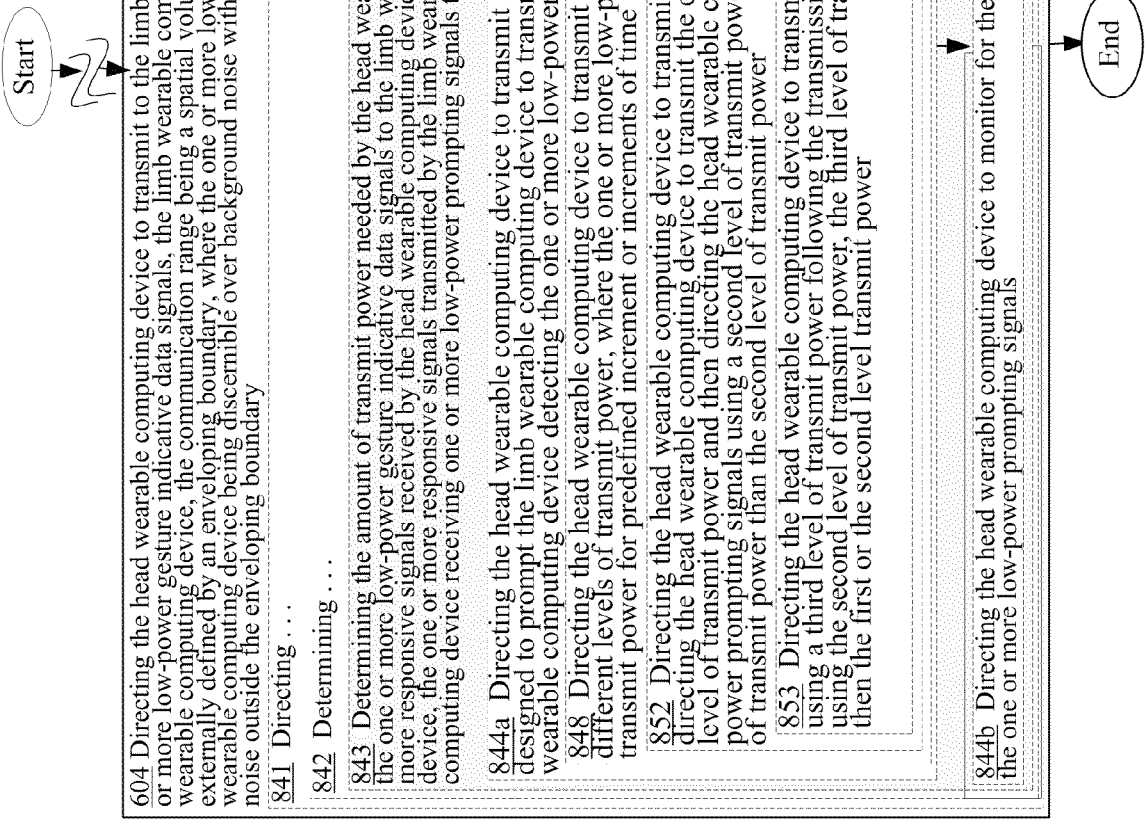
FIG. 8H is a high-level logic flowchart of a process depicting alternate implementations of the gesture indicative data transmit directing operation 604 of FIG. 6.

Referring now to FIG. 8H, in some implementations, operation 848 may further include an operation 852 for directing the head wearable computing device to transmit the one or more low-power prompting signals by directing the head wearable computing device to transmit the one or more low-power prompting signals using a first level of transmit power and then directing the head wearable computing device to transmit the one or more low-power prompting signals using a second level of transmit power, the first level of transmit power being a lower level of transmit power than the second level of transmit power. For instance, the prompting signal transmit directing module 524 of the head wearable computing device 10* of FIG. 4A or 4B directing the head wearable computing device 10* to transmit the one or more low-power prompting signals 93* by directing the head wearable computing device 10* to transmit the one or more low-power prompting signals 93* using a first level of transmit power (e.g., 0.2 milliwatt of transmit power) and then directing the head wearable computing device 10* to transmit the one or more low-power prompting signals 93* using a second level of transmit power (e.g., 0.3 milliwatt of transmit power), the first level of transmit power being a lower level of transmit power than the second level of transmit power.

In some cases, operation 852 may, in turn, further include an operation 853 for directing the head wearable computing device to transmit the one or more low-power prompting signals using a third level of transmit power following the transmission of the one or more low-power prompting signals using the second level of transmit power, the third level of transmit power being a higher level of transmit power then the first or the second level transmit power. For instance, the prompting signal transmit directing module 524 of the head wearable computing device 10* of FIG. 4A or 4B directing the head wearable computing device 10* to transmit the one or more low-power prompting signals 93* using a third level of transmit power (e.g., 0.4 milliwatt of transmit power) following the transmission of the one or more low-power prompting signals using the second level of transmit power (e.g., 0.3 milliwatt of transmit power), the third level of transmit power being a higher level of transmit power then the first or the second level transmit power.

Figure 8J:
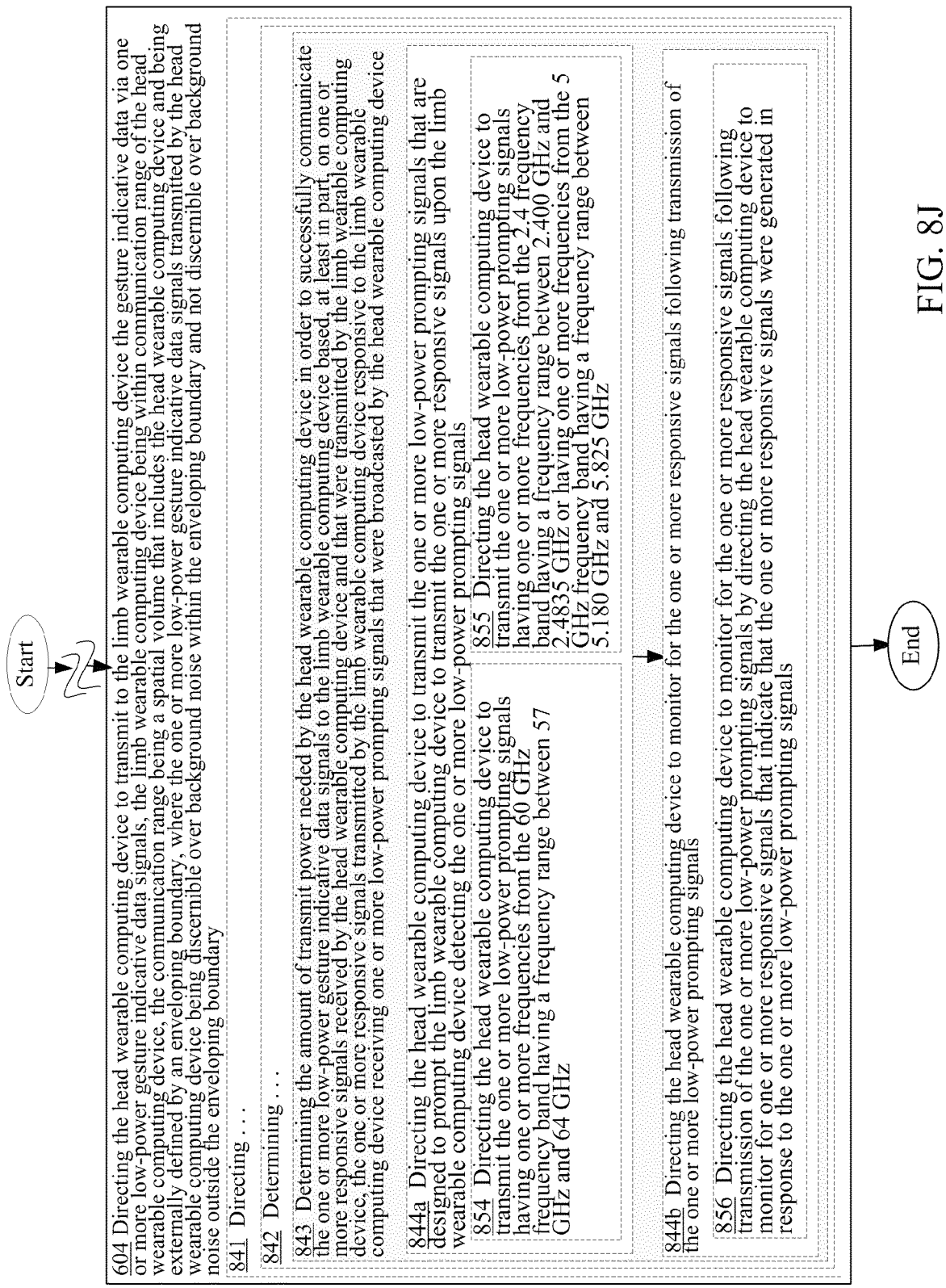
FIG. 8J is a high-level logic flowchart of a process depicting alternate implementations of the gesture indicative data transmit directing operation 604 of FIG. 6.

Turning now to FIG. 8J, in various implementations, operation 844a may include an operation 854 for directing the head wearable computing device to transmit the one or more low-power prompting signals having one or more frequencies form the 60 GHz frequency band having a frequency range between 57 GHz and 64 GHz. For instance, the prompting signal transmit directing module 524 of the head wearable computing device 10* of FIG. 4A or 4B directing (e.g., controlling, instructing, or configuring) the head wearable computing device 10* to transmit the one or more low-power prompting signals 93*c* having one or more frequencies from the 60 GHz frequency band having a frequency range between 57 GHz and 64 GHz.

In alternative implementations, operation 844*a* may include an operation 855 for directing the head wearable computing device to transmit the one or more low-power prompting signals having one or more frequencies from the 2.4 frequency band having a frequency range between 2.400 GHz and 2.4835 GHz or having one or more frequencies from the 5 GHz frequency band having a frequency range between 5.180 GHz and 5.825 GHz. For instance, the prompting signal transmit directing module 524 of the head wearable computing device 10* of FIG. 4A or 4B directing the head wearable computing device 10* to transmit the one or more low-power prompting signals 93* having one or more frequencies from the 2.4 frequency band having a frequency range between 2.400 GHz and 2.4835 GHz or having one or more frequencies from the 5 GHz frequency band having a frequency range between 5.180 GHz and 5.825 GHz.

In the same or alternative implementations, operation 844*b* for directing the head wearable computing device to monitor for the one or more responsive signals following transmission of the one or more low-power prompting signals may additionally or alternatively include an operation 856 for directing the head wearable computing device to monitor for the one or more responsive signals following transmission of the one or more low-power prompting signals by directing the head wearable computing device to monitor for one or more responsive signals that indicate that the one or more responsive signals were generated in response to the one or more low-power prompting signals. For instance, the responsive signal monitor directing module 526 of the head wearable computing device 10* of FIG. 4A or 4B directing the head wearable computing device 10* to monitor (e.g., detect or sense) for the one or more responsive signals following transmission of the one or more low-power prompting signals 93*c* by directing the head wearable computing device 10* to monitor for one or more responsive signals (e.g., signals 92) that indicate that the one or more responsive signals were generated in response to the one or more low-power prompting signals 93*c*.

Figure 8K:
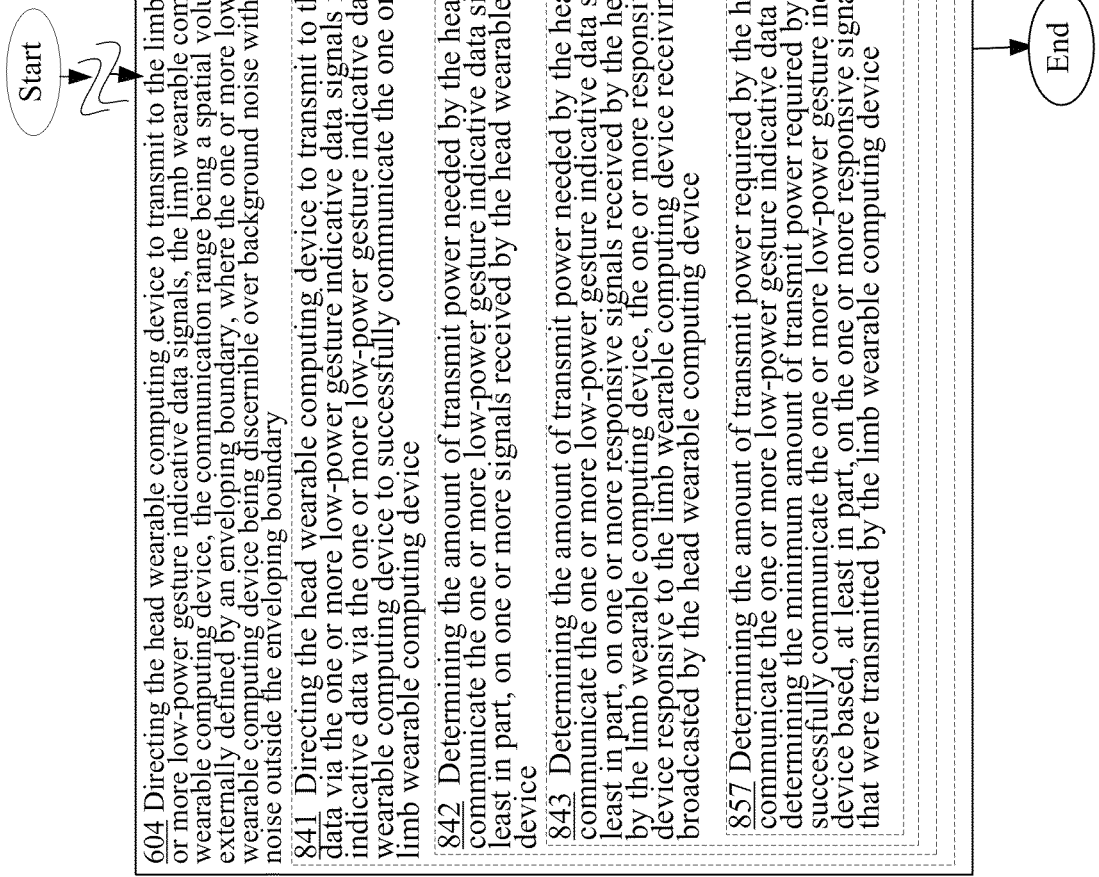
FIG. 8K is a high-level logic flowchart of a process depicting alternate implementations of the gesture indicative data transmit directing operation 604 of FIG. 6.

Turning to FIG. 8K, in various implementations, operation 843 for determining the amount of transmit power needed by the head wearable computing device in order to successfully communicate the one or more low-power gesture indicative data signals to the limb wearable computing device based, at least in part, on one or more responsive signals received by the head wearable computing device and that were transmitted by the limb wearable computing device, the one or more responsive signals transmitted by the limb wearable computing device responsive to the limb wearable computing device receiving one or more low-power prompting signals that were broadcasted by the head wearable computing device may include an operation 857 for determining the amount of transmit power required by the head wearable computing device in order to successfully communicate the one or more low-power gesture indicative data signals to the limb wearable computing device by determining the minimum amount of transmit power required by the head wearable computing device in order to successfully communicate the one or more low-power gesture indicative data signals to the limb wearable computing device based, at least in part, on the one or more responsive signals received by the head wearable computing device and that were transmitted by the limb wearable computing device. For instance, the transmit power requirement determining module 522 including the minimum transmit power requirement determining module 528 (see FIG. 8K) of the head wearable computing device 10* of FIG. 4A or 4B determining the amount of transmit power required (e.g., needed) by the head wearable computing device 10* in order to successfully communicate the one or more low-power gesture indicative data signals 85 to the limb wearable computing device 20 by having the minimum transmit power requirement determining module 528 determine the minimum amount of transmit power required (e.g., needed) by the head wearable computing device 10* in order to successfully communicate the one or more low-power gesture indicative data signals 85 to the limb wearable computing device 20 based, at least in part, on the one or more responsive signals (e.g., signals 92) received by the head wearable computing device 10* and that were transmitted by the limb wearable computing device 20.

Figure 8L:
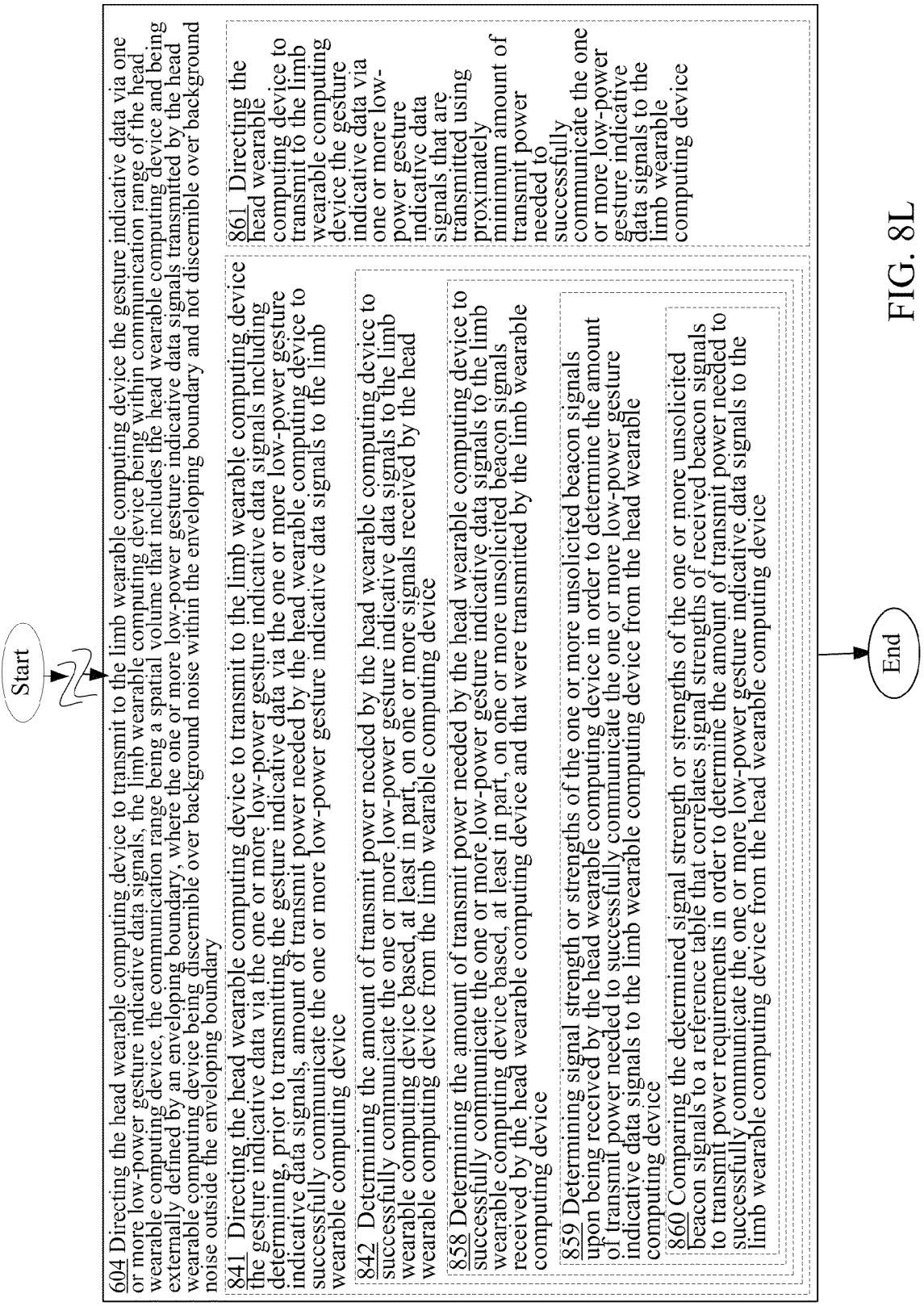
FIG. 8L is a high-level logic flowchart of a process depicting alternate implementations of the gesture indicative data transmit directing operation 604 of FIG. 6.

Turning to FIG. 8L, in various implementations operation 842 for determining the amount of transmit power needed by the head wearable computing device to successfully communicate the one or more low-power gesture indicative data signals to the limb wearable computing device based, at least in part, on one or more signals received by the head wearable computing device from the limb wearable computing device may include an operation 858 for determining the amount of transmit power needed by the head wearable computing device to successfully communicate the one or more low-power gesture indicative data signals to the limb wearable computing device based, at least in part, on one or more unsolicited beacon signals received by the head wearable computing device and that were transmitted by the limb wearable computing device. For instance, the beacon signal based transmit power requirement determining module 530 (see FIG. 5B) of the head wearable computing device 10* of FIG. 4A or 4B determining the amount of transmit power needed by the head wearable computing device 10* to successfully communicate the one or more low-power gesture indicative data signals 85 to the limb wearable computing device 20 based, at least in part, on one or more unsolicited beacon signals (e.g., signals 92 of FIG. 2C) received by the head wearable computing device 10* and that were transmitted by the limb wearable computing device 20. Note again that the one or more signals 92 illustrated in FIG. 2C may be one or more responsive signals (generated by the limb wearable computing device 20 in response to the limb wearable computing device 20 receiving one or more prompting signals 93*c*) or one or more unsolicited beacon signals which, unlike the responsive signals, are unsolicited from the limb wearable computing device 20.

As further illustrated in FIG. 8L, in some cases, operation 858 may further include an operation 859 for determining signal strength or strengths of the one or more unsolicited beacon signals upon being received by the head wearable computing device in order to determine the amount of transmit power needed to successfully communicate the one or more low-power gesture indicative data signals to the limb wearable computing device from the head wearable computing device. For instance, the beacon signal strength determining module 532 (see FIG. 5B) of the head wearable computing device 10* of FIG. 4A or 4B determining signal strength or strengths of the one or more unsolicited beacon signals (e.g., signals 92) upon being received by the head wearable computing device 10* in order to determine the amount of transmit power needed by the head wearable computing device 10* to successfully communicate the one or more low-power gesture indicative data signals 85 to the limb wearable computing device 20.

In some implementations, operation 859 may further include or involve an operation 860 for comparing the determined signal strength or strengths of the one or more unsolicited beacon signals to a reference table that correlates signal strengths of received beacon signals to transmit power requirements in order to determine the amount of transmit power needed to successfully communicate the one or more low-power gesture indicative data signals to the limb wearable computing device from the head wearable computing device. For instance, the reference table comparing module 534 (see FIG. 5B) of the head wearable computing device 10* of FIG. 4A or 4B comparing the determined signal strength or strengths of the one or more unsolicited beacon signals (e.g., signals 92) to a reference table that correlates signal strengths of received beacon signals to transmit power requirements in order to determine the amount of transmit power needed by the head wearable computing device 10* to successfully communicate the one or more low-power gesture indicative data signals 85 to the limb wearable computing device 20. Note that the above reference to a "reference table" should be broadly construed and may be any data structure that associates detected signal strengths of beacon signals with corresponding transmit power requirements needed for successfully communicating with the source (e.g., limb wearable computing device 20) of the beacon signals.

In some implementations, the gesture indicative data transmit directing operation 604 of FIG. 6, may include an operation 861 for directing the head wearable computing device to transmit to the limb wearable computing device the gesture indicative data via one or more low-power gesture indicative data signals that are transmitted using proximately minimum amount of transmit power needed to successfully communicate the one or more low-power gesture indicative data signals to the limb wearable computing device. For instance, the gesture indicative data transmit directing module 404 of the head wearable computing device 10* of FIG. 4A or 4B directing the head wearable computing device 10* to transmit to the limb wearable computing device 20 the gesture indicative data via one or more low-power gesture indicative data signals 93* that are transmitted using proximately (e.g., within ten percent of) minimum amount of transmit power needed to successfully communicate the one or more low-power gesture indicative data signals 85 to the limb wearable computing device 20.

Figure 9:
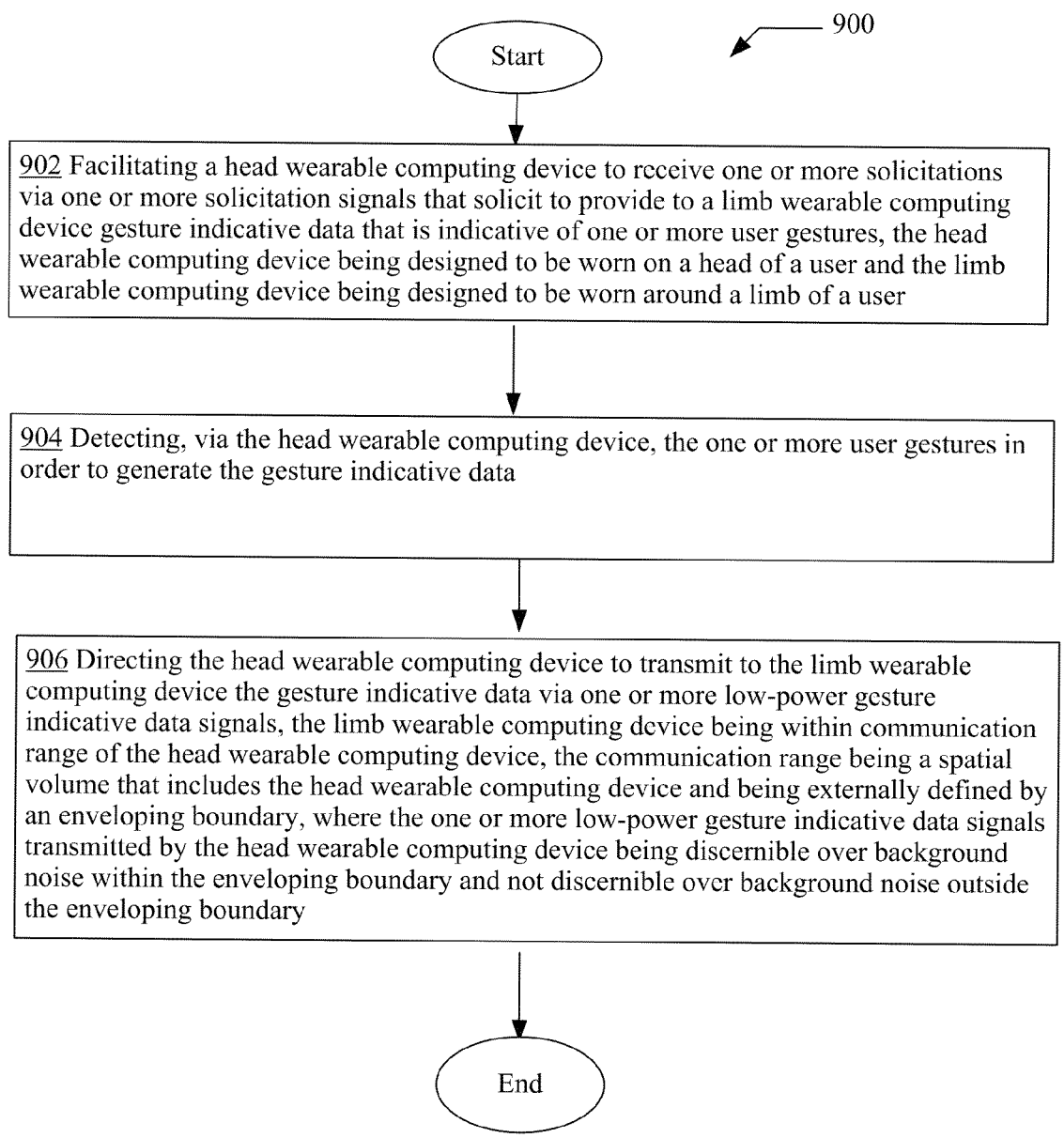
FIG. 9 is another high-level logic flowchart of another process, e.g., operational flow 900, according to some embodiments.

Turning now to FIG. 9 illustrating another operational flow 900. Operational flow 900 includes certain operations that mirror the operations included in operational flow 600 of FIG. 6. These operations include solicitation receive facilitating operation 902 and a gesture indicative data transmit directing operation 906 that corresponds to and mirrors the solicitation receive facilitating operation 602 and the gesture indicative data transmit directing operation 604, respectively, of FIG. 1.

In addition, operational flow 900 further includes a user gesture detecting operation 904 for detecting, via the head wearable computing device, the one or more user gestures in order to generate the gesture indicative data. For instance, the user gesture detecting module 406 of the head wearable computing device 10* of FIG. 4A or 4B detecting or sensing, via the head wearable computing device 10*, the one or more user gestures (e.g., hand and/or arm gestures) in order to generate the gesture indicative data. Note that for purposes of this description, hand gestures include finger gestures.

Figure 10A:
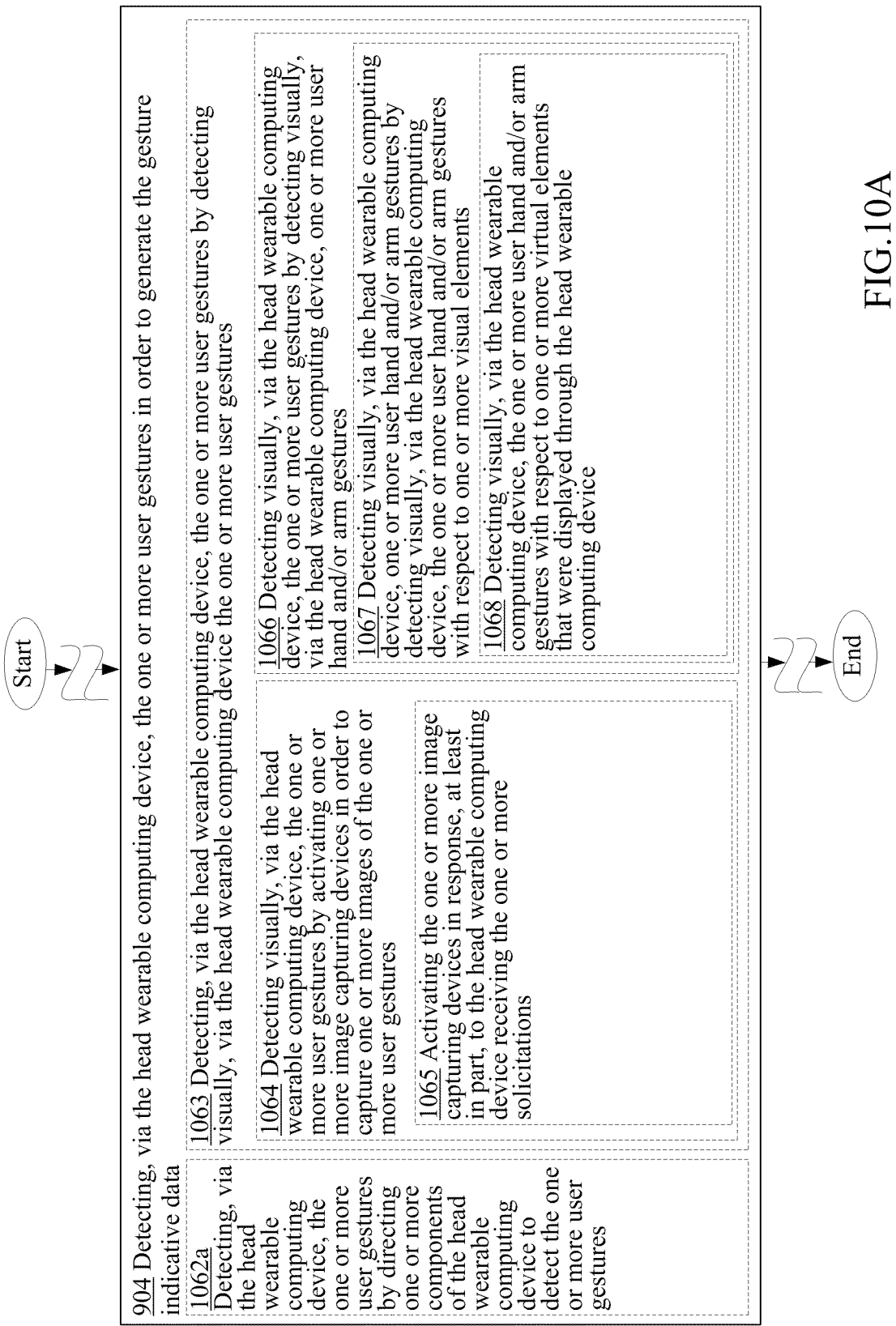
FIG. 10A is a high-level logic flowchart of a process depicting alternate implementations of the user gesture detecting operation 904 of FIG. 9.
Figure 10B:
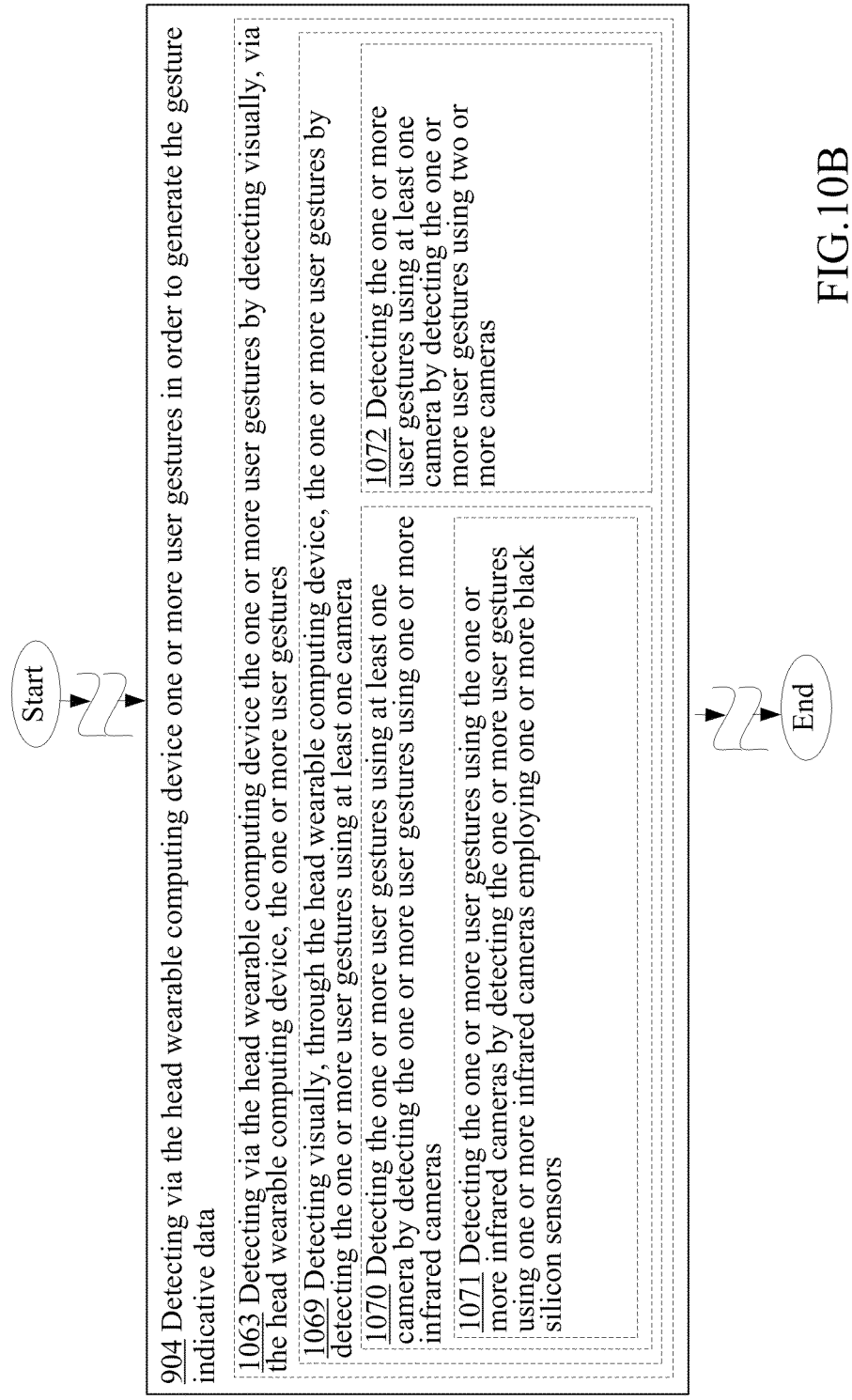
FIG. 10B is a high-level logic flowchart of a process depicting alternate implementations of the user gesture detecting operation 904 of FIG. 9.

FIGS. 10A and 10B illustrate various ways that the user gesture detecting operation 904 of FIG. 9 may be implemented in various alternative implementations. For example, in some implementations, the user gesture detecting operation 904 may include an operation 1062a for detecting, via the head wearable computing device, the one or more user gestures by directing one or more components of the head wearable computing device to detect the one or more user gestures as illustrated in FIG. 10A. For instance, the user gesture detecting module 406 including the user gesture detect directing module 536 (see FIG. 5C) of the head wearable computing device 10* of FIG. 4A or 4B detecting, via the head wearable computing device 10*, the one or more user gestures by having the user gesture detect directing module 536 direct one or more components (e.g., visual sensors such as cameras) of the head wearable computing device 10* to detect the one or more user gestures.

In the same or alternative implementations, the user gesture detecting operation 904 of FIG. 9 may additionally or alternatively include an operation 1063 for detecting, via the head wearable computing device, the one or more user gestures by detecting visually, via the head wearable computing device, the one or more user gestures. For instance, the user gesture detecting module 406 including the user gesture visual detecting module 538 (see FIG. 5C) of the head wearable computing device 10* of FIG. 4A or 4B detecting via the head wearable computing device the one or more user gestures by having the user gesture visual detecting module 538 detect visually via the head wearable computing device 10* the one or more user gestures.

As further illustrated in FIG. 10A, operation 1063 may further include one or more additional operations in various alternative implementations including, in some cases, an operation 1064 for detecting visually, via the head wearable computing device, the one or more user gestures by activating one or more image capturing devices in order to capture one or more images of the one or more user gestures. For instance, the user gesture visual detecting module 538 including the image capturing device activating module 540 (see FIG. 5C) of the head wearable computing device 10* of FIG. 4A or 4B detecting visually, via the head wearable computing device 10*, the one or more user gestures by having the image capturing device activating module 540 activate one or more image capturing devices (e.g., one or more cameras including one or more infrared cameras that employ black silicon sensors) in order to capture one or more images of the one or more user gestures (e.g., hand/finger gestures).

In some implementations, operation 1064 may further include an operation 1065 for activating the one or more image capturing devices in response, at least in part, to the head wearable computing device receiving the one or more solicitations. For instance, the image capturing device activating module 540 (see FIG. 5C) of the head wearable computing device 10* of FIG. 4A or 4B activating the one or more image capturing devices in response, at least in part, to the head wearable computing device 10* receiving the one or more solicitations via the one or more solicitation signals 80.

In the same or alternative implementations, operation 1063 may additionally or alternatively include an operation 1066 for detecting visually, via the head wearable computing device, the one or more user gestures by detecting visually, via the head wearable computing device, one or more user hand and/or arm gestures. For instance, the user gesture visual detecting module 538 of the head wearable computing device 10* of FIG. 4A or 4B detecting visually, via the head wearable computing device 10*, the one or more user gestures by detecting visually via the head wearable computing device 10* (e.g., via one or more cameras including one or more infrared cameras) one or more user hand and/or arm gestures.

In some cases, operation 1066 may, in turn, further include an operation 1067 for detecting visually, via the head wearable computing device, one or more user hand and/or arm gestures by detecting visually, via the head wearable computing device, the one or more user hand and/or arm gestures with respect to one or more visual elements. For instance, the user gesture visual detecting module 538 of the head wearable computing device 10* of FIG. 4A or 4B detecting visually, via the head wearable computing device 10*, one or more user hand and/or arm gestures by detecting visually, via the head wearable computing device 10*, the one or more user hand and/or arm gestures with respect to one or more visual elements (e.g., actual or virtual elements). For example, detecting visually the one or more user and/or arm gestures by visually capturing hand and/or arm movements (which may include finger movements) with respect to one or more actual elements (e.g., face of the limb wearable computing device 20) and/or one or more virtual elements (e.g., icons 312* of FIG. 3C and/or virtual keyboard 314* of FIG. 3D) as presented through the head wearable computing device 10*.

In some implementations, operation 1067 may further include an operation 1068 for detecting visually, via the head wearable computing device, the one or more user hand and/or arm gestures with respect to one or more virtual elements that were displayed through the head wearable computing device. For instance, the user gesture visual detecting module 538 of the head wearable computing device 10* of FIG. 4A or 4B detecting visually, via the head wearable computing device 10*, the one or more user hand and/or arm gestures with respect to one or more virtual elements (e.g., icons 312* of FIG. 3C or virtual keyboard 314 of FIG. 3D) that were displayed through the head wearable computing device 10*.

Referring now to FIG. 10B, in some implementations, the operation 1063 for detecting, via the head wearable computing device, the one or more user gestures by detecting visually, via the head wearable computing device, the one or more user gestures may include an operation 1069 for detecting visually, through the head wearable computing device, the one or more user gestures by detecting the one or more user gestures using at least one camera. For instance, the user gesture visual detecting module 538 of the head wearable computing device 10* of FIG. 4A or 4B detecting visually through the head wearable computing device 10* the one or more user gestures by detecting the one or more user gestures using at least one camera.

In some cases, operation 1069 may include an operation 1070 for detecting the one or more user gestures using at least one camera by detecting the one or more user gestures using one or more infrared cameras. For instance, the user gesture visual detecting module 538 of the head wearable computing device 10* of FIG. 4A or 4B detecting the one or more user gestures using at least one camera by detecting the one or more user gestures using one or more infrared cameras.

In some implementations, operation 1070 may, in turn, further include an operation 1071 for detecting the one or more user gestures using the one or more infrared cameras by detecting the one or more user gestures using one or more infrared cameras that employ one or more black silicon sensors. For instance, the user gesture visual detecting module 538 of the head wearable computing device 10* of FIG. 4A or 4B detecting the one or more user gestures using the one or more infrared cameras by detecting the one or more user gestures (e.g., finger/hand gestures) using one or more infrared cameras employing one or more black silicon sensors. In some cases, the use of black silicon CMOS sensors in infrared cameras may improve ability to capture finger/hand gestures (e.g., finger/hand movements).

In some cases, operation 1069 may include an operation 1072 for detecting the one or more user gestures using at least one camera by detecting the one or more user gestures using two or more cameras. For instance, the user gesture visual detecting module 538 of the head wearable computing device 10* of FIG. 4A or 4B detecting the one or more user gestures using at least one camera by detecting the one or more user gestures (e.g., hand and/or arm gestures including finger gestures) using two or more cameras. The use of multiple cameras may provide better quality data (e.g., data that provides more accurate information regarding user gestures) for determining actual user gestures.

Figure 11:
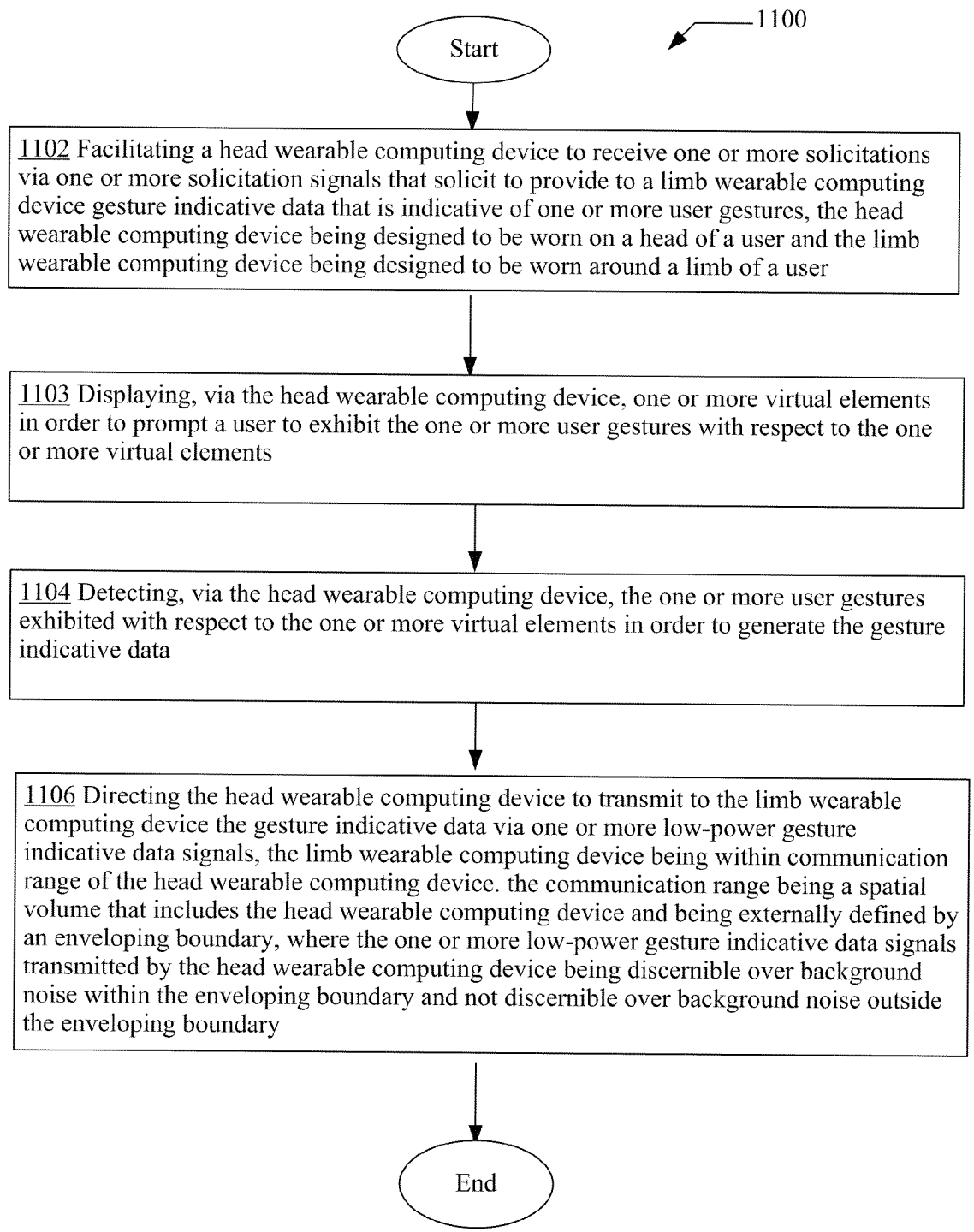
FIG. 11 is another high-level logic flowchart of another process, e.g., operational flow 900, according to some embodiments.

Turning now to FIG. 11 illustrating another operational flow 1100. Operational flow 1100 includes certain operations that mirror the operations included in operational flow 600 of FIG. 6. These operations include solicitation receive facilitating operation 1102 and a gesture indicative data transmit directing operation 1106 that corresponds to and mirrors the solicitation receive facilitating operation 602 and the gesture indicative data transmit directing operation 604, respectively, of FIG. 6.

In addition, operational flow 1100 further includes a virtual element displaying operation 1103 for displaying, via the head wearable computing device, one or more virtual elements in order to prompt a user to exhibit the one or more user gestures with respect to the one or more virtual elements and a user gesture detecting operation 1104 for detecting, via the head wearable computing device, the one or more user gestures with respect to the one or more virtual elements in order to generate the gesture indicative data, which substantially mirrors the user gesture detecting operation 904 of FIG. 9. For instance, the virtual element displaying module 408* of the head wearable computing device 10* of FIG. 4A or 4B displaying, via the head wearable computing device 10*, one or more virtual elements in order to prompt (e.g., in order to solicit) a user 2 to exhibit the one or more user gestures with respect to the one or more virtual elements; and the user gesture detecting module 406* of the head wearable computing device 10* of FIG. 4A or 4B detecting, via the head wearable computing device 10* (e.g., via one or more cameras), the one or more user gestures with respect to the one or more virtual elements in order to generate the gesture indicative data.

Figure 12A:
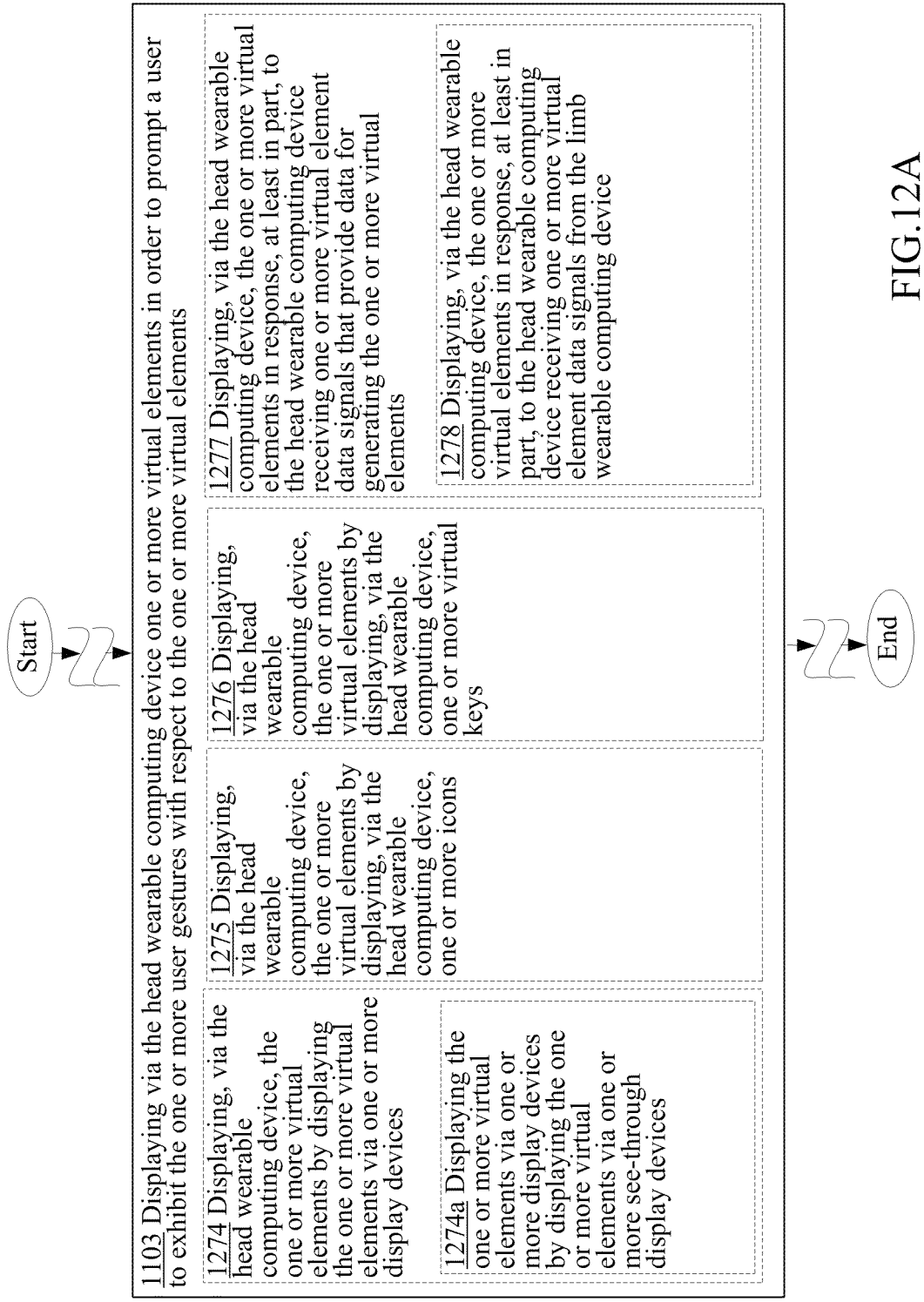
FIG. 12A is a high-level logic flowchart of a process depicting alternate implementations of the virtual element displaying operation 1103 of FIG. 11.

Turning now to FIG. 12A, which illustrates various ways that the virtual element displaying operation 1103 of FIG. 11 may be implemented in various alternative implementations. For example, in some implementations, that the virtual element displaying operation 1103 may include an operation 1274 for displaying, via the head wearable computing device, the one or more virtual elements by displaying the one or more virtual elements via one or more display devices. For instance, the virtual element displaying module 408* of the head wearable computing device 10* of FIG. 4A or 4B displaying, via the head wearable computing device 10*, the one or more virtual elements by displaying the one or more virtual elements via one or more display devices (e.g., one or more liquid crystal displays, see-through displays, and so forth).

In some cases, operation 1274 may further include an operation 1274a for displaying the one or more virtual elements via one or more display devices by displaying the one or more virtual elements via one or more see-through display devices. For instance, the virtual element displaying module 408* of the head wearable computing device 10* of FIG. 4A or 4B displaying the one or more virtual elements via one or more display devices by displaying the one or more virtual elements (e.g., icons 312*, virtual keys 315, virtual keyboard 314 or keypad, and so forth) via one or more see-through display devices (e.g., see-through display 112, 182, 182*a*, or 182*b* of FIG. 1B, 1C, or 1D).

In some implementations, that the virtual element displaying operation 1103 of FIG. 11 may include an operation 1275 for displaying, via the head wearable computing device, the one or more virtual elements by displaying, via the head wearable computing device, one or more icons. For instance, the virtual element displaying module 408* of the head wearable computing device 10* of FIG. 4A or 4B displaying, via the head wearable computing device 10*, the one or more virtual elements by displaying, via the head wearable computing device 10*, one or more icons 312* (see FIG. 3C). Note that each of the example icons 312* illustrated in FIG. 3C are associated with corresponding applications that can be selected by the user 2 for activation or display when the user 2 makes certain gestures with respect to any one or more of the icons 312* such as making a "pressing" motion with the user's finger or fingers on one or more of the icons 312*.

In some implementations, that the virtual element displaying operation 1103 of FIG. 11 may include an operation 1276 for displaying, via the head wearable computing device, the one or more virtual elements by displaying, via the head wearable computing device, one or more virtual keys. For instance, the virtual element displaying module 408* of the head wearable computing device 10* of FIG. 4A or 4B displaying, via the head wearable computing device 10*, the one or more virtual elements by displaying, via the head wearable computing device 10*, one or more virtual keys 315 (see, for example, FIG. 3D). For example, any one or more of the virtual keys 315 illustrated in FIG. 3D may be selected by a user 2 when the user 2 makes certain gestures (e.g., one or more fingers making "pressing" motions relative to one or more virtual keys 315) in order to input data (e.g., alphanumeric data).

In some implementations, that the virtual element displaying operation 1103 of FIG. 11 may include an operation 1277 for displaying, via the head wearable computing device, the one or more virtual elements in response, at least in part, to the head wearable computing device receiving one or more virtual element data signals that provide data for generating the one or more virtual elements. For instance, the virtual element displaying module 408* of the head wearable computing device 10* of FIG. 4A or 4B displaying, via the head wearable computing device 10*, the one or more virtual elements in response, at least in part, to the head wearable computing device 10* receiving one or more virtual element data signals 82 (see FIG. 2B) that provide data for generating the one or more virtual elements (e.g., icons 312*, virtual keys 315, and so forth). Note that although FIG. 2B shows the virtual element data signals 82 being transmitted by the limb wearable computing device 20, in alternative embodiments, the virtual element data signals 82 may be obtained from other sources (e.g., from a nearby mobile device or a workstation).

In some cases, operation 1277 may further include an operation 1278 for displaying, via the head wearable computing device, the one or more virtual elements in response, at least in part, to the head wearable computing device receiving one or more virtual element data signals from the limb wearable computing device. For instance, the virtual element displaying module 408* of the head wearable computing device 10* of FIG. 4A or 4B displaying, via the head wearable computing device 10*, the one or more virtual elements in response, at least in part, to the head wearable computing device 10* receiving one or more virtual element data signals 82 from the limb wearable computing device 20.

Figure 12B:
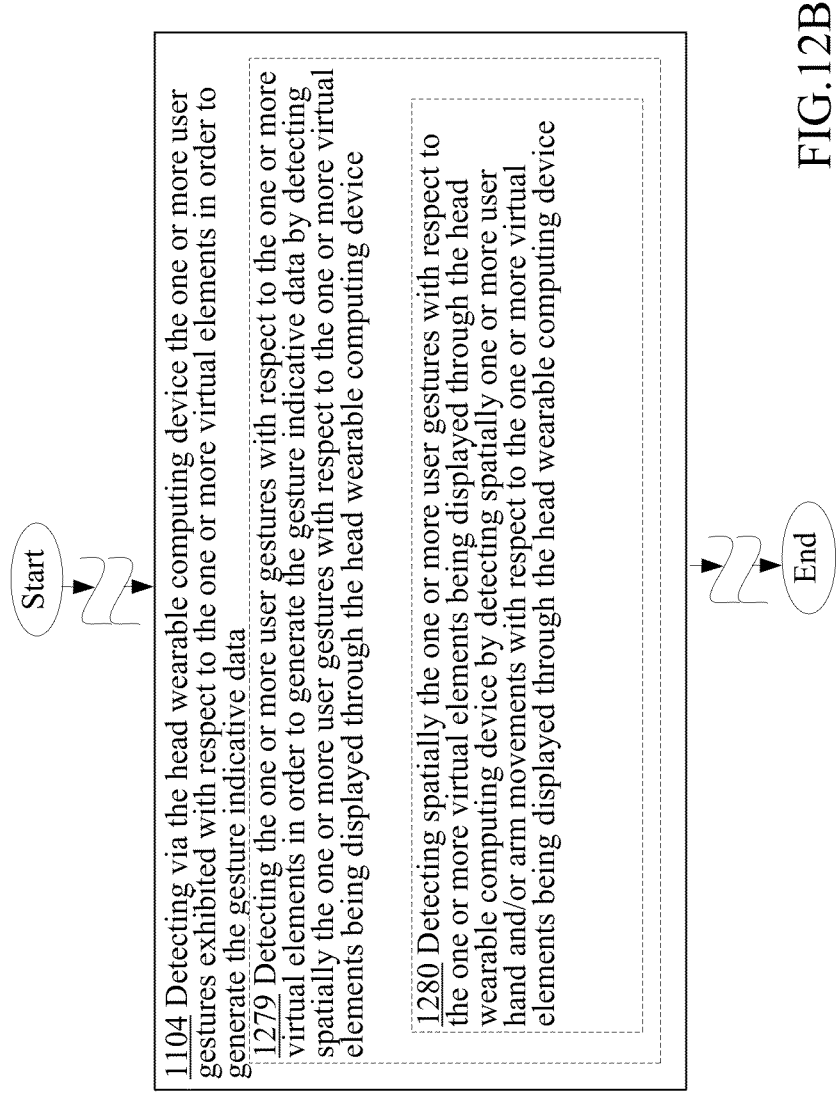
FIG. 12B is a high-level logic flowchart of a process depicting alternate implementations of the user gesture detecting operation 1104 of FIG. 11.

Turning to FIG. 12B, in some implementations, the user gesture detecting operation 1104 of FIG. 11 may include an operation 1279 for detecting the one or more user gestures with respect to the one or more virtual elements in order to generate the gesture indicative data by detecting spatially the one or more user gestures with respect to the one or more virtual elements being displayed through the head wearable computing device. For instance, the user gesture detecting module 406* of the head wearable computing device 10* of FIG. 4A or 4B detecting the one or more user gestures with respect to the one or more virtual elements in order to generate the gesture indicative data by detecting spatially (via the head wearable computing device 10*) the one or more user gestures with respect to the one or more virtual elements being displayed through the head wearable computing device 10*.

In some cases, operation 1279 may further include an operation 1280 for detecting spatially the one or more user gestures with respect to the one or more virtual elements being displayed through the head wearable computing device by detecting spatially one or more user hand and/or arm movements with respect to the one or more virtual elements being displayed through the head wearable computing device. For instance, the user gesture detecting module 406* of the head wearable computing device 10* of FIG. 4A or 4B detecting spatially the one or more user gestures with respect to the one or more virtual elements being displayed through the head wearable computing device 10* by detecting spatially (via the head wearable computing device 10*) one or more user hand and/or arm movements with respect to the one or more virtual elements being displayed through the head wearable computing device 10*. For example, detecting finger movements (e.g., pressing motions exhibited by one or more fingers) of the user 2 over one or more virtual keys 315 that are being displayed through the head wearable computing device 10*.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

This application may make reference to one or more trademarks, e.g., a word, letter, symbol, or device adopted by one manufacturer or merchant and used to identify and/or distinguish his or her product from those of others. Trademark names used herein are set forth in such language that makes clear their identity, that distinguishes them from common descriptive nouns, that have fixed and definite meanings, or, in many if not all cases, are accompanied by other specific identification using terms not covered by trademark. In addition, trademark names used herein have meanings that are well-known and defined in the literature, or do not refer to products or compounds for which knowledge of one or more trade secrets is required in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or bracketed capitalization (e.g., [trademark name]), even when such trademark symbol does not explicitly appear next to the trademark. To the extent a trademark is used in a descriptive manner to refer to a product or process, that trademark should be interpreted to represent the corresponding product or process as of the date of the filing of this patent application.

Throughout this application, the terms "in an embodiment," "in one embodiment," "in some embodiments," "in several embodiments," "in at least one embodiment," "in various embodiments," and the like, may be used. Each of these terms, and all such similar terms should be construed as "in at least one embodiment, and possibly but not necessarily all embodiments," unless explicitly stated otherwise. Specifically, unless explicitly stated otherwise, the intent of phrases like these is to provide non-exclusive and non-limiting examples of implementations of the invention. The mere statement that one, some, or may embodiments include one or more things or have one or more features, does not imply that all embodiments include one or more things or have one or more features, but also does not imply that such embodiments must exist. It is a mere indicator of an example and should not be interpreted otherwise, unless explicitly stated as such.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

What is claimed is:

1. A computationally-implemented method, comprising:
   facilitating a head wearable computing device to receive one or more solicitations via one or more solicitation signals that solicit to provide to a limb wearable computing device gesture indicative data that is indicative of one or more user gestures, the head wearable computing device being designed to be worn on a head of a user and the limb wearable computing device being designed to be worn around a limb of a user; and
   directing the head wearable computing device to transmit to the limb wearable computing device the gesture indicative data via one or more low-power gesture indicative data signals, the limb wearable computing device being within communication range of the head wearable computing device, the communication range being a spatial volume that includes the head wearable computing device and being externally defined by an enveloping boundary, where the one or more low-power gesture indicative data signals transmitted by the head wearable computing device being discernible over background noise within the enveloping boundary and not discernible over background noise outside the enveloping boundary.

2. A computationally-implemented system, comprising:
   means for facilitating a head wearable computing device to receive one or more solicitations via one or more solicitation signals that solicit to provide to a limb wearable computing device gesture indicative data that is indicative of one or more user gestures, the head wearable computing device being designed to be worn on a head of a user and the limb wearable computing device being designed to be worn around a limb of a user; and
   means for directing the head wearable computing device to transmit to the limb wearable computing device the gesture indicative data via one or more low-power gesture indicative data signals, the limb wearable computing device being within communication range of the head wearable computing device, the communication range being a spatial volume that includes the head wearable computing device and being externally defined by an enveloping boundary, where the one or more low-power gesture indicative data signals transmitted by the head wearable computing device being discernible over background noise within the enveloping boundary and not discernible over background noise outside the enveloping boundary.

3. The computationally-implemented system of claim 2, wherein said means for facilitating a head wearable computing device to receive one or more solicitations via one or more solicitation signals that solicit to provide to a limb wearable computing device gesture indicative data that is indicative of one or more user gestures, the head wearable computing device being designed to be worn on a head of a user and the limb wearable computing device being designed to be worn around a limb of a user comprises:

means for facilitating the head wearable computing device to receive the one or more solicitations via the one or more solicitation signals that solicit to provide to the limb wearable computing device the gesture indicative data that is indicative of the one or more user gestures including means for facilitating the head wearable computing device to receive one or more solicitations via the one or more solicitation signals that solicit to provide to the limb wearable computing device gesture indicative data that is in the form of image data that is indicative of the one or more user gestures.

4. The computationally-implemented system of claim 3, wherein said means for facilitating the head wearable computing device to receive the one or more solicitations via the one or more solicitation signals that solicit to provide to the limb wearable computing device the gesture indicative data that is indicative of the one or more user gestures including means for facilitating the head wearable computing device to receive one or more solicitations via the one or more solicitation signals that solicit to provide to the limb wearable computing device gesture indicative data that is in the form of image data that is indicative of the one or more user gestures comprises:

means for facilitating the head wearable computing device to receive the one or more solicitations via the one or more solicitation signals that solicit to provide to the limb wearable computing device the gesture indicative data that is in the form of image data that is indicative of the one or more user gestures including means for facilitating the head wearable computing device to receive one or more solicitations via the one or more solicitation signals that solicit to provide to the limb wearable computing device gesture indicative data that is in the form of image data that is indicative of one or more user hand and/or arm gestures.

5. The computationally-implemented system of claim 4, wherein said means for facilitating the head wearable computing device to receive the one or more solicitations via the one or more solicitation signals that solicit to provide to the limb wearable computing device the gesture indicative data that is in the form of image data that is indicative of the one or more user gestures including means for facilitating the head wearable computing device to receive one or more solicitations via the one or more solicitation signals that solicit to provide to the limb wearable computing device gesture indicative data that is in the form of image data that is indicative of one or more user hand and/or arm gestures comprises:

means for facilitating the head wearable computing device to receive the one or more solicitations via the one or more solicitation signals that solicit to provide to the limb wearable computing device the gesture indicative data that is in the form of image data that is indicative of one or more user hand and/or arm gestures including means for facilitating the head wearable computing device to receive one or more solicitations via the one or more solicitation signals that solicit to provide to the limb wearable computing device gesture indicative data that is in the form of image data that is indicative of one or more user hand and/or arm gestures relative to one or more visual items.

6. The computationally-implemented system of claim 5, wherein said means for facilitating the head wearable computing device to receive the one or more solicitations via the one or more solicitation signals that solicit to provide to the limb wearable computing device the gesture indicative data that is in the form of image data that is indicative of the one or more user hand and/or arm gestures including means for facilitating the head wearable computing device to receive one or more solicitations via the one or more solicitation signals that solicit to provide to the limb wearable computing device gesture indicative data that is in the form of image data that is indicative of one or more user hand and/or arm gestures relative to one or more visual items comprises:

means for facilitating the head wearable computing device to receive one or more solicitations via the one or more solicitation signals that solicit to provide to the limb wearable computing device gesture indicative data that is in the form of image data that is indicative of one or more user hand and/or arm gestures relative to one or more visual items including means for facilitating the head wearable computing device to receive one or more solicitations via the one or more solicitation signals that solicit to provide to the limb wearable computing device gesture indicative data that is in the form of image data that is indicative of one or more user hand and/or arm gestures relative to one or more virtual items.

7. The computationally-implemented system of claim 2, wherein said means for facilitating a head wearable computing device to receive one or more solicitations via one or more solicitation signals that solicit to provide to a limb wearable computing device gesture indicative data that is indicative of one or more user gestures, the head wearable computing device being designed to be worn on a head of a user and the limb wearable computing device being designed to be worn around a limb of a user comprises:

means for facilitating the head wearable computing device to receive the one or more solicitations via the one or more solicitation signals including means for facilitating the head wearable computing device to receive the one or more solicitations via one or more solicitation signals having one or more frequencies from the 60 GHz frequency band having a frequency range between 57 GHz and 64 GHz.

8. The computationally-implemented system of claim 2, wherein said means for facilitating a head wearable computing device to receive one or more solicitations via one or more solicitation signals that solicit to provide to a limb wearable computing device gesture indicative data that is indicative of one or more user gestures, the head wearable computing device being designed to be worn on a head of a user and the limb wearable computing device being designed to be worn around a limb of a user comprises:

means for facilitating the head wearable computing device to receive the one or more solicitations via the one or more solicitation signals that solicit to provide to the limb wearable computing device the gesture indicative data that is indicative of one or more user gestures including means for facilitating the head wearable computing device to receive one or more queries via one or more query signals that queries the head wearable computing device to provide to the limb wearable computing device one or more confirmations that confirms that the head wearable computing device is capable of providing the gesture indicative data.

9. The computationally-implemented system of claim 8, wherein said means for facilitating the head wearable computing device to receive the one or more solicitations via the one or more solicitation signals that solicit to provide to the limb wearable computing device the gesture indicative data that is indicative of one or more user gestures including means for facilitating the head wearable computing device to receive one or more queries via one or more query signals that queries the head wearable computing device to provide to the limb wearable computing device one or more confirmations that confirms that the head wearable computing device is capable of providing the gesture indicative data comprises:

means for facilitating the head wearable computing device to receive the one or more queries via the one or more query signals that queries the head wearable computing device to provide to the limb wearable computing device the one or more confirmations that confirms that the head wearable computing device is capable of providing the gesture indicative data including means for facilitating the head wearable computing device to receive one or more queries via one or more query signals that queries the head wearable computing device to provide to the limb wearable computing device one or more confirmations that confirms that one or more hands and/or arms of a user is or are visible through one or more cameras of the head wearable computing device.

10. The computationally-implemented system of claim 2, wherein said means for facilitating a head wearable computing device to receive one or more solicitations via one or more solicitation signals that solicit to provide to a limb wearable computing device gesture indicative data that is indicative of one or more user gestures, the head wearable computing device being designed to be worn on a head of a user and the limb wearable computing device being designed to be worn around a limb of a user comprises:

means for facilitating the head wearable computing device to receive the one or more solicitations via the one or more solicitation signals that solicit to provide to the limb wearable computing device the gesture indicative data including means for facilitating the head wearable computing device to receive the one or more solicitations via the one or more solicitation signals that solicit to provide to the limb wearable computing device the gesture indicative data via one or more low-power gesture indicative data signals having one or more frequencies from the 60 GHz frequency band having a frequency range between 57 GHz and 64 GHz.

11. The computationally-implemented system of claim 2, wherein said means for facilitating a head wearable computing device to receive one or more solicitations via one or more solicitation signals that solicit to provide to a limb wearable computing device gesture indicative data that is indicative of one or more user gestures, the head wearable computing device being designed to be worn on a head of a user and the limb wearable computing device being designed to be worn around a limb of a user comprises:

means for facilitating the head wearable computing device to receive the one or more solicitations via the one or more solicitation signals that solicit to provide to the limb wearable computing device the gesture indicative data including means for facilitating the head wearable computing device to receive the one or more solicitations via the one or more solicitation signals that solicit to provide to the limb wearable computing device the gesture indicative data via one or more low-power gesture indicative data signals that are requested to be transmitted using one or more transmit powers less than 0.8 milliwatt.

12. The computationally-implemented system of claim 2, wherein said means for directing the head wearable computing device to transmit to the limb wearable computing device the gesture indicative data via one or more low-power gesture indicative data signals, the limb wearable computing device being within communication range of the head wearable computing device, the communication range being a spatial volume that includes the head wearable computing device and being externally defined by an enveloping boundary, where the one or more low-power gesture indicative data signals transmitted by the head wearable computing device being discernible over background noise within the enveloping boundary and not discernible over background noise outside the enveloping boundary comprises:

means for directing the head wearable computing device to transmit to the limb wearable computing device the gesture indicative data via the one or more low-power gesture indicative data signals including means for directing one or more components of the head wearable computing device to transmit to the limb wearable computing device the gesture indicative data via the one or more low-power gesture indicative data signals.

13. The computationally-implemented system of claim 12, wherein said means for directing the head wearable computing device to transmit to the limb wearable computing device the gesture indicative data via one or more low-power gesture indicative data signals including means for directing one or more components of the head wearable computing device to transmit to the limb wearable computing device the gesture indicative data via the one or more low-power gesture indicative data signals comprises:

means for directing the one or more components of the head wearable computing device to transmit to the limb wearable computing device the gesture indicative data via the one or more low-power gesture indicative data signals including means for pointing a directional antenna of the head wearable computing device towards a determined location of the limb wearable computing device relative to the head wearable computing device in order to transmit to the limb wearable computing device the gesture indicative data via the one or more low-power gesture indicative data signals.

14. The computationally-implemented system of claim 2, wherein said means for directing the head wearable computing device to transmit to the limb wearable computing device the gesture indicative data via one or more low-power gesture indicative data signals, the limb wearable computing device being within communication range of the head wearable computing device, the communication range being a spatial volume that includes the head wearable computing device and being externally defined by an enveloping boundary, where the one or more low-power gesture indicative data signals transmitted by the head wearable computing device being discernible over background noise within the enveloping boundary and not discernible over background noise outside the enveloping boundary comprises:

means for directing the head wearable computing device to transmit to the limb wearable computing device the gesture indicative data via the one or more low-power gesture indicative data signals including means for directing the head wearable computing device to transmit to the limb wearable computing device gesture indicative data in the form of image data.

15. The computationally-implemented system of claim 14, wherein said means for directing the head wearable computing device to transmit to the limb wearable computing device the gesture indicative data via the one or more low-power gesture indicative data signals including means for directing the head wearable computing device to transmit to the limb wearable computing device gesture indicative data in the form of image data comprises:

means for directing the head wearable computing device to transmit to the limb wearable computing device gesture indicative data in the form of image data including means for directing the head wearable computing device to transmit to the limb wearable computing device image data that provides one or more images showing one or more hand and/or arm gestures.

16. The computationally-implemented system of claim 15, wherein said means for directing the head wearable computing device to transmit to the limb wearable computing device gesture indicative data in the form of image data including means for directing the head wearable computing device to transmit to the limb wearable computing device image data that provides one or more images showing one or more hand and/or arm gestures comprises:

means for directing the head wearable computing device to transmit to the limb wearable computing device the image data that provides the one or more images showing the one or more hand and/or arm gestures including means for directing the head wearable computing device to transmit to the limb wearable computing device image data that provides one or more images showing one or more hand and/or arm gestures relative to one or more visual elements.

17. The computationally-implemented system of claim 16, wherein said means for directing the head wearable computing device to transmit to the limb wearable computing device the image data that provides the one or more images showing the one or more hand and/or arm gestures including means for directing the head wearable computing device to transmit to the limb wearable computing device image data that provides one or more images showing one or more hand and/or arm gestures relative to one or more visual elements comprises:

means for directing the head wearable computing device to transmit to the limb wearable computing device image data that provides the one or more images showing the one or more hand and/or arm gestures relative to the one or more visual elements including means for directing the head wearable computing device to transmit to the limb wearable computing device image data providing one or more images showing one or more hand and/or arm gestures relative to one or more virtual elements that were displayed through the head wearable computing device.

18. The computationally-implemented system of claim 2, wherein said means for directing the head wearable computing device to transmit to the limb wearable computing device the gesture indicative data via one or more low-power gesture indicative data signals, the limb wearable computing device being within communication range of the head wearable computing device, the communication range being a spatial volume that includes the head wearable computing device and being externally defined by an enveloping boundary, where the one or more low-power gesture indicative data signals transmitted by the head wearable computing device being discernible over background noise within the enveloping boundary and not discernible over background noise outside the enveloping boundary comprises:

means for directing the head wearable computing device to transmit to the limb wearable computing device the gesture indicative data via the one or more low-power gesture indicative data signals including means for directing the head wearable computing device to transmit to the limb wearable computing device the gesture indicative data via one or more low-power gesture indicative data signals having one or more frequencies from the 60 GHz frequency band having a frequency range between 57 GHz and 64 GHz.

19. The computationally-implemented system of claim 2, wherein said means for directing the head wearable computing device to transmit to the limb wearable computing device the gesture indicative data via one or more low-power gesture indicative data signals, the limb wearable computing device being within communication range of the head wearable computing device, the communication range being a spatial volume that includes the head wearable computing device and being externally defined by an enveloping boundary, where the one or more low-power gesture indicative data signals transmitted by the head wearable computing device being discernible over background noise within the enveloping boundary and not discernible over background noise outside the enveloping boundary comprises:

means for directing the head wearable computing device to transmit to the limb wearable computing device the gesture indicative data via the one or more low-power gesture indicative data signals using 0.8 milliwatt or less of transmit power to transmit the one or more low-power gesture indicative data signals.

20. The computationally-implemented system of claim 2, wherein said means for directing the head wearable computing device to transmit to the limb wearable computing device the gesture indicative data via one or more low-power gesture indicative data signals, the limb wearable computing device being within communication range of the head wearable computing device, the communication range being a spatial volume that includes the head wearable computing device and being externally defined by an enveloping boundary, where the one or more low-power gesture indicative data signals transmitted by the head wearable computing device being discernible over background noise within the enveloping boundary and not discernible over background noise outside the enveloping boundary comprises:

means for directing the head wearable computing device to transmit to the limb wearable computing device the gesture indicative data via the one or more low-power gesture indicative data signals including means for determining, prior to transmitting the gesture indicative data via the one or more low-power gesture indicative data signals, amount of transmit power needed by the head wearable computing device to successfully communicate the one or more low-power gesture indicative data signals to the limb wearable computing device.

21. The computationally-implemented system of claim 20, wherein said means for directing the head wearable computing device to transmit to the limb wearable computing device the gesture indicative data via the one or more low-power gesture indicative data signals including means for determining, prior to transmitting the gesture indicative data via the one or more low-power gesture indicative data signals, amount of transmit power needed by the head wearable computing device to successfully communicate the one or more low-power gesture indicative data signals to the limb wearable computing device comprises:

means for determining the amount of transmit power needed by the head wearable computing device to successfully communicate the one or more low-power gesture indicative data signals to the limb wearable computing device based, at least in part, on one or more signals received by the head wearable computing device from the limb wearable computing device.

22. The computationally-implemented system of claim 21, wherein said means for determining the amount of transmit power needed by the head wearable computing device to successfully communicate the one or more low-power gesture indicative data signals to the limb wearable computing device based, at least in part, on one or more signals received by the head wearable computing device from the limb wearable computing device comprises:
   means for determining the amount of transmit power needed by the head wearable computing device in order to successfully communicate the one or more low-power gesture indicative data signals to the limb wearable computing device based, at least in part, on one or more responsive signals received by the head wearable computing device and that were transmitted by the limb wearable computing device, the one or more responsive signals transmitted by the limb wearable computing device responsive to the limb wearable computing device receiving one or more low-power prompting signals that were broadcasted by the head wearable computing device.

23. The computationally-implemented system of claim 22, wherein said means for determining the amount of transmit power needed by the head wearable computing device in order to successfully communicate the one or more low-power gesture indicative data signals to the limb wearable computing device based, at least in part, on one or more responsive signals received by the head wearable computing device and that were transmitted by the limb wearable computing device, the one or more responsive signals transmitted by the limb wearable computing device responsive to the limb wearable computing device receiving one or more low-power prompting signals that were broadcasted by the head wearable computing device comprises:
   means for directing the head wearable computing device to transmit the one or more low-power prompting signals that are designed to prompt the limb wearable computing device to transmit the one or more responsive signals upon the limb wearable computing device detecting the one or more low-power prompting signals; and
   means for directing the head wearable computing device to monitor for the one or more responsive signals following transmission of the one or more low-power prompting signals.

24. The computationally-implemented system of claim 23, wherein said means for directing the head wearable computing device to transmit the one or more low-power prompting signals that are designed to prompt the limb wearable computing device to transmit the one or more responsive signals upon the limb wearable computing device detecting the one or more low-power prompting signals comprises:
   means for directing the head wearable computing device to transmit the one or more low-power prompting signals, the one or more low-power prompting signals not being discernible over background noise outside the enveloping boundary of the communication range of the head wearable computing device.

25. The computationally-implemented system of claim 23, wherein said means for directing the head wearable computing device to transmit the one or more low-power prompting signals that are designed to prompt the limb wearable computing device to transmit the one or more responsive signals upon the limb wearable computing device detecting the one or more low-power prompting signals comprises:
   means for directing the head wearable computing device to transmit the one or more low-power prompting signals including means for directing the head wearable computing device to transmit the one or more low-power prompting signals using 0.8 milliwatt or less of transmit power.

26. The computationally-implemented system of claim 23, wherein said means for directing the head wearable computing device to transmit the one or more low-power prompting signals that are designed to prompt the limb wearable computing device to transmit the one or more responsive signals upon the limb wearable computing device detecting the one or more low-power prompting signals comprises:
   means for directing the head wearable computing device to transmit the one or more low-power prompting signals using different levels of transmit power, where the one or more low-power prompting signals are transmitted at each level of transmit power for predefined increment or increments of time.

27. The computationally-implemented system of claim 26, wherein said means for directing the head wearable computing device to transmit the one or more low-power prompting signals using different levels of transmit power, where the one or more low-power prompting signals are transmitted at each level of transmit power for predefined increment or increments of time comprises:
   means for directing the head wearable computing device to transmit the one or more low-power prompting signals using different levels of transmit power that are less than 1 milliwatt.

28. The computationally-implemented system of claim 26, wherein said means for directing the head wearable computing device to transmit the one or more low-power prompting signals using different levels of transmit power, where the one or more low-power prompting signals are transmitted at each level of transmit power for predefined increment or increments of time comprises:
   means for directing the head wearable computing device to pause transmission of the one or more low-power prompting signals between each transmission of the one or more low-power prompting signals at each of the different levels of transmit power in order to monitor for the one or more responsive signals following each transmission of the one or more low-power prompting signals at each of the different levels of transmit power.

29. The computationally-implemented system of claim 23, wherein said means for directing the head wearable computing device to transmit the one or more low-power prompting signals that are designed to prompt the limb wearable computing device to transmit the one or more responsive signals upon the limb wearable computing device detecting the one or more low-power prompting signals comprises:
   means for directing the head wearable computing device to transmit the one or more low-power prompting signals having one or more frequencies form the 60 GHz frequency band having a frequency range between 57 GHz and 64 GHz.

30. The computationally-implemented system of claim 21, wherein said means for determining the amount of transmit power needed by the head wearable computing device to successfully communicate the one or more low-power gesture indicative data signals to the limb wearable computing device based, at least in part, on one or more signals received by the head wearable computing device from the limb wearable computing device comprises:
    means for determining the amount of transmit power needed by the head wearable computing device to successfully communicate the one or more low-power gesture indicative data signals to the limb wearable computing device based, at least in part, on one or more unsolicited beacon signals received by the head wearable computing device and that were transmitted by the limb wearable computing device.

31. The computationally-implemented system of claim 30, wherein said means for determining the amount of transmit power needed by the head wearable computing device to successfully communicate the one or more low-power gesture indicative data signals to the limb wearable computing device based, at least in part, on one or more unsolicited beacon signals received by the head wearable computing device and that were transmitted by the limb wearable computing device comprises:
    means for determining signal strength or strengths of the one or more unsolicited beacon signals upon being received by the head wearable computing device in order to determine the amount of transmit power needed to successfully communicate the one or more low-power gesture indicative data signals to the limb wearable computing device from the head wearable computing device.

32. The computationally-implemented system of claim 2, further comprising:
    means for detecting, via the head wearable computing device, the one or more user gestures in order to generate the gesture indicative data.

33. The computationally-implemented system of claim 32, wherein said means for detecting, via the head wearable computing device, the one or more user gestures in order to generate the gesture indicative data comprises:
    means for detecting, via the head wearable computing device, the one or more user gestures including means for detecting visually, via the head wearable computing device, the one or more user gestures.

34. The computationally-implemented system of claim 33, wherein said means for detecting, via the head wearable computing device, the one or more user gestures including means for detecting visually, via the head wearable computing device, the one or more user gestures comprises:
    means for detecting visually, via the head wearable computing device, the one or more user gestures including means for detecting visually, via the head wearable computing device, one or more user hand and/or arm gestures.

35. The computationally-implemented system of claim 34, wherein said means for detecting visually, via the head wearable computing device, the one or more user gestures including means for detecting visually, via the head wearable computing device, one or more user hand and/or arm gestures comprises:
    means for detecting visually, via the head wearable computing device, one or more user hand and/or arm gestures including means for detecting visually, via the head wearable computing device, the one or more user hand and/or arm gestures with respect to one or more visual elements.

36. The computationally-implemented system of claim 35, wherein said means for detecting visually, via the head wearable computing device, one or more user hand and/or arm gestures including means for detecting visually, via the head wearable computing device, the one or more user hand and/or arm gestures with respect to one or more visual elements comprises:
    means for detecting visually, via the head wearable computing device, the one or more user hand and/or arm gestures with respect to one or more virtual elements that were displayed through the head wearable computing device.

37. The computationally-implemented system of claim 2, further comprising:
    means for displaying, via the head wearable computing device, one or more virtual elements in order to prompt a user to exhibit the one or more user gestures with respect to the one or more virtual elements; and
    means for detecting, via the head wearable computing device, the one or more user gestures with respect to the one or more virtual elements in order to generate the gesture indicative data.

38. The computationally-implemented system of claim 37, wherein said means for displaying, via the head wearable computing device, one or more virtual elements in order to prompt a user to exhibit the one or more user gestures with respect to the one or more virtual elements comprises:
    means for displaying, via the head wearable computing device, the one or more virtual elements including means for displaying, via the head wearable computing device, one or more virtual keys.

39. The computationally-implemented system of claim 37, wherein said means for detecting, via the head wearable computing device, the one or more user gestures with respect to the one or more virtual elements in order to generate the gesture indicative data comprises:
    means for detecting the one or more user gestures with respect to the one or more virtual elements in order to generate the gesture indicative data including means for detecting spatially the one or more user gestures with respect to the one or more virtual elements being displayed through the head wearable computing device.

40. The computationally-implemented system of claim 39, wherein said means for detecting the one or more user gestures with respect to the one or more virtual elements in order to generate the gesture indicative data including means for detecting spatially the one or more user gestures with respect to the one or more virtual elements being displayed through the head wearable computing device comprises:
    means for detecting spatially the one or more user gestures with respect to the one or more virtual elements being displayed through the head wearable computing device including means for detecting spatially one or more user hand and/or arm movements with respect to the one or more virtual elements being displayed through the head wearable computing device.

41. A system, comprising:
    circuitry for facilitating a head wearable computing device to receive one or more solicitations via one or more solicitation signals that solicit to provide to a limb wearable computing device gesture indicative data that is indicative of one or more user gestures, the head wearable computing device being designed to be worn on a head of a user and the limb wearable computing device being designed to be worn around a limb of a user; and
    circuitry for directing the head wearable computing device to transmit to the limb wearable computing device the gesture indicative data via one or more low-power gesture indicative data signals, the limb wearable computing device being within communication range of the head wearable computing device, the communication range being a spatial volume that includes the head wearable computing device and being externally defined by an enveloping boundary, where the one or more low-power gesture indicative data signals transmitted by the head wearable computing device being discernible over background noise within the enveloping boundary and not discernible over background noise outside the enveloping boundary.

* * * * *